US012776997B2

(12) United States Patent
Singh

(10) Patent No.: US 12,776,997 B2
(45) **Date of Patent: *Oct. 27, 2026**

(54) PORT ADDRESSING VIA PACKET HEADER MODIFICATION

(71) Applicant: Oracle International Corporation, Redwood Shores, CA (US)

(72) Inventor: Brijesh Singh, Mercer Island, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,436

(22) Filed: May 6, 2024

(65) Prior Publication Data

US 2024/0291768 A1 Aug. 29, 2024

Related U.S. Application Data

(63) Continuation of application No. 17/244,723, filed on Apr. 29, 2021, now Pat. No. 12,015,562.

(51) Int. Cl.
*H04L 47/625* (2022.01)

(52) U.S. Cl.
CPC .................................. *H04L 47/625* (2013.01)

(58) Field of Classification Search
CPC ..................................................... H04L 47/625
See application file for complete search history.

(56) References Cited

U.S. PATENT DOCUMENTS 8,930,690 B2 1/2015 Zuo et al.
9,674,090 B2 6/2017 Caulfield et al.
10,742,558 B1 * 8/2020 Matthews ........... H04L 49/9042
10,841,243 B2 11/2020 Levi et al.
11,157,422 B2 * 10/2021 Bernat .................. G06F 12/082
11,388,225 B1 7/2022 Duraj et al.
11,456,951 B1 9/2022 Wu
11,496,599 B1 * 11/2022 Singh ...................... H04L 69/22

(Continued)

FOREIGN PATENT DOCUMENTS

EP 3621251 3/2020
WO 2020068725 4/2020

OTHER PUBLICATIONS

U.S. Appl. No. 18/657,055 , "Non-Final Office Action", Dec. 10, 2024, 10 pages.

(Continued)

*Primary Examiner* — Guang W Li
(74) *Attorney, Agent, or Firm* — Kilpatrick Townsend & Stockton LLP

(57) ABSTRACT

Techniques are disclosed for processing flows by a smart network interface card (smartNIC) based on modifying a packet. In one example, an accelerator receives a packet from a first port of the smartNIC. The accelerator determines that the packet was received from a first port via a second data path instead of a first data path. The accelerator modifies the packet to indicate that the packet arrived from the first port via the second data path. The accelerator inserts the modified packet into a queue. A programming data plane of the smartNIC receives the modified packet from the queue. The programming data plane processes the modified packet based at least in part on determining that the packet arrived at the first port via the second data path.

20 Claims, 17 Drawing Sheets

(56) References Cited

U.S. PATENT DOCUMENTS

| | | | | |
|---|---|---|---|---|
| 11,593,136 | B2 * | 2/2023 | Galles | H04L 49/3009 |
| 11,960,919 | B2 | 4/2024 | Niu et al. | |
| 12,010,195 | B2 | 6/2024 | Singh | |
| 12,015,557 | B2 * | 6/2024 | Singh | H04L 47/2441 |
| 12,015,562 | B2 * | 6/2024 | Singh | H04L 47/625 |
| 12,355,669 | B2 | 7/2025 | Singh et al. | |
| 12,671,657 | B2 | 6/2026 | Singh | |
| 2008/0301332 | A1 | 12/2008 | Butler et al. | |
| 2009/0228589 | A1 | 9/2009 | Korupolu | |
| 2016/0232019 | A1 | 8/2016 | Shah et al. | |
| 2016/0330112 | A1 | 11/2016 | Raindel et al. | |
| 2016/0380896 | A1 * | 12/2016 | Caulfield | H04L 47/31 370/235 |
| 2017/0187640 | A1 * | 6/2017 | Vasudevan | H04L 47/24 |
| 2017/0289067 | A1 * | 10/2017 | Lu | H04L 49/70 |
| 2018/0139310 | A1 * | 5/2018 | Caulfield | H04L 49/25 |
| 2018/0285288 | A1 | 10/2018 | Bernat et al. | |
| 2019/0042741 | A1 | 2/2019 | Abodunrin et al. | |
| 2019/0044866 | A1 | 2/2019 | Chilikin et al. | |
| 2019/0044879 | A1 * | 2/2019 | Richardson | H04L 47/624 |
| 2019/0109793 | A1 * | 4/2019 | Dalal | H04L 63/0227 |
| 2019/0394066 | A1 | 12/2019 | Lin et al. | |
| 2020/0021532 | A1 | 1/2020 | Borikar et al. | |
| 2020/0174954 | A1 * | 6/2020 | Pope | G06Q 40/04 |
| 2020/0201624 | A1 | 6/2020 | Halder et al. | |
| 2020/0267082 | A1 | 8/2020 | Dong | |
| 2020/0278892 | A1 * | 9/2020 | Nainar | H04L 67/10 |
| 2020/0314011 | A1 | 10/2020 | Deval et al. | |
| 2021/0019270 | A1 | 1/2021 | Li et al. | |
| 2021/0092058 | A1 * | 3/2021 | Popilov | H04L 45/566 |
| 2021/0112132 | A1 * | 4/2021 | Paliwal | H04L 45/74 |
| 2021/0117360 | A1 | 4/2021 | Kutch et al. | |
| 2021/0203597 | A1 * | 7/2021 | Kadu | H04L 45/42 |
| 2021/0226846 | A1 | 7/2021 | Ballard et al. | |
| 2022/0100546 | A1 * | 3/2022 | Cherian | G06F 3/0604 |
| 2022/0164451 | A1 | 5/2022 | Bagwell | |
| 2022/0166718 | A1 | 5/2022 | Kamisetty et al. | |
| 2022/0291952 | A1 | 9/2022 | Milojicic et al. | |
| 2022/0303137 | A1 | 9/2022 | Brogle et al. | |
| 2022/0329520 | A1 * | 10/2022 | Degrace | H04L 45/12 |
| 2022/0329528 | A1 * | 10/2022 | Degrace | H04L 41/0668 |
| 2022/0353197 | A1 * | 11/2022 | Singh | H04L 47/625 |
| 2022/0353240 | A1 | 11/2022 | McDowall et al. | |
| 2022/0353339 | A1 * | 11/2022 | Singh | H04L 45/04 |
| 2023/0029796 | A1 * | 2/2023 | Li | H04L 47/625 |
| 2023/0041806 | A1 * | 2/2023 | Singh | H04L 63/0428 |
| 2023/0300075 | A1 * | 9/2023 | Peri | H04L 47/225 370/412 |

OTHER PUBLICATIONS

U.S. Appl. No. 17/389,219 , "Notice of Allowance", Feb. 15, 2024, 8 pages.
U.S. Appl. No. 17/394,300 , "Non-Final Office Action", Feb. 28, 2023, 14 pages.
U.S. Appl. No. 17/959,941 , "Notice of Allowance", Feb. 5, 2024, 7 pages.
"An Introduction to SmartNICs", Available Online at: https://www.nextplatform.com/2019/03/04/an-introduction-to-smartnics/, Mar. 4, 2019, 3 pages.
"Best Practices for Client IP Address Preservation", Available Online at: https://docs.aws.amazon.com/global-accelerator/latest/dg/best-practices-aga.html, Accessed from Internet on Nov. 11, 2020, 2 pages.
"Flow Logs in AWS Global Accelerator", Available Online at: https://docs.aws.amazon.com/global-accelerator/latest/dg/monitoring-global-accelerator.flow-logs.html, Accessed from Internet on Nov. 11, 2020, 7 pages.
"What is AWS Global Accelerator?", Available Online at: https://docs.aws.amazon.com/global-accelerator/latest/dg/what-is-global-accelerator.html, Accessed from Internet on Nov. 11, 2020, 1 page.
"What Makes a NIC a SmartNIC, and Why is it Needed?", Available Online at: https://www.netronome.com/blog/what-makes-a-nic-a-smartnic-and-why-is-it-needed/, Sep. 13, 2016, 8 pages.
U.S. Appl. No. 17/244,723 , "Corrected Notice of Allowability", Mar. 21, 2024, 2 pages.
U.S. Appl. No. 17/244,723 , "Non-Final Office Action", Sep. 15, 2023, 11 pages.
U.S. Appl. No. 17/244,723 , "Notice of Allowance", Feb. 9, 2024, 7 pages.
U.S. Appl. No. 17/244,727 , "Notice of Allowance", Jul. 5, 2022, 10 pages.
U.S. Appl. No. 17/394,300 , "Final Office Action", Jul. 28, 2023, 16 pages.
U.S. Appl. No. 17/394,300 , "Non-Final Office Action", Mar. 20, 2024, 16 pages.
U.S. Appl. No. 17/959,941 , "Non-Final Office Action", Jun. 1, 2023, 12 pages.
Chawla , "Is it Time for NICs to get Smarter?", Available Online at: https://www.delltechnologies.com/en-us/blog/smart-nics-smarter/, Sep. 18, 2019, 3 pages.
Deierling , "Achieving a Cloud Scale Architecture with DPU based Smart NICs", Available Online at: https://blog.mellanox.com/2018/09/why-you-need-dpu-based-smart-nic-use-cases/, Sep. 11, 2018, 5 pages.
Firestone et al., "Azure Accelerated Networking: SmartNICs in the Public Cloud", 15th USENIX Symposium on Networked Systems Design and Implementation, Apr. 2018, 14 pages.
Gwennap , "Single-Chip Control/Data-Plane Processors Trends, Features, Deployment", Available Online at: http://linleygroup.com/cms_builder/uploads/WP_SCDP.pdf, Jun. 2008, 10 pages.
Kumar , "Taming Latency in Data Center Applications", Available Online at: https://smartech.gatech.edu/bitstream/handle/1853/61693/KUMAR-DISSERTATION-2019.pdf, Aug. 2019, 156 pages.
Le et al., "UNO: Uniflying Host and Smart NIC Offload for Flexible Packet Processing", Proceedings of the 2017 Symposium on Cloud Computing, Available Online at: https://dl.acm.org/doi/pdf/10.1145/3127479.3132252, Sep. 2017, pp. 506-519.
Schweitzer , "SmartNIC Architectures: A Shift to Accelerators and Why FPGAs are Poised to Dominate", Available Online at: https://www.electronicdesign.com/markets/automation/article/21136402/xilinx-smartnic-architectures-a-shift-to-accelerators-and-why-fpgas-are-poised-to-dominate, Jul. 10, 2020, 19 pages.
U.S. Appl. No. 17/394,300 , "Final Office Action", Oct. 1, 2024.
U.S. Appl. No. 17/394,300, "Non-Final Office Action", Apr. 10, 2025, 14 pages.
U.S. Appl. No. 17/952,519, "Non-Final Office Action", Apr. 3, 2025, 12 pages.
U.S. Appl. No. 18/657,055, "Corrected Notice of Allowability", May 15, 2025, 2 pages.
U.S. Appl. No. 18/657,055, "Notice of Allowance", May 1, 2025, 9 pages.
U.S. Appl. No. 17/394,300, "Final Office Action", Sep. 3, 2025, 16 pages.
U.S. Appl. No. 17/394,300 , Non-Final Office Action, Mailed On May 4, 2026, 16 pages.
U.S. Appl. No. 17/952,519 , Notice of Allowance, Mailed On Oct. 27, 2025, 7 pages.
U.S. Appl. No. 17/952,519 , Notice of Allowance, Mailed On Mar. 6, 2026, 7 pages.
U.S. Appl. No. 18/656,456 , Non-Final Office Action, Mailed On Apr. 28, 2026, 17 pages.

* cited by examiner

PORT ADDRESSING VIA PACKET HEADER MODIFICATION

CROSS-REFERENCES TO RELATED APPLICATIONS

This application is a continuation of U.S. application Ser. No. 17/244,723, filed on Apr. 29, 2021, which is incorporated by reference in its entirety for all purposes. This application is related to U.S. Non-Provisional application Ser. No. 17/244,727, filed Apr. 29, 2021, and entitled, "Efficient Flow Management Utilizing Control Packets". The full disclosure of which is incorporated by reference herein in its entirety for all purposes.

BACKGROUND

Cloud services computing systems are often tasked with, among other computing operations, processing packets. For example, packet processing operations may include routing and/or forwarding packets, implementing security list functionality to only forward certain packets, determining rules for subsequent processing of packets for a particular flow, etc. As the amount of network traffic has grown substantially in recent years, modern cloud computing systems often need to process a large number of packets per second. To help process packets efficiently, techniques and/or devices have been utilized to offload some of the processing burden from a server processor (e.g., a central processor unit (CPU)).

For example, some network devices (e.g., smart network interface cards (smartNICs)) may include specialized hardware that is dedicated to performing packet processing, thus helping to relieve the server CPU of at least some packet processing computing tasks. In one example, a smartNIC may include a data plane and a programming data plane. Both planes may coordinate with one another (e.g., via one or more queues) to facilitate the routing and/or forwarding of packets for known traffic flows. For example, a smartNIC may receive and/or transport network traffic via one or more ports, and the smartNIC may maintain one or more queues that are associated with respective ports. However, in cases where a smartNIC may have an increased number of ports (e.g., via utilization of a splitter device), it may be difficult to coordinate between the data plane and the programming data plane to determine which port the packet was received at.

BRIEF SUMMARY

Techniques are provided for efficiently processing a packet received and/or transmitted via a particular port of a network virtualization device (NVD).

In an embodiment, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method. The computer-implemented method also includes receiving, by an accelerator of a smart network interface card, a packet from a first port of a plurality of ports of the smart network interface card, the first port being connected to a splitter device that splits a first data path into a second data path and a third data path that are both associated with the first port, the packet arriving at the first port via the second data path. The method also includes determining, by the accelerator, that the packet was received at the first port via the second data path instead of the third data path. The method also includes modifying, by the accelerator, the packet to indicate that the packet arrived at the first port via the second data path. The method also includes inserting, by the accelerator, the modified packet into a queue of the smart network interface card, the queue being associated with both the second data path and the third data path that are associated with the first port, and the queue interfacing between the accelerator and a programming data plane of the smart network interface card. The method also includes receiving, by the programming data plane, the modified packet from the queue. The method also includes processing, by the programming data plane, the modified packet based at least in part on determining that the packet arrived at the first port of the plurality of ports via the second data path. Other embodiments of this aspect include corresponding computer systems, apparatus, and computer programs recorded on one or more computer storage devices, each configured to perform the actions of the methods.

One general aspect includes a smart network interface card. The smart network interface card also includes a programming data plane may include a first set of one or more processors of a plurality of processors. The card also includes an accelerator may include a second set of one or more processors of the plurality of processors. The card also includes a plurality of ports that are respectively configured to manage ingress and egress of network traffic, the accelerator receiving and/or transmitting network traffic via the plurality of ports. The card also includes a first port of the plurality of ports that is connected to a splitter device, the splitter device splitting a first data path into a second data path and a third data path that are both associated with the first port. The card also includes a queue that interfaces between the accelerator and the programming data plane, the queue being associated with both the second data path and the third data path. The card also includes a memory may include computer-executable instructions that, when executed by one or more of the plurality of processors, cause the smart network interface card to: receive a packet at the first port via the second data path; determine, by the accelerator, that the packet was received at the first port via the second data path instead of the third data path; modify, by the accelerator, the packet to indicate that the packet arrived at the first port via the second data path; insert, by the accelerator, the modified packet into the queue; receive, by the programming data plane, the modified packet from the queue; and process, by the programming data plane, the modified packet based at least in part on determining that the packet arrived at the first port of the plurality of ports via the second data path. Other embodiments of this aspect include corresponding computer systems, apparatus, and computer programs recorded on one or more computer storage devices, each configured to perform the actions of the methods.

One general aspect includes one or more non-transitory computer-readable storage media may include computer-executable instructions that. The one or more non-transitory computer-readable storage media also includes receive, by an accelerator of the smart network interface card, a packet from a first port of the smart network interface card, the first port being connected to a splitter device that splits a first data path into a second data path and a third data path that are both associated with the first port, the packet arriving at the first port via the second data path. The media also includes determine, by the accelerator, that the packet was received at the first port via the second data path instead of the third data path. The media also includes modify, by the accelerator, the packet to indicate that the packet arrived at the first port via the second data path. The media also includes insert, by the accelerator, the modified packet into a queue of the smart network interface card, the queue being associated with both the second data path and the third data path that are associated with the first port, and the queue interfacing between the accelerator and a programming data plane of the smart network interface card. The media also includes receive, by the programming data plane, the modified packet from the queue. The media also includes process, by the programming data plane, the modified packet based at least in part on determining that the packet arrived at the first port via the second data path. Other embodiments of this aspect include corresponding computer systems, apparatus, and computer programs recorded on one or more computer storage devices, each configured to perform the actions of the methods.

DETAILED DESCRIPTION

Figure 1:
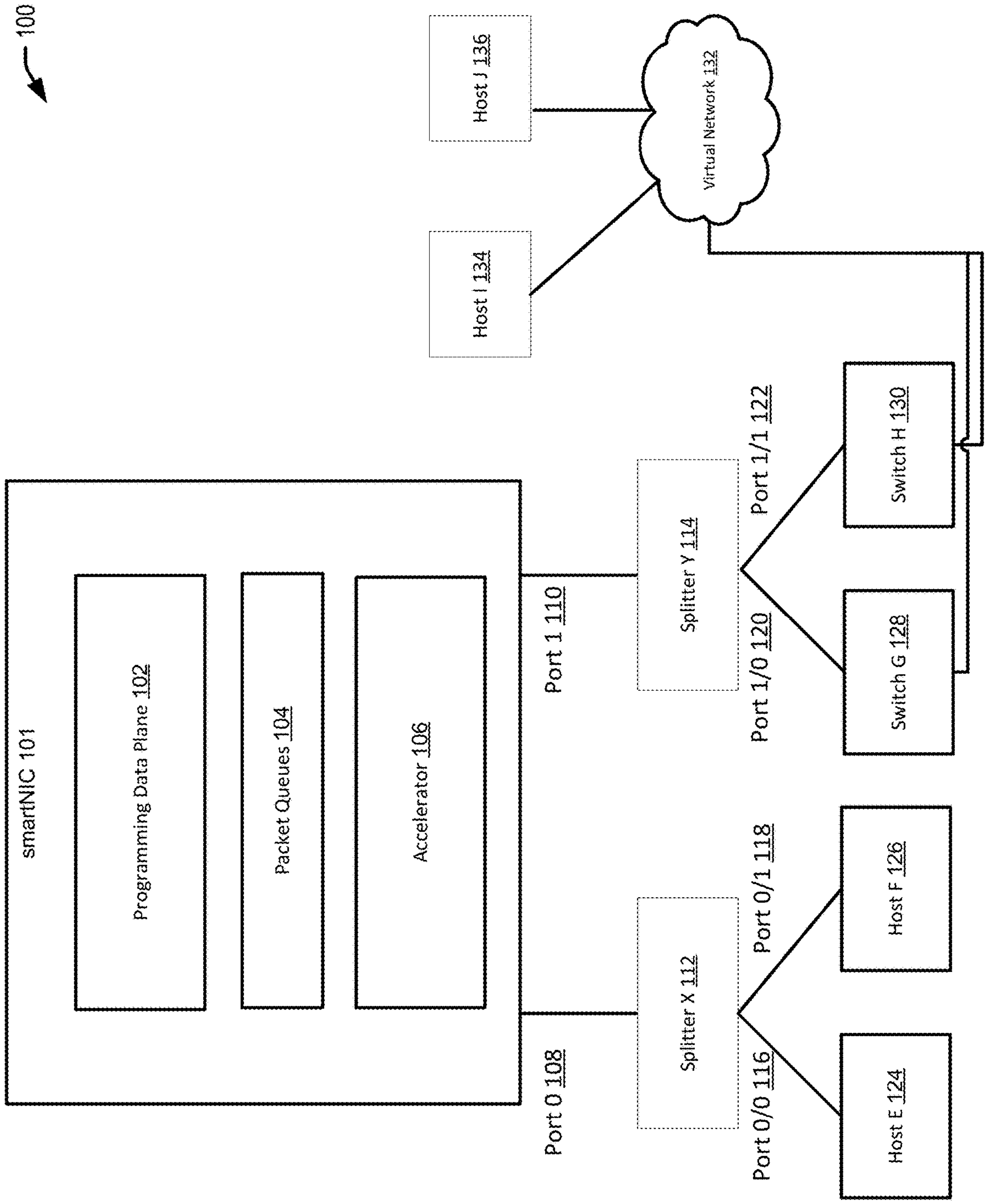
FIG. 1 is a simplified block diagram illustrating an example environment for enabling a network virtualization device (NVD) to efficiently process a packet received and/or transmitted via a particular port of the NVD, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure provide techniques for efficiently processing a packet received and/or transmitted via a particular port of a network virtualization device (NVD). Consider an example in which the NVD corresponds to a smart network interface controller (e.g., or card) (smartNIC) device. The smartNIC device includes a first plane (e.g., which may be referred to herein a "programming data plane" or a "programming plane") and a second plane (e.g., which may be referred to herein as an "accelerator" or a "data plane"). The accelerator is configured to receive packets via one or more ports of the smartNIC, and/or to transfer packets via one or more ports of the smartNIC. In this example, at least a first port of the one or more ports of the smartNIC is connected to a splitter device that splits a first data path (e.g., between the first port and the splitter device) into a second data path and a third data path that respectively branch out from respective splitter ports of the splitter device. In this example, the second data path connects (e.g., via an Ethernet cable) the splitter device to a first device (e.g., a first host device) and the third data path connects the splitter device to a second device (e.g., a second host device).

Continuing with the example above, a packet is received by the smartNIC at the first port of the smartNIC and then routed to the accelerator for processing. The accelerator determines that the packet was received at the first port via the second data path (e.g., from the first host device) instead of the third data path. The accelerator then modifies the packet (e.g., adding a bit-string header to the packet) to indicate that the packet arrived at the first port via the second data path. The accelerator then inserts the modified packet into a particular queue of the smartNIC, whereby the particular queue interfaces between the programming data plane and the accelerator. In this example, the particular queue is configured to handle (e.g., receive for queueing) packets that are received at the first port via either the second data path or the third data path. Subsequently, the programming data plane receives the modified packet from the particular queue. The programming data plane then processes the modified packet based at least in part on determining (e.g., via the bit-string header) that the packet arrived at the first port via the second data path. For example, the programming data plane may determine how to forward the packet based in part on determining that the packet was transmitted to the smartNIC from the first host device instead of the second host device. By modifying the packet to indicate a particular port (e.g., a particular data path via a splitter port) through which the smartNIC receives the packet, techniques described herein enable a smartNIC to more efficiently and reliably operate by maintaining a fewer number of queues, while also accurately processing incoming packets based in part on determining which port (e.g., splitter port) the packet was received at. As described further herein, a similar technique may also be used by the programming data plane when forwarding a packet via the accelerator through one of the ports of the smartNIC.

In an illustrative example, consider a scenario in which a cloud services provider provides a cloud computing service (e.g., infrastructure as a service (IaaS)) that enables customers to, among other things, transmit and/or receive data over a network. The cloud computing service may include one or more host machines, memory resources, and network resources that form a physical network. In this example, a virtual network may be created on top of the physical network by utilizing one or more software virtualization technologies (e.g., including one or more network virtualization devices (NVDs), such as a smartNIC, a top-of-rack (TOR) switch, etc.) to create layers of network abstraction that can be run on top of the physical network. The cloud computing service may be responsible for processing a large amount of network traffic, some of which may be transmitted over the virtual network and may require additional processing steps to handle the traffic. For example, customer traffic may be encapsulated and/or decapsulated to facilitate routing in the virtual network. Accordingly, to facilitate more efficient processing (e.g., streamlining) of the large amount of network traffic, the cloud services provider may determine to offload some tasks of the packet processing pipeline from one or more devices to another one or more other devices. In this example, the cloud services provider may determine that the host machine (e.g., CPU) may process more complex functions such as processing Hypertext Transfer Protocol (HTTP) requests for serving web pages, etc. In the meantime, other tasks may be performed by a smartNIC type of NVD. The smartNIC may correspond to any suitable device (e.g., including hardware and/or software) that may be used to accelerate functionality and offload processing from the host machine (or storage) CPU. Some non-limiting examples of such tasks performed by the smartNIC may include handling encapsulation/decapsulation of packets, handling encryption/decryption of packets, performing security list functions (e.g., maintaining a firewall to block unauthorized traffic), performing packet routing/forwarding functions, etc. It should be understood that any suitable tasks may be performed by the host machine and/or otherwise offloaded to the smartNIC NVD.

In this example, the cloud services provider may determine to further streamline the processing of packet data within the smartNIC itself. As described in an earlier example, the smartNIC may include a programming data plane and a data plane (e.g., an accelerator). The accelerator includes software and/or hardware that is collectively enabled (e.g., optimized) to perform tasks associated with packet routing and/or packet forwarding at high processing rates (e.g., 50, 100, or 200 Gigabits (Gb)/s). The programming data plane also includes software and/or hardware (e.g., including one or more processors) that is collectively enabled to perform tasks associated with packet routing and/or packet forwarding (e.g., tasks similar to those performed by the data plane). Each processor of the programming data plane is also enabled to control the accelerator by programming the accelerator with instructions associated with processing packets that are subsequently received and/or transmitted by the accelerator.

Continuing with the illustration above, the smartNIC may include one or more ports that are respectively configured to receive and/or transmit packets along a data path that is associated with a respective port. For example, the smartNIC may include a first port (which may be alternately referred to as a "host port") and a second port (which may be alternately referred to as a "switch" port). In this example, the host port may be connected to a first splitter device (e.g., an Ethernet splitter) via a first data path that routes data traffic over a physical medium (e.g., an Ethernet cable). The first splitter device may further contain at least two splitter ports, a first splitter port and a second splitter port. In this example, the first splitter port may be connected to a first host machine over a second data path via another Ethernet cable, and the second splitter port may be connected to a second host machine over a third data path via yet another Ethernet cable. Accordingly, in one example, virtual network traffic (e.g., a first data packet associated with a particular virtual local area network (VLAN) of the virtual network) may flow from the first host machine (e.g., from a virtual host machine instance operating on the bare-metal first host machine) via the second data path to the first splitter port of the first splitter device. The first data packet may then further be routed to the first port of the smartNIC over the first data path. Meanwhile, different virtual network traffic (e.g., a second data packet associated with a different VLAN of the virtual network) may flow from the second host machine via the third data path to the second splitter port of the first splitter device. The second data packet may then further be routed to the first port of the smartNIC over the first data path. It should be understood that, in this example, while the first data packet and the second data packet are respectively received via different splitter ports of the splitter device, the packets are both received by the smartNIC at the same first port. It should also be under that data traffic may flow in either direction via one or more of these data paths.

Upon the smartNIC receiving the first data packet at the first port, the accelerator may receive the packet from the first port for processing. As described herein, the accelerator may determine that the first data packet was transmitted to the first port of the smartNIC via the first splitter port (e.g., the second data path). The accelerator may then modify the first data packet by adding a bit-string header to indicate that the first data packet was received at the first splitter port (e.g., being transmitted to the smartNIC from the first host machine). The accelerator may then insert the modified packet into a queue of the smartNIC.

The queue may be one of a plurality of queues that interface between the accelerator and the programming data plane of the smartNIC. The queues may serve to facilitate the transmission of packets to and/or from the different planes of the smartNIC. In this example, as described above, suppose that the smartNIC includes two physical ports (e.g., the first port and the second port, physically native to the smartNIC), each connected to respective splitter devices, thus enabling network traffic to be transmitted to/from the smartNIC via the four splitter ports. Also, in this example, the programming data plane of the smartNIC further includes four central processing units (CPUs). Each processor may be associated with (e.g., assigned to) one queue per physical port, and each queue may include a transmission (Tx) queue and a reception (Rx) queue (e.g., which may be also referred to herein as "sub-queues"). Thus, a first processor may be assigned to a first queue for the first port and also assigned to a second queue for the second port, a second processor may be assigned a third queue for the first port and also and a fourth queue for the second port, and so on. Accordingly, there may be eight queues (e.g., including sixteen sub-queues, corresponding to eight Rx queues and eight Tx queues). It should be understood that, in this example, even though the number splitter ports is four (e.g., double the number of physical ports of the smartNIC), the total number of queues maintained by the smartNIC may remain eight (e.g., including sixteen sub-queues), instead of doubling to sixteen queues (e.g., which would otherwise correspond to thirty-two sub-queues).

Continuing with the example above, suppose that the queue in which the first data packet is inserted is the first queue (e.g., the reception (Rx) queue of the first queue) assigned to the first processor. The first processor of the programming data plane subsequently receives (e.g., retrieves) the modified packet from the first queue, and analyzes the modified packet to identify the bit-string. The first processor thereby identifies that the first data packet was originally transmitted from the first host machine to the smartNIC via the second data path (e.g., utilizing the first splitter port of the first splitter device). The first processor may also identify other information in the packet, including, for example, a VLAN tag (e.g., associated with a particular VLAN), a five-tuple header (e.g., which may be used to identify flow information), etc. The first processor may then process the packet based at least in part on the information obtained from the modified packet. For example, the first processor may determine instructions for routing the packet based in part on determining that the packet is associated with a particular customer account (e.g., associated with the particular VLAN) that operates a computing instance on the first host machine. It should be understood that the first processor of the programming data plane may determine that the packet arrived at the first port from the first host machine via the second data path (e.g., instead of the second host machine via the third data path) based in part on the information included (e.g., injected) into the modified packet, rather than maintaining an additional queuing apparatus to determine this information. Likewise, the first processor may similarly process the second data packet, transmitted to the smartNIC from the second host machine, based in part on retrieving the modified second data packet from the first queue (e.g., the same queue that queued the modified first data packet) and obtaining information from the modified packet indicating that the second data packet arrived at the first port via the third data path from the second host machine.

In another illustrative example, utilizing a similar smartNIC as described above, the smartNIC may determine which port (e.g., which splitter port and/or associated data path) to route a particular packet. For example, suppose that the programming data plane determines to transmit a packet to a particular computing device (e.g., a particular host machine) via the switch port of the smartNIC. Similar to as described above (e.g., in reference to the host port), suppose that the switch port is split by a second splitter device into a third splitter port and a fourth splitter port. The third splitter port is connected to a first switch and the fourth splitter port is connected to a second switch. Both the first switch and the second switch may be operable for routing packets over the virtual network. In this example, the first processor of the programming data plane may generate a hash (e.g., based in part on a five-tuple header of the particular packet). Then, based in part on the hash value, the first processor may determine to route the packet to the first switch via the third splitter port instead of routing to the second switch via the fourth splitter port. For example, the first processor may execute a load-balancing algorithm to determine which switch to route the packet towards. In this example, the first processor may modify the packet (e.g., similar to as described above) and insert the modified packet into a transmission (Tx) queue of the first queue. The accelerator may subsequently receive the modified packet from the first queue, analyze the modified packet to determine an instruction indicating the particular splitter port in which to route the packet (e.g., the third splitter port), and then transmit the packet from the switch port to the second splitter device, for subsequent transmission via the third splitter port to the first switch. It should be understood that, similar to as described above, a packet tagging (e.g., and/or header injection) mechanism may be used to facilitate communication between the planes regarding routing of a packet via a particular port. This routing mechanism may still be utilized when new ports (e.g., splitter ports) are used to route packets, while maintaining a similar (e.g., same) number of existing queues (e.g., without adding new queues to match the increased number of ports).

It should be understood that any suitable combination of techniques and/or devices described herein may be used to process packets received by and/or transmitted from the smartNIC. For example, although an earlier illustration above described a technique for receiving packets via a host port that is connected to one or more splitter ports, a similar technique may also be utilized for receiving and processing packets received at a switch port that is also connected to one or more splitter ports. In another example, a similar technique as described above (e.g., with respect to transmitting a packet via a switch port based in part on computing a hash) may be used for transmitting packets via a host port, as appropriate.

Embodiments of the present disclosure provide several technical advantages over conventional systems. For example, techniques described herein improve the reliability and efficiency of existing network virtualization devices. In one example, techniques described herein provide a mechanism for efficiently processing a packet by an NVD at least in part by modifying a packet to indicate a particular port (e.g., a particular data path) via which the packet was received (e.g., which may be used to determine a particular customer account associated with the packet and/or how to route the packet). This packet modification mechanism may enable an NVD to utilize an existing packet queueing apparatus (e.g., obviating a need to add/maintain more queues), even as more ports may be connected to (e.g., and/or included within) the NVD to be used for transmitting/receiving packets. For example, in an NVD with multiple processors in the programming data plane, each processor may retain a one-queue-per-physical port association, even if additional splitter ports are subsequently connected to the physical ports. Thus, the NVD may more efficiently process packets via multiple ports without maintaining (e.g., and/or adding) additional queues in a memory of the NVD. Additionally, the reliability of the hardware and/or software of the NVD may be increased, at least in part by simplifying the complexity of the NVD (e.g., maintaining fewer queues, and using an existing packet processing mechanism to route packets). It should also be understood that additional devices (e.g., host computers) may be connected to the NVD via utilization of the one or more port splitters, while maintaining a high efficiency of processing packets received from the host computers (and/or the VLANs associated with each host computer).

In another example, techniques described herein may further improve the efficiency and/or reliability by which an NVD may route network traffic. For example, as described herein, the NVD may be connected to one or more switches via respective ports (e.g., splitter ports connected to a switch port via a splitter device). The NVD may determine which switch to route a packet, which may help to facilitate efficient load-balancing of routing traffic via different switches. This technique may also improve reliability. For example, two splitter ports could be connected to the same switch, thus enabling port redundancy. In case one of the ports is unavailable, and the NVD may re-route the traffic via another port. The packet modification mechanism described herein may further enable this improved routing of packets by the NVD without requiring additional queues per port. For example, the programming data plane may determine (e.g., executing a load-balancing algorithm) which switch a packet should be routed towards, modify the packet with a corresponding instruction, insert the modified packet into a transmission queue, and whereby the accelerator subsequently receives and analyzes the modified packet to determine a particular port (e.g., and/or splitter port) for routing the packet.

For clarity of illustration, embodiments described herein may typically refer to an accelerator (e.g., a data plane) of a smartNIC that interfaces with a programming data plane of the smartNIC via one or more packet queues. However, embodiments should not be construed to be so limited. For example, any suitable NVD that enables transmission of packets via one or more queues between a plurality of planes of the NVD may be utilized to perform techniques described herein. Additionally, embodiments described herein may typically refer to an increase in the number of ports (e.g., host ports and/or switch ports) available to an NVD via one or more splitter devices. However, embodiments should not be construed to be so limited. For example, techniques described herein may be employed whereby a port-to-queue (and/or processor) ratio may greater than a one-to-one ratio (e.g., two physical ports of the smartNIC associated with a queue, three physical ports of the smartNIC associated with a queue, etc.). In these cases, techniques enable a data plane simplification by modifying packets with additional information (e.g., port information) that enables the NVD (e.g., the accelerator) to map a plurality of ports to a particular queue, while still enabling the programming data plane to determine which port the packet was initially received at. Also, it should be understood that, in the case where a splitter device is utilized, the splitter device may be a component of (and/or physically attached to) the NVD.

FIG. 1 is a simplified block diagram illustrating an example environment for enabling a network virtualization device (NVD) to efficiently process a packet received and/or transmitted via a particular port of the NVD, according to some embodiments. In the diagram 100 of FIG. 1, a smartNIC 101 type of NVD is depicted. The smartNIC 101 may correspond to any suitable network virtualization device (NVD) that offloads processing tasks (e.g., network processing tasks) from a computing device (e.g., host E 124 and/or host F 126). As described further herein, an NVD may correspond to a device that implements a network virtualization technology, including, for example, a smartNIC, a top-of-rack (TOR) switch, a smart TOR switch, etc. The smartNIC 101 includes, among other elements, a programming data plane 102, one or more packet queues 104, an accelerator 106, and two physical ports: port 0 108 and port 1 110.

Turning to the elements of the smartNIC 101 in further detail, in some embodiments, the programming data plane 102 and the accelerator 106 (e.g., operating as a data plane) may respectively configured to perform specialized roles within the smartNIC 101. For example, the accelerator 106 may be tasked with efficiently processing (e.g., routing and/or forwarding) packets. In some embodiments, for example, in the case of processing packets within a virtual network environment, the accelerator 106 may also be responsible for encapsulation and decapsulation of packets to facilitate forwarding or routing in the virtual network. Meanwhile, the programming data plane 102 may be responsible for, among other things, determining (e.g., programming) instructions for the accelerator 106 to process future packets associated with a flow. For example, the programming data plane 102 may determine if a new packet (e.g., part of a new flow) may be allowed, and, if so, may program the accelerator 106 to forward subsequent packets associated with this flow to an intended destination host. For example, the programming data plane 102 may instruct the accelerator 106 to add this flow to an accelerator cache. Subsequent packets associated with this newly allowed flow may thereby not need to be processed by the programming data plane 102, and, instead may be more efficiently processed by the accelerator 106 that is optimized for efficient encapsulation/decapsulation and/or routing/forwarding of packets. In this way, while the programming data plane 102 may itself be enabled to process packets (e.g., with similar features as the accelerator 106), the programming data plane 102 may also offload tasks from the accelerator 106 so that the accelerator 106 may be optimized for more efficient performance of packet processing tasks (e.g., forwarding and/or routing of packets for known flows).

Figure 2:
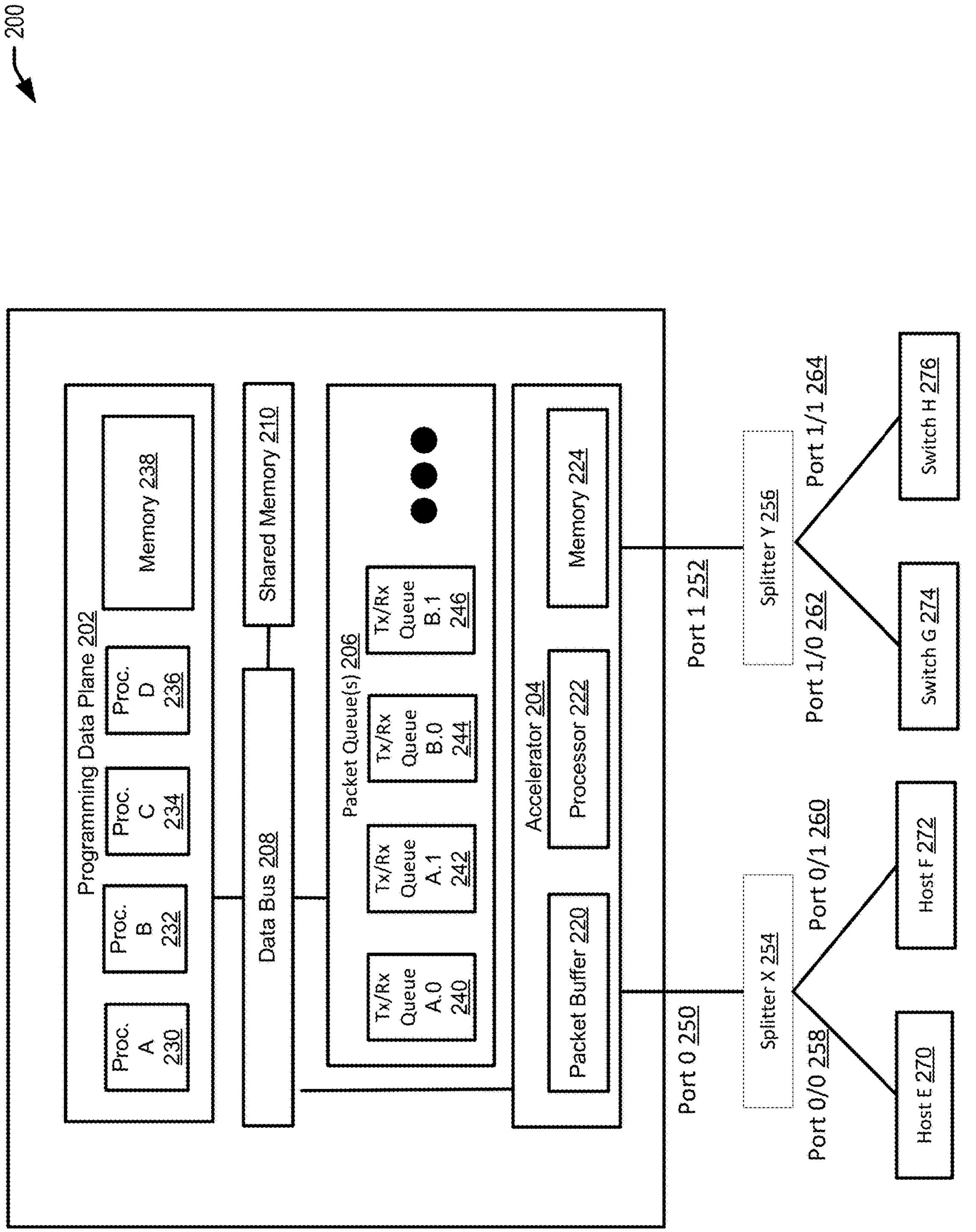
FIG. 2 is another simplified block diagram illustrating an example architecture of an NVD, according to some embodiments.

In some embodiments, as illustrated further with respect to FIG. 2, the smartNIC 101 may also include one or more packet queues 104 that interface between the accelerator 106 and the programming data plane 102. For example, in some embodiments, each processor of one or more processors of the programming data plane 102 may be associated with at least one queue per smartNIC port (e.g., port 0 108, port 1 110). In some embodiments, the one or more packet queues 104 may be a component of the accelerator 106 or the programming data plane 102. In some embodiments, the packet queues 104 may be a separate component within the smartNIC 101. In any case, the packet queues 104 may operate as an interface between the accelerator 106 and the programming data plane 102, whereby packet data (e.g., data packets and/or control packets) may be efficiently routed between the planes. In some embodiments, in part because there may be multiple processors of the programming data plane 102, with one or more corresponding packet queues per processor, the smartNIC 101 may be able to efficiently process (e.g., in parallel) a large number of packets per second (e.g., 100 Gigabits/second, 200 Gigabits/second, etc.). For example, as described further herein, the smartNIC 101 (e.g., via the programming data plane 102) may be able to efficiently process new flows to be managed by the accelerator 106, and/or efficiently perform control tasks for existing approved flows.

Turning to the ports of the smartNIC 101 in further detail, port 0 108 is connected to a first splitter device X 112 over a first data path via a communication channel (e.g., an Ethernet cable). The first splitter device X 112 includes a first splitter port 0/0 116 and a second splitter port 0/1 118.

As a representative example, the nomenclature "0/0" for the first splitter port 0/0 116 may indicate that this is a first splitter port (e.g., port 0 of the first splitter device X 112) that partially enables splitting port 0 108 of the smartNIC 101 into one of two data paths. In this case, the first splitter port 0/0 116 and the second splitter port 0/1, respectively, enable the first data path (e.g., from port 0 108 of the smartNIC 101 to the first splitter device X 112) to be split into a second data path and a third data path. The first splitter port 0/0 116 is connected to a host E 124 over the second data path (e.g., via a communication channel such as an Ethernet cable), and the second splitter port 0/1 118 is connected to a host F 126 over the third data path. Although embodiments described herein may typically refer to computing devices being connected via Ethernet cables, it should be understood that any suitable communication channel and/or medium (e.g., a physical medium or wireless medium) may be used to connect any one or more computing devices.

Port 1 110 of the smartNIC 101 is connected to second splitter device Y 114 over a fourth data path via another communication channel. In this case, the second splitter device Y 114 includes a third splitter port 1/0 120 and a fourth splitter port 1/1 122 (e.g., utilizing a similar nomenclature, as described herein). The third splitter port 1/0/120 and the fourth splitter port 1/1 122, respectively, enable the fourth data path (e.g., from port 1 110 of the smartNIC 101 to the second splitter device Y 114) to be split into a fifth data path and a sixth data path. The third splitter port 1/0 120 is connected to a switch G 128 via the fifth data path, and the fourth splitter port 1/1 122 is connected to a switch H 130 via the sixth data path.

As described herein, port 0 108 may sometimes otherwise be referred to as a "host" port (e.g., being connected to one or more host machines). Likewise, port 1 110 may sometimes otherwise be referred to as a "switch" port (e.g., being connected to one or more switch devices).

Turning to the connections of the smartNIC 101 to host machines and/or switches in further detail, the host port 0 108 of smartNIC 101 may be connected (e.g., via the first splitter device X 112) to host E 124 and host F 126. Each of these hosts may respectively be physical computers, similar to as described further herein (e.g., with reference to FIG. 17). The physical computer may include physical resources (e.g., memory, a CPU, a Network Interface Card (NIC), etc.). In some embodiments, as described further herein, host E 124, as a representative example host computer, may execute a hypervisor, whereby one or more compute instances may be created, executed, and managed on the host E 124 by the hypervisor. In some embodiments, host E 124 may be associated with a cloud services provider (CSP), for example, as part of a CSP infrastructure (CSPI), as described further herein. For example, the host E 124 may be a computing resource in a data center of the CSPI. The host E 124 may communicate with other resources within the CSPI (e.g., the first splitter device X 112, the smartNIC 101, etc.) via a NIC of the host E 124. The NIC may be any suitable NIC that connects the host E 124 to the computer network (e.g., a physical network and/or a virtual network that is overlaid on the physical network). In the illustration of FIG. 1, the host E 124 may communicate, for example, with any one or more of the hosts connected to the virtual network 132 (e.g., representative example hosts F 126, host I 134, and/or host J 136). Note that, as host E 124 may also operate one or more compute instances, in some embodiments, a compute instance of host E 124 may communicate with another compute instance operating on host E 124 (e.g., via the smartNIC 101). It should be understood that the host devices depicted in FIG. 1 are representative computing devices, and that the CSPI may contain any suitable number of physical computing devices and/or compute instances (e.g., within a single physical computing device). Any one or more of these devices and/or compute instances may be in communication with other devices and/or compute instances over the physical network and/or the virtual network 132 that is overlaid on the physical network, as described further herein.

In some embodiments, packet data that is transmitted from and/or received by a particular host (and/or compute instance executing on the particular host) may be labeled with a Virtual Local Area Network (VLAN) tag, described further herein. In some embodiments, the VLAN tag may be used, for example, to identify which VLAN a particular packet belongs, thus enabling the smartNIC (and other computing resources of the CSPI) to support virtual network routing. In some embodiments, a particular flow and/or customer identifier (e.g., of a particular customer account of the CSPI) may be identified at least in part based on a VLAN tag within a packet and/or a five-tuple of the packet. In some embodiments, any one or more fields of the packet headers and/or payload data of the packet may be associated with flow information that may be used to identify a particular flow and/or customer identifier associated with a given packet.

As described herein, the smartNIC 101 may also be connected (e.g., via the second splitter device Y 114) to switch G 128 and switch H 130. In some embodiments, a switch device may be any suitable computing device that connects devices on a computer network by using packet switching to receive and forward data to a destination device. For example, the second splitter device Y 114 may be connected, via respective Ethernet cables, to both switch G 128 and switch H 130. Each of the respective switches may route traffic received from the smartNIC 101 to the appropriate destination device (e.g., over the virtual network 132), such as host I 134 or host J 136. Conversely, the switches may route traffic received from the virtual network 132 to the smartNIC 101, whereby the smartNIC 101 may route the traffic to the appropriate host (e.g., either host E 124 or host F 126), as described further herein.

In an illustrative example, consider a scenario in which a first compute instance operating on the host E 124 transmits a first packet with a VLAN tag of "1" to host port 0 108 of the smartNIC 101 via the first splitter port 0/0 116. Suppose also that a second compute instance operating on the host F 126 transmits a second packet, also with a VLAN tag of "1," to host port 0 108 of the smartNIC 101 via the second splitter port 0/1/118. As described herein, the VLAN tag value (e.g., "1") within the first packet may correspond to a particular customer identifier (e.g., a customer's VLAN identifier) for the particular VLAN associated with the host E 124. Meanwhile, the same tag value (e.g., "1") within the second packet may correspond to another particular (e.g., different) customer for the particular VLAN associated with host F 126. In some embodiments, each network (e.g., Ethernet network) may support up to 4,096 (or any suitable number) of VLANs, or as otherwise specified by the Institute of Electrical and Electronics Engineers (IEEE) 802.1Q standard. Note that in this case, based at least in part on the use of the first splitter device X 112, a different host may be connected to each splitter port. Thus, in this example, although both the first packet and the second packet use the same VLAN tag value, they nevertheless may correspond to different customers and/or compute instances (e.g., from different host machines). Accordingly, as described further herein, a mechanism may be used by the smartNIC 101 to further identify (e.g., disambiguate) which host (e.g., and/or the particular customer) a packet is transmitted from, even though both the first packet and the second packet are both received at port 0 108 of the smartNIC 101 from the first splitter device X 112 via the first data path. In some embodiments, the smartNIC 101 may determine instructions for processing (e.g., routing) the first packet and the second packet based at least in part on determining which host the respective packets were received from.

In some embodiments, to determine which host a particular packet is received from, the smartNIC 101 may modify the particular packet. For example, as described further herein, and, using the case of the first packet as a representative example, the accelerator 106 may receive the first packet that arrived at port 0 108. The accelerator 106 may determine that the first packet was received from host E 124 via the second data path at the first splitter port 0/0 116, and then subsequently transmitted by the first splitter device X 112 to the host port 0 108. Accordingly, the accelerator 106 may modify the first packet to indicate that the first packet arrived at the host port 0 108 via the second data path (e.g., at the first splitter port 0/0 116 from host E 124). For example, the accelerator 106 may prepend or append a header (e.g., including a bit-string) to the first packet to generate a modified packet. The bit-string may include information (e.g., "0/0") that indicates that the first packet arrived via the second data path at the first splitter port 0/0 116, and/or any other suitable information that may be used to determine the source endpoint of the first data packet. The accelerator 106 may then insert the modified packet into a particular queue (e.g., a reception (Rx) queue) of the packet queues 104. In this example, the particular queue may be associated with both the second data path (e.g., and/or the first splitter port 0/0 116) and the third data path (e.g., and/or the second splitter port 0/1 118). Note that the second data path and the third data path are also both associated with the host port 0 108. It should be understood that the particular queue may include (e.g., handle) modified packets that are received from either the second data path or the third data path (e.g., and/or both data paths). Accordingly, a fewer number of queues (e.g., than the number of associated ports) may be utilized to handle packets received at the various associated ports. In this example, one queue may be utilized to handle packets received at two ports. In some embodiments, any suitable port-to-queue ratio may be utilized that is greater than a one-to-one ratio, based at least in part on utilizing a modified packet mechanism to indicate which port (e.g., and/or which splitter port) a packet was received at. This may simplify the data plane (e.g., the accelerator 106) and/or increase reliability of the smartNIC 101, while also maintaining a high level of efficiency to process packets.

Subsequent to the accelerator 106 queuing the modified packet, a processor of the programming data plane 102 may receive the de-queued modified packet. As described further herein (e.g., with respect to FIG. 2), the processor may be associated with the particular (e.g., reception) queue that is further associated with the first splitter port 0/0 116 and the second splitter port 0/1 118. The processor may determine, based in part on analyzing at least the bit-string in the modified packet, that the first packet was received from the host E 124 via the second data path at the first splitter port 0/0 116, and then subsequently received at the host port 0 108 of the smartNIC 101. Accordingly, the processor may route the first packet based at least in part on identifying a source (e.g., host E 124 and/or the first splitter port 0/0 116) of the first packet. As described herein, the processor may also utilize other information in the packet to determine flow information and/or customer information. For example, the processor may determine a particular customer account associated with the first packet based at least in part on the VLAN tag and/or the bit-string that identifies the particular port the first packet was received at. The processor may also determine a particular flow associated with the customer account based at least in part on a five-tuple identified within the first packet. Any suitable packet header and/or payload information may be utilized to process the packet.

In another example, techniques described herein may further be used to determine how to process (e.g., route packets). For example, as described further herein (e.g., with respect to FIG. 5), a particular processor of the programming data plane 102 may determine (e.g., based on executing a load-balancing algorithm) which data path to route a particular packet. In one example, the programming data plane 102 may determine to send a second packet to host J 136 via the third splitter port 1/0 120 of the second splitter device Y 114 over the virtual network 132. In this example, the particular processor of the programming data plane 102 may determine that the second packet should be transmitted via the third splitter port 1/0 120 over the fifth data path to switch G 128 instead of switch H 130, for example, based in part on the load-balancing algorithm (e.g., to balance network traffic between the two switches). In some embodiments, described further herein, the load-balancing algorithm may compute a hash based in part on the splitter port information (e.g., which may be represented within a bit-string, as described herein). The hash may also (and/or alternatively) be computed based on any suitable information, for example, including a five-tuple header obtained from the second packet. Accordingly, the third splitter port 1/0 120 may be selected based at least in part on the computed hash. For example, hash values below a certain value may be routed to the third splitter port 1/0 120, while hash values above a certain value may be routed to the fourth splitter port 1/1 122. It should be understood that any suitable load-balancing algorithm may be utilized (e.g., dividing a hash value by two and then mapping the resulting value to one of two ports), for example, depending on the number of ports. Upon selecting the splitter port through which the second packet should be transmitted, the particular processor of the programming data plane 102 may modify the second packet with a bit-string include port information, and then insert the modified packet into a queue (e.g., a transmission (Tx) queue). As described herein, the queue may be associated with the particular processor and also associated with both the third splitter port 1/0 120 and the fourth splitter port 1/1 122 (e.g., and/or the respective data paths for each splitter port). Similar to as described above (e.g., concerning the reverse direction), it should be understood that this packet modification mechanism may enable the accelerator 106 to retrieve the modified second packet and determine how to route the packet. In this example, the accelerator 106 may cause the second packet to be transmitted from the switch port 1 110 over the fourth data path to the second splitter device Y 114, and then subsequently be transmitted from the third splitter port 1/0 120 via the fifth data path to switch G 128 (e.g., instead of the sixth data path via the fourth splitter port 1/1 122 to switch H 130).

It should be understood that the examples above are representative (e.g., non-limiting) examples of utilizing a packet modification mechanism to facilitate processing of packets received by the smartNIC 101 and/or processing of packets being transmitted (e.g., routed) by the smartNIC 101. For example, a similar technique may be used to process a packet received by the smartNIC 101 at the switch port 1 110 and/or routed to the appropriate host via the host port 0 108 (e.g., host E 124 or host F 126). For example, in the case of routing the packet to the appropriate host, the programming data plane 102 may modify a packet with a bit-string (e.g., corresponding to the appropriate port) and then insert the modified packet into a queue for subsequent transmission to the appropriate host by the accelerator 106.

Although FIG. 1 depicts a smartNIC type of NVD with two physical ports that are respectively connected to two splitter devices, and whereby the two splitter devices are respectively connected to two computing devices (e.g., two host devices and/or two switch devices), embodiments should not be construed to be so limited. For example, instead of the splitter devices being external to the smartNIC 101, the smartNIC 101 may contain more than one host port (e.g., two host ports, three host ports, etc.) and/or more than one switch port (e.g., two switch ports, three switch ports, etc.) that are components of the smartNIC 101. In this case, techniques described herein (e.g., utilizing modified packets with port information) may also be used to maintain a fewer number of queues relative to the number of ports of the smartNIC 101, while still enabling the smartNIC 101 to process packets (e.g., for transmission and/or reception) based at least in part on the port information. In some embodiments, the ratio of queues to processors (e.g., programming data plane processors) and/or ports may be any suitable ratio. For example, in some cases, it may be efficient to maintain a one-to-one ratio between processors, queues, and physical ports of the smartNIC (e.g., to enable efficient parallel processing of packets and/or load balancing). In some embodiments, for example, if splitter ports augment the number of ports available, the ratio between processors, queues, and physical ports may remain the same (e.g., for each processor, one queue per physical port), while the smartNIC may still route packets based on the split port information (e.g., utilizing the packet modification techniques described herein).

It should also be understood that, although FIG. 1 depicts the first splitter device X 112 as being connected to two different hosts (e.g., host E 124 and host F 126), embodiments should not be construed to be so limited. For example, in some embodiments, the first splitter device X 112 may be connected to the same host via both splitter ports. For example, the first splitter port 0/0 116 may be connected to host E 124 and the second splitter port 0/1 118 may also be connected to host E 124. This setup may be used, for example, if the host E 124 may contain at least two NICs, whereby each NIC may connect (e.g., via an Ethernet cable) to a respective port on the first splitter device X 112. In another example, the second splitter device Y 114 may be connected to the same switch device via both splitter ports. For example, the third splitter port 1/0 120 and the fourth splitter port 1/1 122 may both be connected to switch G 128. In some cases, this setup may be used to provide extra port redundancy, in case a particular port is unavailable or otherwise less optimal for transmitting a packet than another port. In some embodiments, the hashing mechanism described above may also be used to redirect flow traffic from one switch to another, for example, if one of the switches is taken offline or otherwise unavailable. For example, the programming data plane 102 may compute a new hash for a particular flow based on new port information (e.g., generating a new bit-string utilizing port information associated with the alternative port that remains available, or is otherwise preferred for transmitting the packet). In some embodiments, the programming data plane 102 may update a cache entry for the particular flow, such that subsequent packets associated with the particular flow are consistently routed through the alternate (e.g., substitute) port. In some embodiments, the programming data plane 102 may instruct the accelerator 106 to transmit subsequent packets via the alternate port based at least in part on utilizing a similar packet modification mechanism, as described herein. In some embodiments, utilizing two different cables to connect to the same switch (or different switches) may also provide additional bandwidth utilization, depending, for example, on the respective bandwidth capacities of the endpoints (e.g., the smartNIC port and/or the switch(es) port).

FIG. 2 is another simplified block diagram illustrating an example architecture of an NVD, according to some embodiments. In FIG. 2, a smartNIC 200 type of NVD is illustrated. The smartNIC 200 includes several elements, a programming data plane 202, an accelerator 204, one or more packet queues 206, a data bus 208, a shared memory 210, two physical ports (e.g., port 0 250 and port 1 252). In FIG. 2, both of the physical ports are respectively connected to a splitter device, and the respective splitter devices are each connected to two computing devices. In some embodiments, the connections between the ports of the smartNIC 200 (e.g., port 0 250, port 1 252), the splitter devices (e.g., a first splitter device X 254 and a second splitter device Y 256), and the computing devices connected to the respective splitter devices (e.g., a host computer E 270, a host computer F 272, a switch device G 274, and a switch device H 276) may be configured similarly to as described with respect to similar devices of FIG. 1. For example, port 0 250 may be a host port and port 1 252 may be a switch port. Also, similar to as described with respect to FIG. 1, it should be understood that any suitable arrangement and/or number of ports, splitter devices, and/or connected computing devices (e.g., hosts, switches) may be utilized to perform techniques described herein. For example, the smartNIC 200 may include more than two physical ports and/or be connected to more than two splitter devices. It should be understood that any of the one or more ports of the smartNIC 200 (and/or ports of splitter devices) may be configured to transmit and/or receive network traffic. Techniques described herein, for example, with respect to modifying a packet to indicate which port (e.g., physical port and/or splitter port) the packet was received at, may utilized in regards to various configurations.

Turning to the accelerator 204 in further detail, the accelerator 204 may include one or more hardware and/or software components. For example, at depicted in FIG. 2, the accelerator 204 may include a packet buffer 220, one or more processors 222, and a memory 224. In some embodiments, a packet may be received at a port of the smartNIC 200 (e.g., port 0 250), and then be transmitted to the packet buffer 220. In some embodiments, the packet buffer 220 itself may include memory (e.g., dynamic random access memory (DRAM), static random access memory (SRAM), etc.) and/or one or more processors. The packet buffer 220 may queue packets (e.g., utilizing one or more queues allocated in the memory) that are received from one or more ports of the smartNIC 200 for further processing by the accelerator 204, described further herein. The packet buffer 220 memory may also queue packets that have been processed (e.g., by the accelerator 204 and/or the programming data plane 202), and are ready to be routed to another computing device. For example, the packet buffer 220 may queue packets that are ready for transmission to either host E 270 of FIG. 1 or to switch G 274 (e.g., for further routing to another host connected to the virtual network 132 of FIG. 1). In some embodiments, the packet buffer 220 may execute a traffic manager process that coordinates (e.g., including load-balancing) queueing and/or de-queueing packets that are processed by the accelerator 204 and/or the programming data plane 202.

In some embodiments, the accelerator 204 may process a packet (e.g., a data packet) based in part on whether the data packet is associated with a known (e.g., allowed) flow. If the packet is associated with an allowed flow, the accelerator 204 may process the packet based on instructions already provided (e.g., programmed) to the accelerator 204 (e.g., by the programming data plane 202). For example, the accelerator 204 may perform a look-up into a cache of the accelerator 204, utilizing one or more data elements (e.g., header fields) of the data packet. For example, as described further herein, the accelerator 204 may generate a hash based on data elements (e.g., fields) of a packet. In some embodiments the hash may also be generated based on an identifier of which port (e.g., and/or which splitter port) the packet was received at, which may be used to determine a customer identifier associated with the particular flow. Upon generating the hash, the accelerator 204 may use the hash to perform a look up into the cache of the accelerator. If a corresponding cache entry is located, then the accelerator 204 may determine that this data packet is associated with an already allowed flow, and may process the packet accordingly. For example, the accelerator 204 may forward the packet to another host. (e.g., via one of the smartNIC ports). If the accelerator 204 does not locate a corresponding cache entry based on the hash, the accelerator 204 may forward the data packet to the programming data plane 202. In this case, the programming data plane 202 may determine how to process the particular data packet (e.g., forward the packet, drop the packet, log the packet, etc.) and/or whether a flow (e.g., subsequent packets) that is associated with the particular data packet will be added to an accelerator cache as an allowed flow. If the flow is to be allowed, the programming data plane 202 may program the accelerator 204 with instructions for processing subsequent packets associated with the flow. For example, the programming data plane 202 may cause the accelerator 204 to add a new cache entry to the accelerator cache. In some embodiments, as described further herein, the programming data plane 202 may program the accelerator 204 (e.g., to add a cache entry) based in part on invoking an Application Programming Interface (API) via the shared memory 210 and/or transmitting a control packet (e.g., via the data bus 208) including instructions for processing the data packet and/or associated flow.

To further illustrate elements of the smartNIC 200, consider an illustrative example in which the accelerator 204 determines that a recently received data packet is not associated with a flow already managed by the accelerator 204. Accordingly, the accelerator 204 may determine to request further instructions from the programming data plane 202. The accelerator 204 may then input the data packet into a packet queue of the packet queues 206. In this example, the packet queues 206 may correspond to a plurality of packet queues. In some embodiments, the packet queues 206 may, collectively, be a component of the accelerator 204. In some embodiments, the packet queues 206 may be a separate component from the accelerator 204. In any case, the packet queues 206 may operate as an interface between the accelerator 204 and the programming data plane 202, whereby packet data (e.g., data packets and/or control packets) may be efficiently routed between the planes.

In the illustration above, the accelerator 204 may determine to input the data packet into a reception (Rx) queue (e.g., sub-queue) of the Tx/Rx queue A.0 240, whereby Tx/Rx queue A.0 240 is one of the packet queues 206. In this illustration, the Tx/Rx queue A.0 240 may include two sub-queues, including a transmission (Tx) queue and a reception (Rx) queue. The Tx/Rx queue A.0 240 may be associated with a processor A 230 of the programming data plane 202, as well as host port 0 250 of the smartNIC 200 (e.g., with the nomenclature 'A.0' signifying the association of the queue A.0 with processor A 230 and host port 0 250). In the illustration of the smartNIC 200 depicted in FIG. 2, each processor of the programming data plane 202 (e.g., which may include a plurality of processors, described further herein) may be assigned to one queue (e.g., that includes two Rx/Tx sub-queues) per physical port. Thus, processor A 230 may be associated with Tx/Rx queue A.0 204 (e.g., corresponding to host port 0 250) and Tx/Rx queue A.1 242 (corresponding to switch port 1 252). Processor B 232 of the programming data plane 202 may be associated with Tx/Rx queue B.0 244 (e.g., corresponding to host port 0 250) and Tx/Rx queue B.1 246 (e.g., corresponding to switch port 1 246), and so on, in regards to processor C 234 and processor D 236 of the programming data plane 202. Thus, in this example, there may eight queues for the four processors, whereby each queue includes two sub-queues (e.g., totaling sixteen sub-queues).

In this example, it should be understood that each queue (and/or sub-queue) may be associated with a particular (e.g., single) physical port of the smartNIC 200. Furthermore, each queue may be associated with more than one splitter port (and/or the corresponding data path and endpoint computing device associated with the particular splitter port). For example, as described herein, the Tx/Rx queue A.0 240 may be associated with the host port 0 250, as well as being associated with both the first splitter port 0/0 258 and the second splitter port 0/1 260. By extension, the Tx/Rx queue A.0 240 may also be associated with a second data path between the first splitter port 0/0 258 and the host E 270, and similarly, with respect to the third data path from the second splitter port 0/1 260 to host F 272. Accordingly, packets that are received at the host port 0 250 that are routed from either the first splitter port 0/0 258 and/or the second splitter port 0/1 260 may be queued together in the same queue (e.g., the reception queue of Tx/Rx queue A.0 240). As described further herein, when queueing a particular packet, the accelerator 204 may determine which data path (and/or associated port) the particular packet was received at, and then modify the packet (e.g., prepending or appending a bit-string as a packet header) to indicate this information. The accelerator 204 may perform similar operations with respect to the other queues of the packet queues 206. In some embodiments, as described herein, the accelerator 204 may determine which reception queue (e.g., among the plurality of reception queues of the packet queues 206) to insert a packet based in part on executing a load-balancing algorithm. For example, example, the accelerator 204 may balance a number of packets within the various queues, thus enabling a more efficient parallel processing mechanism to be achieved via the corresponding processors of the programming data plane 202.

Continuing with the example above, the data packet may subsequently be de-queued from the reception queue of the Tx/Rx queue A.0 240 of the packet queues 206 and then transmitted to the programming data plane 202 via a data bus 208. In some embodiments, the data bus 208 may correspond to any suitable physical medium that may transport data between elements of the smartNIC 200. For example, the data bus 208 may correspond to a network-on-a-chip (NOC) that includes a network-based subsystem on an integrated circuit of the smartNIC 200. In some embodiments, the data bus 208 may enable data to be transported between the accelerator 204, the programming data plane 202, the packet queue(s) 206, and/or the shared memory 210 of the smartNIC 200.

As described herein, the programming data plane 202 may include one or more processor units. As depicted in FIG. 2, the programming data plane 203 may include four processor units, for example, processor A 230, processor B 232, processor C 234, and processor D 236. In some embodiments, one or more of these processors may utilize an Advanced Reduced Instruction Set Computing (RISC) Machine (ARM) architecture. In some embodiments, any one or more of the processors may be configured to receive and/or process packets (e.g., data packets and/or control packets). The programming data plane 202 may also include a memory 238 (e.g., SRAM, DRAM, and/or any suitable type of memory). In some embodiments, the memory 238 may also include, among other things, a cache. The cache may be used to managed various flows by the programming data plane 202. In some embodiments, the programming data plane 202 may be configured to analyze packets received from the accelerator 204 and determine instructions for processing those packets. In some embodiments, the programming data plane 202 may itself forward packets (e.g., via the accelerator 204) to another device external to the smartNIC 200. In some embodiments, the programming data plane 202 may also and/or alternatively be configured to program the accelerator 204 with instructions for processing subsequent packets associated with particular flows. For example, the programming data plane 202 may instruct the accelerator 204 to add a cache entry for a flow that has been approved by the programming data plane 202.

In some embodiments, in part because there may be multiple processors of the programming data plane 202, with one or more corresponding packet queues per processor (e.g., and/or per port), the smartNIC 200 may be able to efficiently process (e.g., in parallel) a large number of packets per second (e.g., 100 Gigabits/second, 200 Gigabits/second, etc.). For example, as described further herein, the smartNIC 200 (e.g., via the programming data plane 202) may be able to efficiently add new flows to be managed by the accelerator 204 and/or process packets for new flows.

In some embodiments, the smartNIC 200 may retain the same number of original queues (e.g., each processor being associated with one queue per port) that were used to facilitate parallel processing of packets received at the respective physical ports, even if a number of ports associated with the smartNIC 200 is augmented, for example, due to the addition of splitter ports. As described herein, this may be enabled based in part on modifying packets with port identification data, thus enabling the programming data plane 202 to still determine which splitter port a packet was received at (e.g., which may be used to identify a particular customer flow), while also remaining highly efficient at processing packets in parallel that are received via the physical ports of the smartNIC 200.

Figure 4:
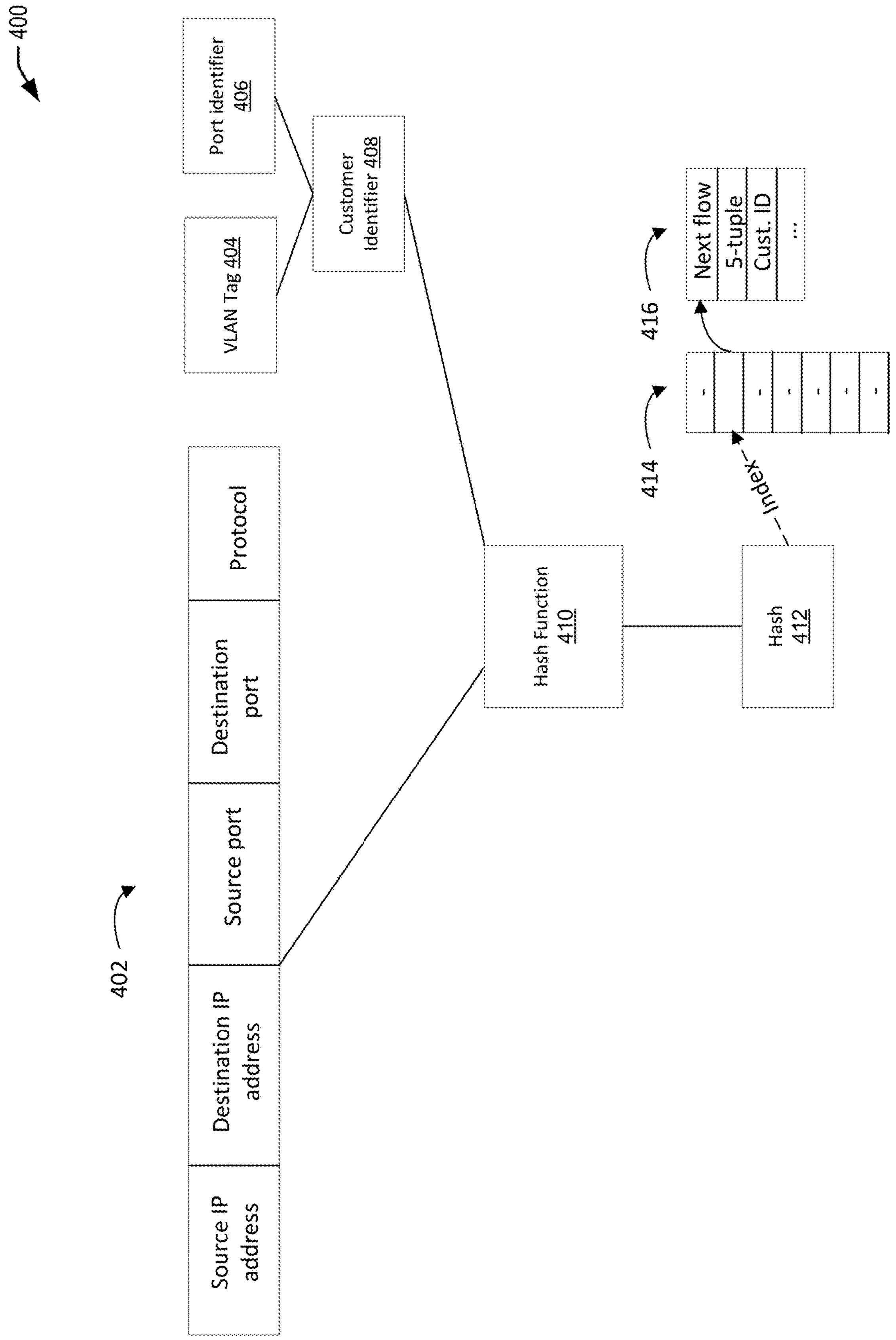
FIG. 4 is another simplified block diagram illustrating an example technique for managing a flow by an NVD, according to some embodiments.

Continuing with the example above, suppose that the data packet is de-queued from the reception queue of Tx/Rx queue A.0 240 and is received by the programming data plane 202 via the data bus 208 by processor A 230. In this example, the processor A 230 may analyze the data packet and determine that this packet is associated with a new flow (e.g., not previously authorized by the programming data plane 202). As described herein, in this example, it should be understood that processor A 230 may be a representative processor of the plurality of processors of the programming data plane 202. The processor A 230 may determine that this flow is to be allowed (e.g., authorized), for example, based on a list of rules regarding types of flows and/or traffic patterns that are to be allowed (and/or disallowed). It should be understood that the programming data plane 202 may be configured to perform any suitable analysis and/or actions on the data packet and/or other network data traffic. For example, the programming data plane 202 may implement a firewall, compile statistical data in a statistics report regarding flow traffic, report flow data to customers, etc. In this example, having determined that this new flow is to be allowed, the processor A 230 may generate a new cache entry for the new flow in the cache of the programming data plane 202. For example, the cache may include a similar hash table data structure as depicted in FIG. 4, described further herein. The processor A 230 may generate a hash associated with the packet (and/or associated flow), and then generate a new cache entry (with an associated hash) to be added to the hash table. In at least this way, the programming data plane 202 may also keep track of flows managed by the smartNIC 200. In some embodiments, as described further herein, the hash may be generated based in part on an identifier of the port (e.g., the splitter port) in which the packet was received at. In this example, the hash may be generated based in part on an identifier that identifies the data packet having been received at the first splitter port 0/0 258. The identifier may also identify any other suitable information about the path and/or endpoint from which the packet was received (e.g., from host E 270 via the second data path). In some embodiments, the hash may also and/or alternatively be generated based in part on a five-tuple of the packet. In some embodiments, the hash may identify both flow information (e.g., via the five-tuple) as well as customer identifier information (e.g., via the port information and/or a VLAN tag included in the packet).

The processor A 230 may also determine to instruct the accelerator 204 to add a new cache entry to the accelerator cache. For example, the programming data plane 202 may invoke an API call of an API that is implemented via the shared memory 210. For example, the processor A 230 may write instructions to the shared memory 210. In one embodiment, the accelerator 204 may poll the shared memory 210 to retrieve (e.g., read) the programming instructions from the shared memory 210. In this case, the programming instructions may instruct the accelerator 204 to add a new cache entry for the new approved flow to the accelerator cache. Subsequent data packets received by the accelerator 204 for that particular approved flow may then be quickly routed (e.g., to another host), without involving the programming data plane 202. It should be understood that the programming data plane 202 may transmit any suitable instructions to the accelerator via the shared memory 210 (e.g., instructions to add a new cache entry, remove a cache entry, log packet information, etc.). In some embodiments, the programming data plane 202 may utilize a control packet to transmit instructions to the accelerator (e.g., via the data bus 208), for example, to add a new cache entry for the new flow. In some embodiments, the control packet may include any suitable control information including, but not limited to, flow expiry data, flow statistics, security list updates, and/or other flow metadata associated with the routing and/or scheduling of data packets and/or associated flows. A control packet may be transmitted from the programming data plane 202 to the accelerator 204 and/or vice versa. In some embodiments, the accelerator cache may utilize a similar data structure and/or hashing mechanism as the programming data plane cache. For example, a hash that indexes to a particular accelerator cache entry may also be operable for indexing into a cache entry for the same flow in the programming data plane cache.

In some embodiments, as described herein, the programming data plane 202 and/or the accelerator 204 may determine how to process a packet based at least in part on identifying which port (e.g., and/or splitter port) the packet was received at and/or identifying which port the packet should be transmitted from. For example, consider another example in which the smartNIC 200 receives a data packet, for example, from host F 272 at host port 0 250. In this example, suppose that the data packet is associated with a flow that is already approved (e.g., by the programming data plane 202), whereby a flow entry already exists for the accelerator cache. The accelerator 204 generates a hash based at least in part determining that the packet arrived at the second splitter port 0/1 260 (e.g., from the host F 272). As described herein, the hash may also be generated based in part on other data (e.g., a five-tuple, a VLAN tag, etc.), to identify the particular customer flow from host F 272. Upon identifying the cache entry for the flow within the cache, the accelerator may determine instructions for forwarding the packet. For example, the accelerator 204 may determine to forward the packet to host I 134 of FIG. 1, based at least in part on determining that the packet originated from source host F 272 and arrived at the host port 0 250 via the second splitter port 0/1 260.

In another illustrative example, similar to as described herein, suppose that a data packet arrives at host port 0 250 from host F 272. In this example, suppose that the accelerator 204 determines that the packet is not associated with an already-allowed flow. The accelerator 204 modifies the packet to include port information, as described herein, and then transmits the packet to the programming data plane, for example, via the reception queue of Tx/Rx Queue B.0 244. In this example, the processor B 232 may receive and analyze the packet to determine that the packet was received via port 0/1 260. The programming data plane 202 may then determine, for example, based in part the data indicating that the packet was received via port 0/1 260, that the flow should be allowed, and that the packet (and/or subsequent packets associated with the flow) should be routed to host J 136. The processor B 232 may then compute a hash for the flow, and utilize the hash value to determine which switch the packet (and/or subsequent packets associated with the flow) should be routed toward. For example, the processor B 232 may divide the hash value by two, whereby values lower than a particular threshold value may be assigned to switch G 274, while values greater than or equal to the particular threshold may be assigned to switch H 276. The programming data plane 202 may transmit a control instruction (e.g., via shared memory 210 and/or a control packet) to the accelerator 204 that includes instructions for forwarding this packet and/or subsequent packets associated with this flow. For example, the accelerator 204 may be programmed to route subsequent packets to switch H 276. As described herein, this technique may be used to perform load balancing between switches connected to the second splitter device Y 256.

In yet another example, a packet may be received at the switch port 1 252 (e.g., via the third splitter port 1/0 262), which may be intended for host E 124. In this example, suppose that the accelerator 106 performs a look-up in the accelerator cache, and determines that the packet is not associated with a known flow. The accelerator 204 transmits the packet. In some embodiments, the packet may be modified to include information about which switch splitter port (e.g., the third splitter port 1/0 262) the packet was received at. In some embodiments, the packet may not be modified to include this information. The programming data plane 202 then analyzes the packet and determines that the packet is intended for host E 124. The programming data plane 202 then transmits a modified packet via the data bus 208 and inserts the modified packet into a transmission queue (e.g., the transmission que of Tx/Rx queue A.0 240). The modified packet includes instructions (e.g., via a bit-string header appended or prepended to the packet) for which splitter port the packet should be routed through (e.g., the first splitter port 0/0 258). The accelerator 204 subsequently receives the modified packet, analyzes the instruction, and then transmits the packet from host port 0 250 to the first splitter device X 254 for subsequent routing to host E 270 via the first splitter port 0/0 258.

Accordingly, as illustrative with these representative examples, it should be understood that port information may be indicated in a modified packet for any suitable purpose. This may include processing ingress traffic and/or egress traffic, and/or for routing packets via a host port and/or a switch port. For example, the port information may be utilized to process ingress traffic received at a host port for subsequent routing to another host device via a switch port of the smartNIC 200 (or vice versa). In another example, port information may be utilized to route egress traffic to a particular switch (e.g., via the second splitter device Y 256).

Figure 3:
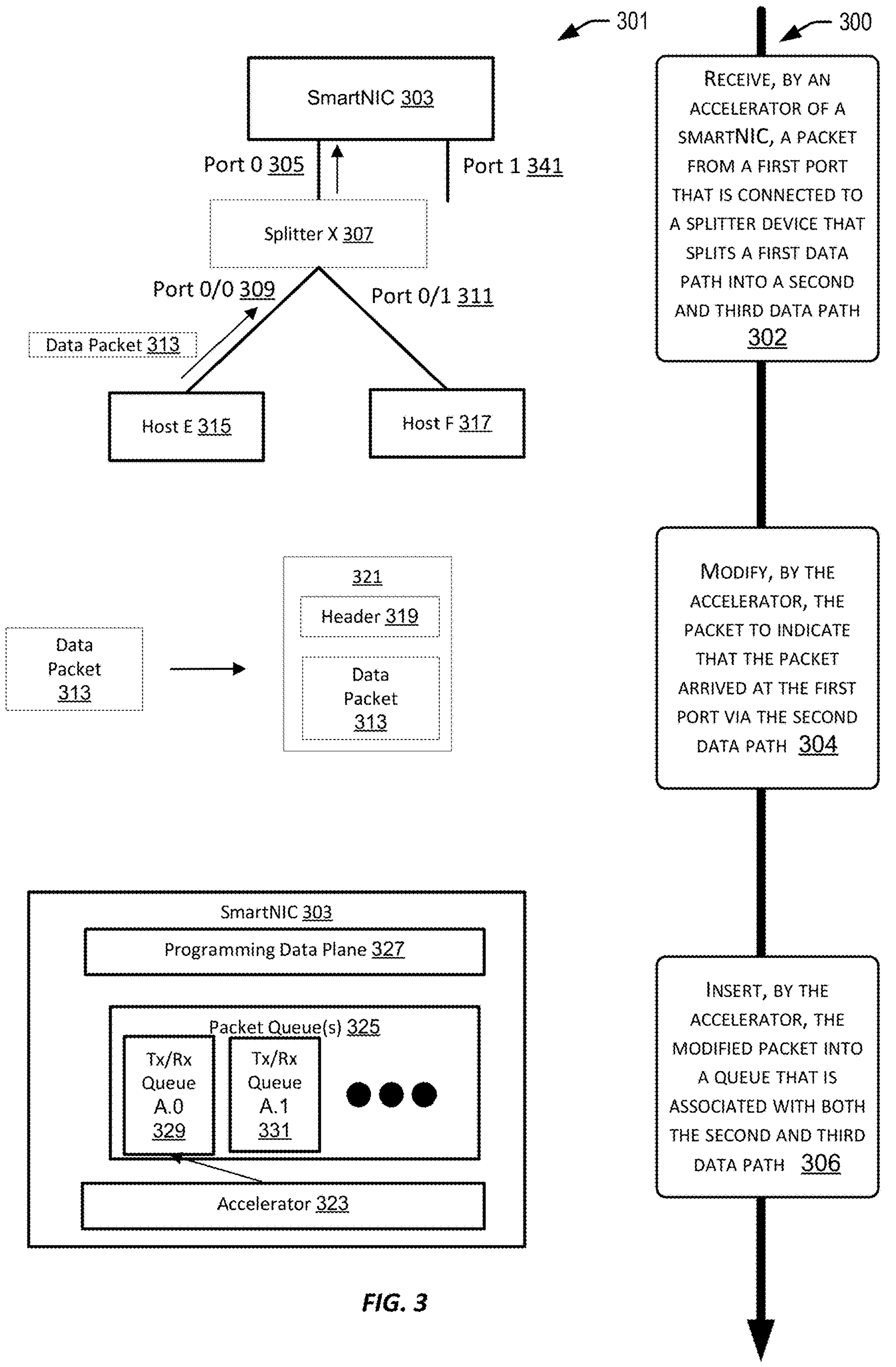
FIG. 3 is another simplified block diagram illustrating an example technique for processing a packet received at a particular port of an NVD, according to some embodiments.

FIG. 3 is another simplified block diagram illustrating an example technique for processing a packet received at a particular port of an NVD, according to some embodiments. The process 300 is an example process for modifying a packet to include port information, which may be used to subsequently process the packet. The diagram 301 depicts example states that correspond to the blocks of the process 300. The diagram 301 includes, among other elements, a smartNIC 303, a splitter device X 307, a host E 315, and a host F 317. The smartNIC 303 includes a programming data plane 327 a plurality of packet queues 325, and an accelerator 323. The host E 315 and the host F 317 are both connected to the splitter device X 307, respectively via port 0/0 309 and port 0/1 311. In some embodiments, the elements of diagram 301 may be similar to other similarly named elements described herein. For example, the smartNIC 303 may be similar to smartNIC 200 and/or smartNIC 101. As depicted in process 300, a data packet is received at a host port of the smartNIC via a particular splitter port of a splitter device. The accelerator 323 modifies the packet to indicate which splitter port the packet was received at, and insert the modified packet into a queue. The programming data plane 327 then receives the modified packet and processes the packet based in part on the port information included by the accelerator 323.

Turning to process 300 in further detail, the process 300 begins at block 302, whereby an accelerator of a smartNIC receives a packet from a first port that is connected to a splitter device that splits a first data path into a second data path and a third data path. For example, using diagram 301 for illustration, the host E 315 may execute a compute instance, for example implementing a web server. The web server may transmit a packet over a VLAN of a virtual network (and/or physical network), whereby the smartNIC 303 facilitates reception and transmission of traffic data over the virtual network. In this case, the web server transmits a data packet 313 to the splitter device X 307 over a first data path for reception at port 0/0 309. The packet is then routed from the splitter device X 307 to the smartNIC 303 for reception at port 0 305 (e.g., a host port of the smartNIC). The accelerator 323 of the smartNIC 303 may determine that the packet was received via the first data path (e.g., connecting port 0/0 309 to the host E 315) instead of the second data path (e.g., which connects port 0/1 311 to host F 317). It should be understood that the smartNIC 303 may have other physical ports and/or may be connected to other splitter devices, switches, etc.

At block 304, the accelerator may modify the packet to indicate that the packet arrived at the first port via the second data path. For example, returning to diagram 301 for illustration, the data packet 313 may include a plurality of headers and/or a payload data. The plurality of headers may include, for example, a Media Access Control (MAC) header, an Internet Protocol (IP) header, and a Transmission Control Protocol (TCP) header. In some embodiments, the MAC header, the IP header, and/or the TCP header may be formatted, according to industry standards, for example, according to the Open System Interconnection (OSI) Model. In some embodiments, any suitable packet header(s) may be utilized to format the packet. For example, in a case where an Ethernet frame may utilize a VLAN tag, an Institute of Electrical and Electronics Engineers (IEEE) 802.1Q standard may be used within a modified Ethernet frame header (e.g., a modified MAC header). As described herein, a VLAN tag may be used, for example, to identify which VLAN a particular packet belongs, thus enabling the smartNIC (and other computing resources of the CSPI) to support virtual network routing. In some embodiments, any one or more fields of the packet headers and/or payload data may be associated with flow information that may be used to identify a particular flow associated with a given packet.

In this example, the accelerator 323 may modify the packet by prepending a bit-string (e.g., a header 319) to the data packet 313, to generate a modified packet 321. For example, the bit-string may be N bits (e.g., 4 bits, 8 bits, etc.) long and be prepended to the packet. The bit-string may include any suitable information. For example, the bit-string may indicate that the data packet 313 was received at port 0/0 309, that the data packet 313 was received over the second data path from the host E 315, and/or any suitable combination of information thereof. It should be understood that any suitable modification to the data packet 313 may be utilized to perform techniques described herein. For example, the header 319 may be appended to the data packet 313. In another example, the information of the header 319 may be included (e.g., prepended) within the payload data of the data packet 313.

At block 306, the accelerator may insert the modified packet into a queue that is associated with both the second and third data path. For example, using diagram 301 for illustration, the accelerator 323 may insert the modified packet 312 into one of the packet queues 325, for example, the reception queue of Tx/Rx queue A.0 329. As described herein (e.g., with respect to FIG. 2), the modified packet may be inserted into this queue based in part on the packet having arrived at port 0 305 (e.g., instead of a separate port 1 341, which may be associated with Tx/Rx queue A.1 331). It should be understood that there may be a plurality of packet queues 325, each queue being associated with a particular processor of the programming data plane 327 and/or port of the smartNIC 303.

In some embodiments, the programming data plane 327 may subsequently receive the de-queued modified packet and process the packet. For example, as described further herein with respect to FIG. 4, the programming data plane 327 may analyze the packet to determine if a flow cache entry associated with the packet should be added to (e.g., or already exists within) a cache of the programming data plane 327 and/or a cache of the accelerator 323.

Although embodiments described herein may primarily refer to a modification of data packets of a particular flow (e.g., including payload contents of the flow itself), embodiments should not be construed to be so limiting. For example, techniques described here may also be applicable to modifying control packets, whereby a control packet may include any suitable control information (e.g., including metadata information) associated with a flow. It should be understood that techniques herein may be applied to any suitable packet format that is processed by an NVD.

FIG. 4 is another simplified block diagram illustrating an example technique for managing a flow by an NVD, according to some embodiments. As introduced above, diagram 400 of FIG. 4 illustrates a technique for managing a cache of cache entries that respectively correspond to individual flows. For example the cache may be a programming data plane cache and/or an accelerator cache. The diagram 400 includes several elements, including a five-tuple 402, a VLAN tag 404, a port identifier 406, a customer identifier 408, a hash function 410, a hash value 412, a hash table 414, and one or more cache entries for the given hash value 412, for example, a cache entry 416.

To further illustrate the example technique of diagram 400 for managing a cache of flow entries, consider a scenario similar to that depicted with respect to FIG. 3. For example, suppose that, following the operations of block 306, a processor of the programming data plane 327 receives a modified packet (e.g., de-queued from the reception queue of Tx/Rx queue A.0 329). The programming data plane 327 may analyze the modified packet to determine one or more elements to be used in generating a hash. For example, the programming data plane 327 may analyze one or more headers of the data packet to obtain flow information (e.g., including a five-tuple 402). For example, a header of the data packet may formatted according to the TCP/IP protocol, whereby the particular format of the header includes a plurality of different fields. The five-tuple 402 may include five of these fields, including a source IP address, a destination IP address, a source port, a destination port, and a protocol field. In some embodiments, the five-tuple 402 may correspond to a particular flow (e.g., connection) between two endpoints.

In some embodiments, in addition to obtaining the five-tuple 402 the programming data plane 327 may also determine a particular identifier (e.g., a customer identifier) associated with the particular packet. In some embodiments, the identifier may also be determined based in part on one or more fields. For example, as depicted in FIG. 4, the VLAN tag 404 may be used to identify which VLAN the packet is being transmitted over, within the virtual network. In some embodiments, as described herein, the port identifier 406 may be obtained from the modified packet, for example, from a bit-string that is prepended (or appended) to the data packet (e.g., see block 304 of FIG. 3). In some embodiments, the port identifier may be used by the programming data plane to determine which host (e.g., host E 315 or host F 317 of FIG. 3) the packet originated from. In some embodiments, the VLAN tag and the port identifier may, together (e.g., concatenated), correspond to a customer identifier 408 (e.g., a particular customer account identifier associated with a particular customer account). The customer identifier 408, combined with the five-tuple 402, may be used to generate the hash 412 for a particular customer flow.

For example, the programming data plane may execute a hash function 410. The output of the hash function 410 may be the hash 412 (e.g., a hash value), which may correspond to any suitable identifier (e.g., a sequence of bits, an alpha-numeric sequence, etc.). The hash 412 may be used to index into the hash table 414. For example, suppose that this particular data packet is associated with a particular flow for which a cache entry associated with the flow already exists within the hash table 414, for example, as cache entry 416. For example, suppose that the accelerator forwarded the packet to the programming data plane upon determining that the associated flow had exceeded a predefined threshold packet count. In this example, the programming data plane may then identify how to process the data packet based in part on the data within the cache entry 416. For example, the programming data plane may increment the packet count of the particular flow and/or update statistical information associated with the flow. In some embodiments, the programming data plane may log flow information to a log, and/or perform any suitable action. In some embodiments, the cache entry 416 may further include instructions for how to process the data packet. For example, the cache entry 416 may contain instructions indicating a particular host device to route the packet toward. In this example, because the data packet is already associated with a known flow in the programming data plane cache (e.g., an approved flow), the programming data plane may forward the packet to the accelerator with instructions for processing the packet (e.g., routing the packet to a particular host).

In another example, suppose that the hash function 410 generated a hash 412 for which no associated cache entry is found in the cache. For example, as depicted in FIG. 4, the cache (e.g., represented by a hash table data structure) may chain cache entries for flows that may be hashed to similar (e.g., same) values. In this example, the programming data plane may determine that the hash value indexes into the hash table 414 at a particular memory address, such that the programming data plane then adds the cache entry 416 as a new entry. It should be understood that any suitable data structure may be utilized to implement a cache. It should also be understood that, as described herein, the accelerator may also include a cache of flow entries. The accelerator cache may or may not utilize a similar data structure for a cache, as described in reference to FIG. 4. In some embodiments, the programming data plane may program the accelerator with instructions for adding a new cache entry for a flow. In any case, it should be understood that the programming data plane and/or the accelerator may utilize at least a port identifier value (e.g., port identifier 406) as an input to identify a particular (e.g., unique) customer flow (e.g., originating/routed from a particular host or switch), which may be utilized to process packets associated with that particular flow.

Figure 5:
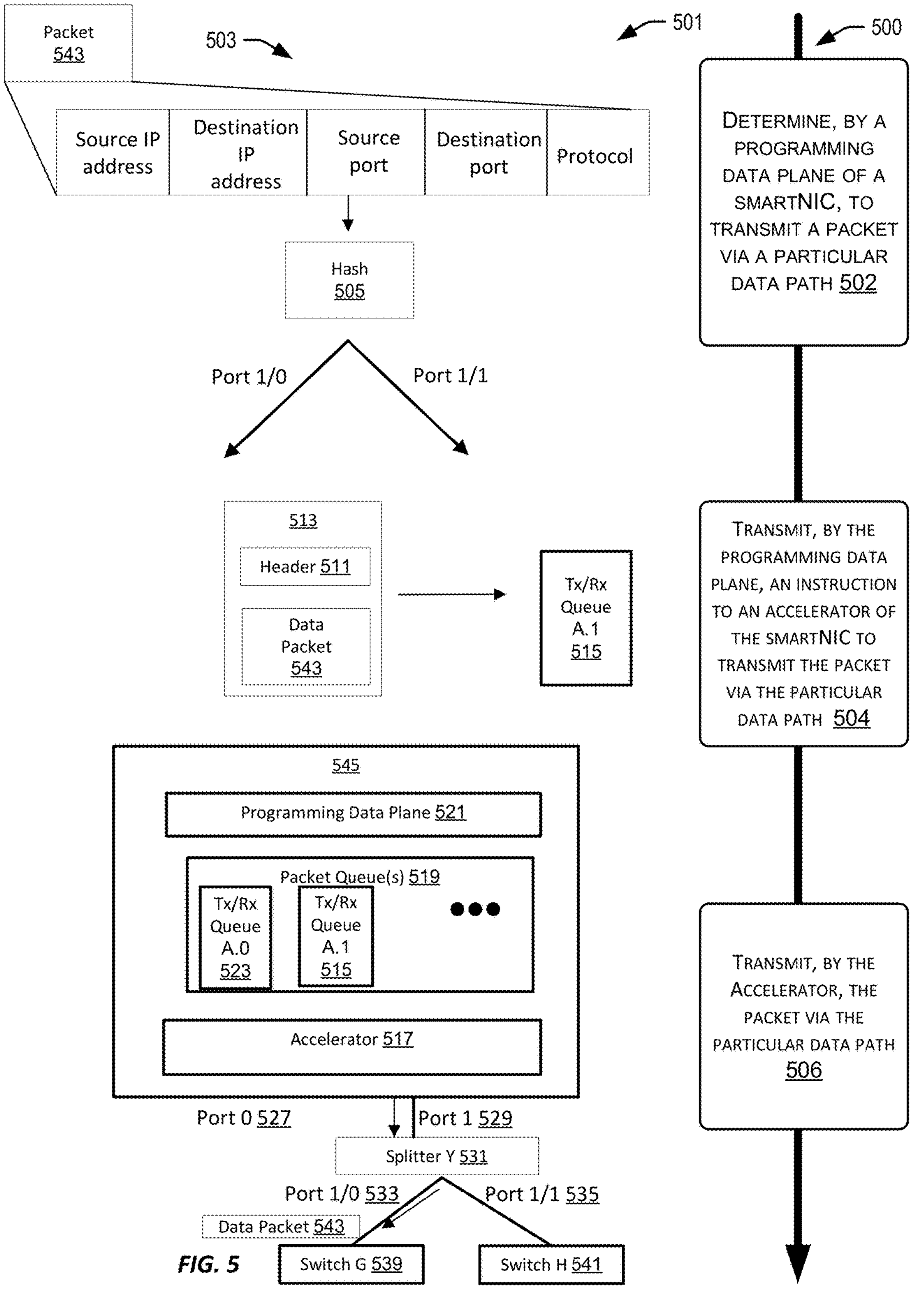
FIG. 5 is another simplified block diagram illustrating an example technique for transmitting a packet by an NVD via a particular port associated with a particular data path, according to some embodiments.

FIG. 5 is another simplified block diagram illustrating an example technique for transmitting a packet by an NVD via a particular port associated with a particular data path, according to some embodiments. The process 500 is an example process for modifying a packet to include port information, which may be used to route a packet. In this case, the process 500 may utilize the port information to route the packet to a particular switch (e.g., from a switch port of a smartNIC). This may be used, for example, to perform load-balancing of routing packets between different switches. In another example, this technique may be used to re-route packets to another switch, for example, if one of the splitter ports is unavailable. The diagram 501 depicts example states that correspond to the blocks of the process 500. The diagram 501 includes, among other elements, a five-tuple 503, a hash 505, a packet 543, a modified packet 513, a Tx/Rx queue A.1 515, a smartNIC 545, a splitter device Y 531, and two switches (e.g., switch G 539, switch H 541), both connected to the splitter device Y 531. In some embodiments, one or more of the elements of diagram 501 may be similar to any one or more of similarly-named elements described herein. For example, the smartNIC 545 may be similar to any one or more of the smartNIC devices described herein.

Turning to process 500 in further detail, at block 502, a programming data plane of a smartNIC determines to transmit a packet via a particular data path. For example, using diagram 501 for illustration, the smartNIC 545 may determine to transmit the data packet 543, for example to another host computer via a virtual network (e.g., host computer I 134 of FIG. 1). In this example, the smartNIC 545 may have received the packet 543 from another host (e.g., host E 124 of FIG. 1), and will route the packet 543 to host I 134. In another example, the programming data plane 521 may have generated the packet for any suitable purpose. For example, the smartNIC 545 may determine to generate a packet for sending statistical data about flows to another device. Continuing with this example of forwarding a packet, the programming data plane 521 of the smartNIC 545 identifies at least the five-tuple 503 associated with the packet 543, and then generates a hash 505 based in part on the five-tuple 503. The programming data plane 521 then divides the hash by two to obtain a value that is used to determine which port to route the packet. In some embodiments, packets whose corresponding hash division value are below a predefined threshold value (e.g., 0.5) may be assigned to port 1/0 533, while packets whose corresponding hash divisions are greater than or equal to the predefined threshold may be assigned to port 1/1 535. In this case, the hash may be below 0.5, and therefore the packet 543 is determined to be routed to port 1/0 533. It should be understood that this method may enable more efficient load balancing of traffic routed to different ports (e.g., different splitter ports). In another example, suppose that a flow associated with the packet 543 had been previous routed through port 1/1 535 (e.g., based on a previously computed hash). In this example, suppose that the hash is computed based at least in part on a port value. Subsequently, the programming data plane 521 receives an indication (e.g., from the accelerator 517) that port 1/1 535 of the splitter device Y 531 is unavailable for transmitting packets. The programming data plane 521 may then determine to route subsequent packets (e.g., including this packet 543) through port 1/0 533. In this example, the programming data plane 521 may determine to generate an updated hash (e.g., based in part on the new port information) and/or generate an updated cache entry associated with the updated hash. In some embodiments, the updated cache entry may be operable for routing subsequent packets associated with the flow via port 1/0 533 (e.g., as long as the port 1/1 535 remains unavailable).

At block 504, the programming data plane transmits an instruction to an accelerator of the smartNIC to transmit the packet via the particular data path. For example, continuing with diagram 501, the programming data plane 521 may modify the packet 543 by prepending (or appending) a new header 511 to create a modified packet 513. In some embodiments, this step may be similar to as described in other embodiments herein. For example, the header 511 may indicate that the packet should be routed via port 1/0 533 of the splitter Y 531. The programming data plane 521 may insert the packet into the transmission queue of the Tx/Rx queue A.0 515. As described herein, the Tx/Rx queue A.0 515 may be one of a plurality of packet queues 519 of the smartNIC 545, for example, also including Tx/Rx queue A.0 523 (associated with port 0 527 and processor A). In this case, a processor A (e.g., similar to processor A 230 of FIG. 2) may have processed the packet at block 502, and thus inserts the packet into the transmission queue that is associated with the processor A and with switch port 1 529. It should be understood that, as described herein, the transmission queue A.0 515 may be configured to received modified packets that are intended (e.g., via the header 511) to be routed from switch port 1 529 through either splitter port 1/0 533 or splitter port 1/1 535.

At block 506, the accelerator transmits the packet via the particular data path. For example, the accelerator 517 may receive the de-queued modified packet 513, analyze the packet to determine port information (e.g., among other data elements), and then transmit the packet 543 from switch port 1 529 to splitter device Y 531, for subsequent routing over the particular data path from port 1/0 533 to switch G 539. Upon the packet reaching switch G 539, the packet may be subsequently transmitted to the intended host (e.g., host I 134 via the virtual network 132 of FIG. 1).

Figure 6:
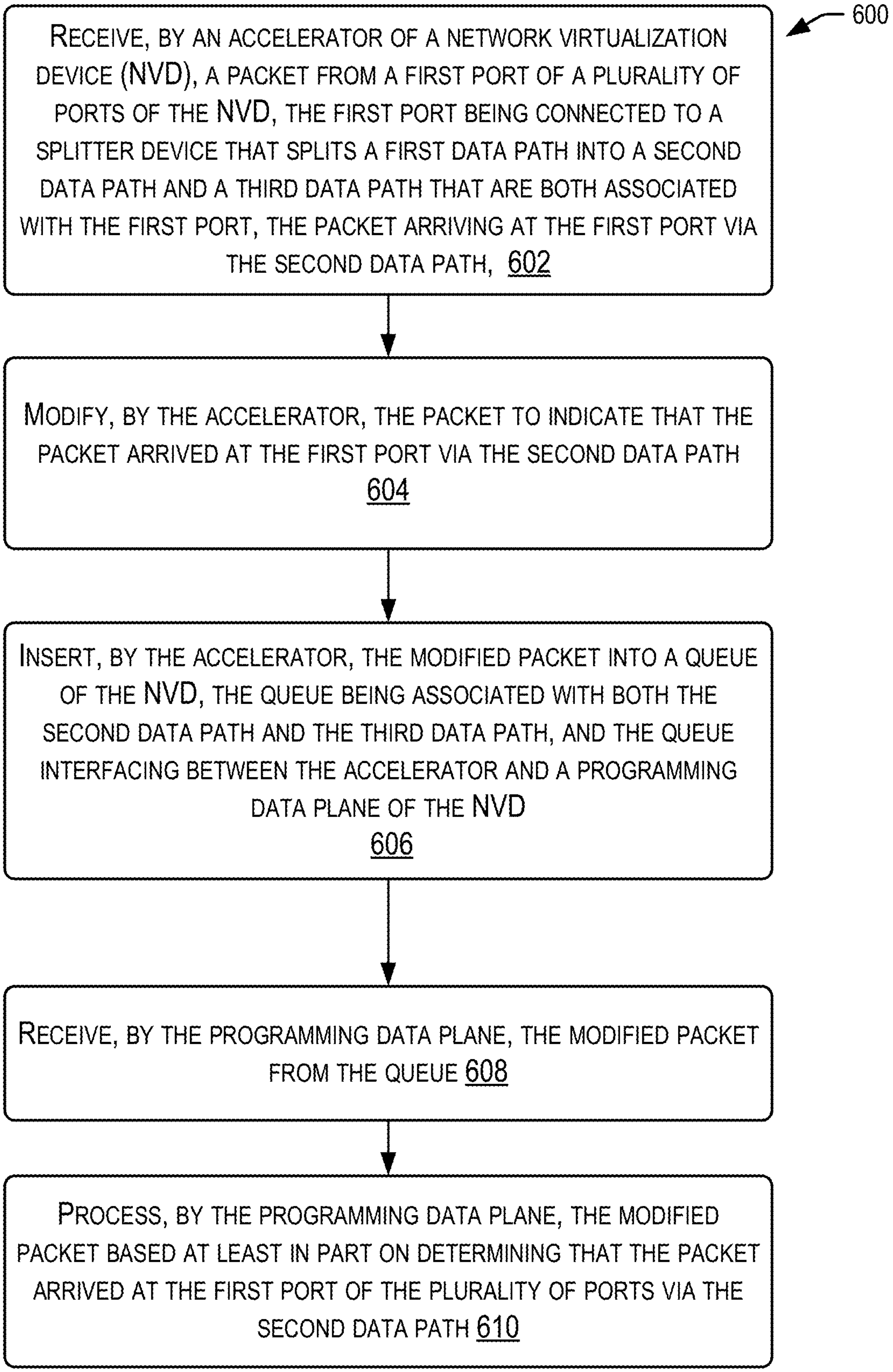
FIG. 6 is a simplified flow diagram illustrating an example process for processing a packet received at a particular port of an NVD, according to some embodiments.

FIG. 6 is a simplified flow diagram illustrating an example process for processing a packet received at a particular port of an NVD, according to some embodiments. In some embodiments, process 600 of FIG. 7 and or process 700 of FIG. 7 may be performed by an NVD (e.g., a smartNIC device), which may be similar to any of the NVD's described herein.

Process 600 and 700 are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

At block 602, an accelerator of a network virtualization device (e.g., a smartNIC) may receive a packet from a first port of a plurality of ports of the smartNIC, the first port being connected to a splitter device that splits a first data path into a second data path and a third data path that are both associated with the first port. In some embodiments, the packet may arrive at the first port via the second data path. In some embodiments, one or more operations of block 602 may be similar to that described with respect to block 302 of FIG. 3. In some embodiments, the splitter device may be a component of the smartNIC. In some embodiments, the splitter may be one of a plurality of splitters respectively connected to different ports of the plurality of ports of the smartNIC.

At block 604, the accelerator may modify the packet to indicate that the packet arrived at the first port via the second data path. In some embodiments, one or more operations of block 604 may be similar to that described with respect to block 304 of FIG. 3. For example, the accelerator may prepend a bit-string (e.g., header) to the packet.

At block 606, the accelerator may insert the modified packet into a queue of the smartNIC. The queue may be associated with both the second data path and the third data path. The queue may also interface between the accelerator and a programming data plane of the smartNIC. In some embodiments, one or more operations of block 606 may be similar to that described with respect to block 306 of FIG. 3. It should be understood that, a total number of queues of the smartNIC may be less than (or equal to) a total number of ports of the smartNIC, enabled at least in part by the packet modification mechanism described herein. For example consider another case in which, instead of splitter devices external to the smartNIC, the smartNIC included a first number of physical ports. Each physical port may be associated with one or more queues of a second number (e.g., plurality) of queues. Also, a processor of the programming data plane may be associated with a queue per port. In this example, the second number of queues may be less than the first number of native ports (e.g., half as many, a quarter as many, etc.), at least in part enabled via the packet modification mechanism. It should be understood that the processor-to-queue-to-port ratio may be determined based on any suitable goals (e.g., increasing parallel processing potential, reducing a number of queues maintained by the smartNIC, etc.).

At block 608, the programming data plane may receive the modified packet from the queue. For example, a particular processor the programming data plane, which is associated with the queue in which the packet was queued, may receive the modified packet via a data bus (e.g., a NOC).

At block 610, the programming data plane may process the modified packet based at least in part on determining that the packet arrived at the first port of the plurality of ports via the second data path. For example, the programming data plane may analyze the prepended header within the modified packet to identify that the packet arrived at the first port. The programming data plane may then identify the particular customer flow (e.g., associated with a particular customer account, and/or associated with a particular customer account identifier) by generating a hash based in part on the first port. This hash may index into a cache (e.g., similar to as described in reference to FIG. 4), whereby the programming data plane may determine instructions for routing the packet based in part on the cache entry. In some embodiments, if a cache entry does not exist, the programming data plane may determine if the flow associated with the packet should be allowed, and, if so, the programming data plane may generate a new cache entry. In some embodiments, the programming data plane may also (and/or alternatively) program the accelerator with a new cache entry. In some embodiments, the hash may or may not be generated based on the port information.

Figure 7:
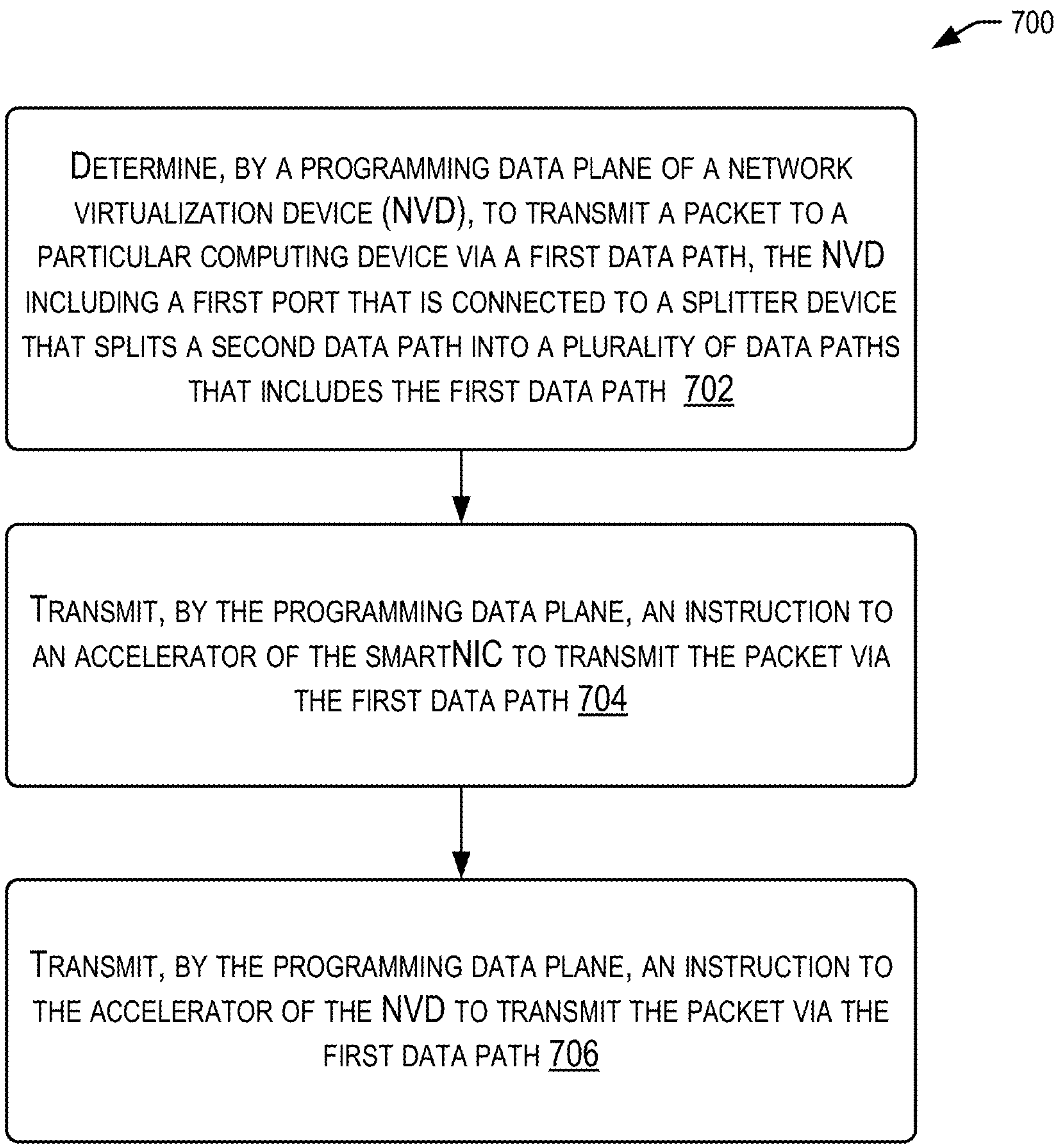
FIG. 7 is another simplified flow diagram illustrating an example process for efficiently transmitting a packet by an NVD via a particular port associated with a particular data path, according to some embodiments.

FIG. 7 is another simplified flow diagram illustrating an example process for efficiently transmitting a packet by an NVD via a particular port associated with a particular data path, according to some embodiments. For example, a programming data plane of a smartNIC type of NVD may determine a particular switch to route the packet towards, and then may modify a packet to indicate this port and/or switch information, which may be subsequently used by an accelerator of the smartNIC to route the packet.

At block 702, a programming data plane of a network virtualization device (e.g., a smartNIC) determines to transmit a packet to a particular computing device via a first data path. In some embodiments, the smartNIC may include a first port that is connected to a splitter device that splits a second data path into a plurality of data paths that includes the first data path. In some embodiments, one or more operations of block may be similar to operations of block 502 of FIG. 5. For example, the programming data plane may receive a packet that is forwarded from an accelerator of the smartNIC. The packet may be intended for a particular host computer, and the programming data plane may determine to transmit the packet to the particular host computer via the first data path. In some embodiments, the programming data plane may compute a hash to determine which port the packet should be routed through, as described herein. In some embodiments, the programming data plane may select the first data path instead of another data path based on a load-balancing algorithm. For example, the load-balancing algorithm may determine to balance traffic data between two different splitter ports. In another example, the load-balancing algorithm may enable the smartNIC to re-route traffic via another port (e.g., another splitter port) in case a particular port is unavailable. In some embodiments, the first data path and the second data path may connect to the same device or to different devices.

At block 704 the programming data plane may transmit an instruction to the accelerator of the smartNIC to transmit the packet via the first data path. In some embodiments, one or more operations of block may be similar to operations of block 504 of FIG. 5. For example, a processor of the programming data plane may modify the packet with a header that indicates the first data path. In some embodiments, the modified packet may include any suitable instructions and/or information, including for example, a splitter port of the splitter device associated with the first data path. The modified packet may be inserted by the processor into a queue that is associated with the second data path (e.g., and the processor). The queue may also be associated with the plurality of data paths (e.g., including the first data path) that split from the second data path.

At block 706, the accelerator of the smartNIC may transmit the packet via the first data path. In some embodiments, one or more operations of block may be similar to operations of block 506 of FIG. 5. For example, the accelerator may receive the modified packet from the queue, obtain the packet, and transmit the packet from the first port to the splitter device. The packet may be subsequently routed by the splitter device through the first data path for arrival at the particular computing device endpoint.

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The virtual or overlay networks can include one or more virtual cloud networks (VCNs). The virtual networks are implemented using software virtualization technologies (e.g., hypervisors, functions performed by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VXLAN—IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual networks. Both the physical IP addresses and overlay IP addresses are types of real IP addresses. These are separate from virtual IP addresses, where a virtual IP address maps to multiple real IP addresses. A virtual IP address provides a 1-to-many mapping between the virtual IP address and multiple real IP addresses.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in an virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premise networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with public accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general. a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about: the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP) and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 13, 1414, 15, and 16 (see references 1316, 141416, 1516, and 1616) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Figure 8:
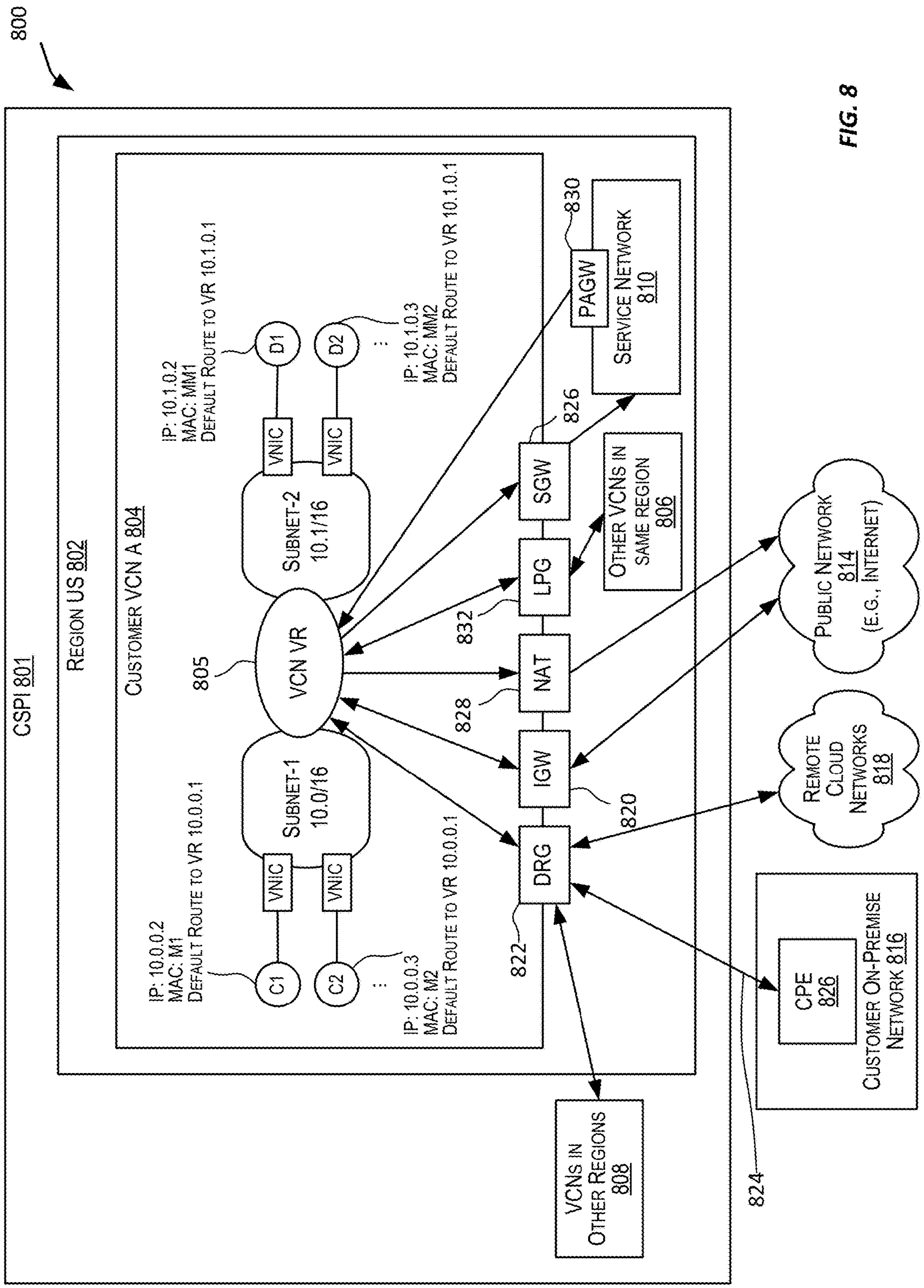
FIG. 8 is a high level diagram of a distributed environment showing a virtual or overlay cloud network hosted by a cloud service provider infrastructure according to certain embodiments.

Various different architectures for implementing cloud-based service using CSPI are depicted in FIGS. 8, 9, 10, 11, 12, 13, 14, 15, and 17, and are described below. FIG. 8 is a high level diagram of a distributed environment 800 showing an overlay or customer VCN hosted by CSPI according to certain embodiments. The distributed environment depicted in FIG. 8 includes multiple components in the overlay network. Distributed environment 800 depicted in FIG. 8 is merely an example and is not intended to unduly limit the scope of claimed embodiments. Many variations, alternatives, and modifications are possible. For example, in some implementations, the distributed environment depicted in FIG. 8 may have more or fewer systems or components than those shown in FIG. 1, may combine two or more systems, or may have a different configuration or arrangement of systems.

As shown in the example depicted in FIG. 8, distributed environment 800 comprises CSPI 801 that provides services and resources that customers can subscribe to and use to build their virtual cloud networks (VCNs). In certain embodiments, CSPI 801 offers IaaS services to subscribing customers. The data centers within CSPI 801 may be organized into one or more regions. One example region "Region US" 802 is shown in FIG. 8. A customer has configured a customer VCN 804 for region 802. The customer may deploy various compute instances on VCN 804, where the compute instances may include virtual machines or bare metal instances. Examples of instances include applications, database, load balancers, and the like.

In the embodiment depicted in FIG. 8, customer VCN 804 comprises two subnets, namely, "Subnet-1" and "Subnet-2", each subnet with its own CIDR IP address range. In FIG. 8, the overlay IP address range for Subnet-1 is 10.0/16 and the address range for Subnet-2 is 10.1/16. A VCN Virtual Router 805 represents a logical gateway for the VCN that enables communications between subnets of the VCN 804, and with other endpoints outside the VCN. VCN VR 805 is configured to route traffic between VNICs in VCN 804 and gateways associated with VCN 804. VCN VR 805 provides a port for each subnet of VCN 804. For example, VR 805 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 801. A compute instance participates in a subnet via a VNIC associated with the compute instance. For example, as shown in FIG. 8, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 8, compute instance C1 has an overlay IP address of 10.0.0.2 and a MAC address of M1, while compute instance C2 has an private overlay IP address of 10.0.0.3 and a MAC address of M2. Each compute instance in Subnet-1, including compute instances C1 and C2, has a default route to VCN VR 805 using IP address 10.0.0.1, which is the IP address for a port of VCN VR 805 for Subnet-1.

Subnet-2 can have multiple compute instances deployed on it, including virtual machine instances and/or bare metal instances. For example, as shown in FIG. 8, compute instances D1 and D2 are part of Subnet-2 via VNICs associated with the respective compute instances. In the embodiment depicted in FIG. 8, compute instance D1 has an overlay IP address of 10.1.0.2 and a MAC address of MM1, while compute instance D2 has an private overlay IP address of 10.1.0.3 and a MAC address of MM2. Each compute instance in Subnet-2, including compute instances D1 and D2, has a default route to VCN VR 805 using IP address 10.1.0.1, which is the IP address for a port of VCN VR 805 for Subnet-2.

VCN A 804 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 804 can communicate with various different endpoints. These endpoints may include endpoints that are hosted by CSPI 900 and endpoints outside CSPI 900. Endpoints that are hosted by CSPI 801 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 806 or 810, communications between a compute instance in Subnet-1 and an endpoint in service network 810 in the same region); or an endpoint in a VCN in a different region (e.g., communications between a compute instance in Subnet-1 and an endpoint in a VCN in a different region 808). A compute instance in a subnet hosted by CSPI 801 may also communicate with endpoints that are not hosted by CSPI 801 (i.e., are outside CSPI 801). These outside endpoints include endpoints in the customer's on-premise network 816, endpoints within other remote cloud hosted networks 818, public endpoints 814 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 8 wants to send a packet to compute instance D1 in Subnet-2, the packet is first processed by the VNIC associated with compute instance C1. The VNIC associated with compute instance C1 is configured to route the packet to the VCN VR 805 using default route or port 10.0.0.1 of the VCN VR. VCN VR 805 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 804 to an endpoint that is outside VCN 804, the communication is facilitated by the VNIC associated with the source compute instance, VCN VR 805, and gateways associated with VCN 804. One or more types of gateways may be associated with VCN 804. A gateway is an interface between a VCN and another endpoint, where the another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 804. The packet may be first processed by the VNIC associated with source compute instance C1. The VNIC processing determines that the destination for the packet is outside the Subnet-1 of C1. The VNIC associated with C1 may forward the packet to VCN VR 805 for VCN 804. VCN VR 805 then processes the packet and as part of the processing, based upon the destination for the packet, determines a particular gateway associated with VCN 804 as the next hop for the packet. VCN VR 805 may then forward the packet to the particular identified gateway. For example, if the destination is an endpoint within the customer's on-premise network, then the packet may be forwarded by VCN VR 805 to Dynamic Routing Gateway (DRG) gateway 822 configured for VCN 804. The packet may then be forwarded from the gateway to a next hop to facilitate communication of the packet to it final intended destination.

Various different types of gateways may be configured for a VCN. Examples of gateways that may be configured for a VCN are depicted in FIG. 8 and described below. Examples of gateways associated with a VCN are also depicted in FIGS. 13, 14, 15, and 16 (for example, gateways referenced by reference numbers 1334, 1336, 1338, 1434, 1436, 1438, 1534, 1536, 1538, 1634, 1636, and 1638) and described below. As shown in the embodiment depicted in FIG. 8, a Dynamic Routing Gateway (DRG) 822 may be added to or be associated with customer VCN 804 and provides a path for private network traffic communication between customer VCN 804 and another endpoint, where the another endpoint can be the customer's on-premise network 816, a VCN 808 in a different region of CSPI 801, or other remote cloud networks 818 not hosted by CSPI 801. Customer on-premise network 816 may be a customer network or a customer data center built using the customer's resources. Access to customer on-premise network 816 is generally very restricted. For a customer that has both a customer on-premise network 816 and one or more VCNs 804 deployed or hosted in the cloud by CSPI 801, the customer may want their on-premise network 816 and their cloud-based VCN 804 to be able to communicate with each other. This enables a customer to build an extended hybrid environment encompassing the customer's VCN 804 hosted by CSPI 801 and their on-premises network 816. DRG 822 enables this communication. To enable such communications, a communication channel 824 is set up where one endpoint of the channel is in customer on-premise network 816 and the other endpoint is in CSPI 801 and connected to customer VCN 804. Communication channel 824 can be over public communication networks such as the Internet or private communication networks. Various different communication protocols may be used such as IPsec VPN technology over a public communication network such as the Internet, Oracle's FastConnect technology that uses a private network instead of a public network, and others. The device or equipment in customer on-premise network 816 that forms one end point for communication channel 824 is referred to as the customer premise equipment (CPE), such as CPE 826 depicted in FIG. 8. On the CSPI 801 side, the endpoint may be a host machine executing DRG 822.

In certain embodiments, a Remote Peering Connection (RPC) can be added to a DRG, which allows a customer to peer one VCN with another VCN in a different region. Using such an RPC, customer VCN 804 can use DRG 822 to connect with a VCN 808 in another region. DRG 822 may also be used to communicate with other remote cloud networks 818, not hosted by CSPI 801 such as a Microsoft Azure cloud, Amazon AWS cloud, and others.

As shown in FIG. 8, an Internet Gateway (IGW) 820 may be configured for customer VCN 804 the enables a compute instance on VCN 804 to communicate with public endpoints 814 accessible over a public network such as the Internet. IGW 8120 is a gateway that connects a VCN to a public network such as the Internet. IGW 820 enables a public subnet (where the resources in the public subnet have public overlay IP addresses) within a VCN, such as VCN 804, direct access to public endpoints 812 on a public network 814 such as the Internet. Using IGW 820, connections can be initiated from a subnet within VCN 804 or from the Internet.

A Network Address Translation (NAT) gateway 828 can be configured for customer's VCN 804 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 804, with private access to public endpoints on the Internet. In NAT gateways, connections can be initiated only from the private subnet to the public Internet and not from the Internet to the private subnet.

In certain embodiments, a Service Gateway (SGW) 826 can be configured for customer VCN 804 and provides a path for private network traffic between VCN 804 and supported services endpoints in a service network 810. In certain embodiments, service network 810 may be provided by the CSP and may provide various services. An example of such a service network is Oracle's Services Network, which provides various services that can be used by customers. For example, a compute instance (e.g., a database system) in a private subnet of customer VCN 804 can back up data to a service endpoint (e.g., Object Storage) without needing public IP addresses or access to the Internet. In certain embodiments, a VCN can have only one SGW, and connections can only be initiated from a subnet within the VCN and not from service network 810. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 826 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 832 is a gateway that can be added to customer VCN 804 and enables VCN 804 to peer with another VCN in the same region. Peering means that the VCNs communicate using private IP addresses, without the traffic traversing a public network such as the Internet or without routing the traffic through the customer's on-premises network 816. In preferred embodiments, a VCN has a separate LPG for each peering it establishes. Local Peering or VCN Peering is a common practice used to establish network connectivity between different applications or infrastructure management functions.

Service providers, such as providers of services in service network 810, may provide access to services using different access models. According to a public access model, services may be exposed as public endpoints that are publicly accessible by compute instance in a customer VCN via a public network such as the Internet and or may be privately accessible via SGW 826. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. A PE thus provides a way to present a service within a private customer VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 830 is a gateway resource that can be attached to a service provider VCN (e.g., a VCN in service network 810) that acts as an ingress/egress point for all traffic from/to customer subnet private endpoints. PAGW 830 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 830 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 832 and the PE in the customer's VCN.

A customer can control routing in a VCN at the subnet level, so the customer can specify which subnets in the customer's VCN, such as VCN 804, use each gateway. A VCN's route tables are used to decide if traffic is allowed out of a VCN through a particular gateway. For example, in a particular instance, a route table for a public subnet within customer VCN 804 may send non-local traffic through IGW 820. The route table for a private subnet within the same customer VCN 804 may send traffic destined for CSP services through SGW 826. All remaining traffic may be sent via the NAT gateway 828. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked and the response is automatically allowed without an explicit security list rule for the response traffic) or stateless.

Access from a customer VCN (i.e., by a resource or compute instance deployed on VCN 804) can be categorized as public access, private access, or dedicated access. Public access refers to an access model where a public IP address or a NAT is used to access a public endpoint. Private access enables customer workloads in VCN 804 with private IP addresses (e.g., resources in a private subnet) to access services without traversing a public network such as the Internet. In certain embodiments, CSPI 801 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premise network to CSPI and its services. FastConnect provides an easy, elastic, and economical way to create a dedicated and private connection with higher bandwidth options and a more reliable and consistent networking experience when compared to Internet-based connections.

Figure 9:
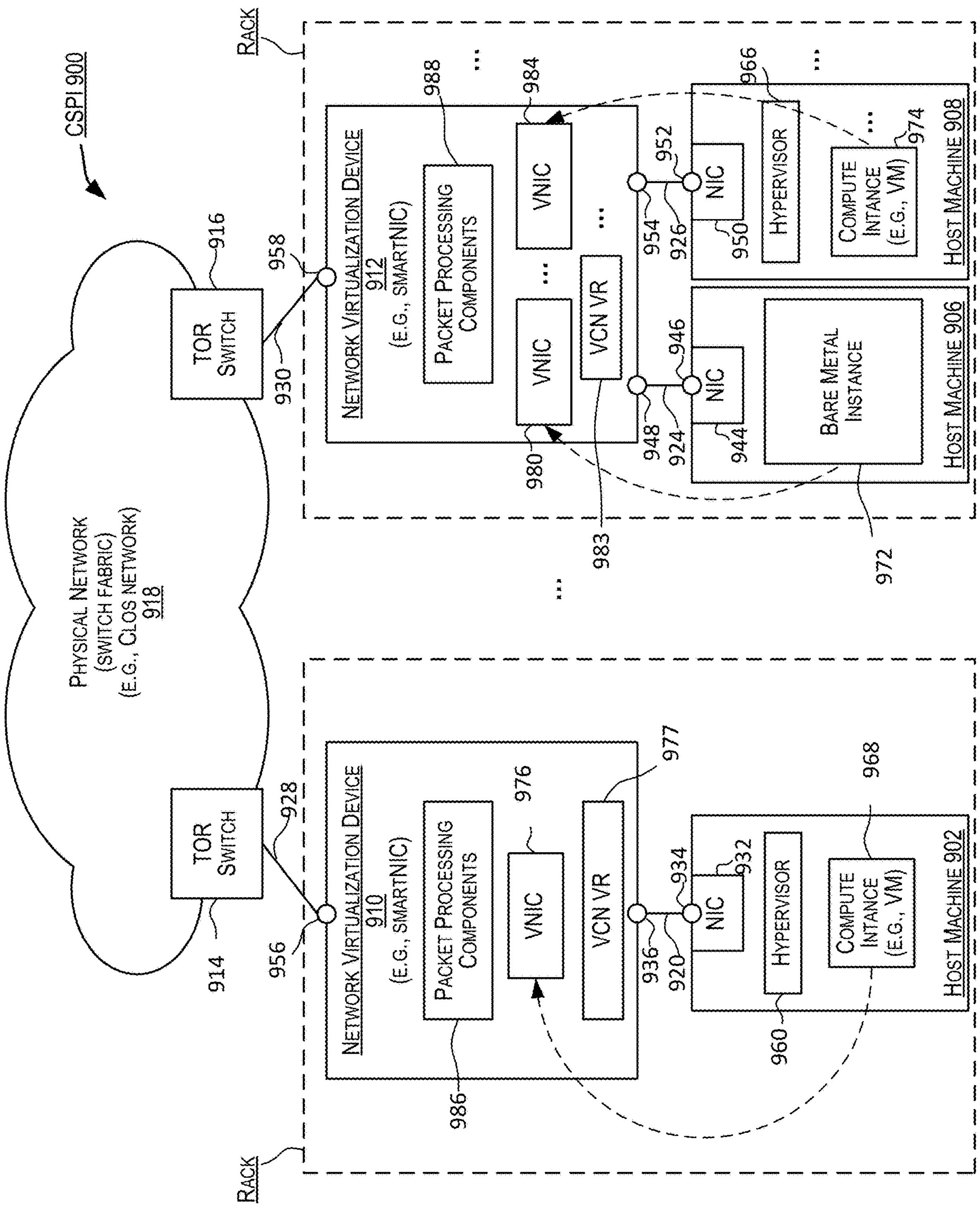
FIG. 9 depicts a simplified architectural diagram of the physical components in the physical network within CSPI according to certain embodiments.

FIG. 8 and the accompanying description above describes various virtualized components in an example virtual network. As described above, the virtual network is built on the underlying physical or substrate network. FIG. 9 depicts a simplified architectural diagram of the physical components in the physical network within CSPI 900 that provide the underlay for the virtual network according to certain embodiments. As shown, CSPI 900 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP. Based upon the services subscribed to by a customer, a subset of resources (e.g., compute, memory, and networking resources) of CSPI 900 are provisioned for the customer. Customers can then build their own cloud-based (i.e., CSPI-hosted) customizable and private virtual networks using physical compute, memory, and networking resources provided by CSPI 900. As previously indicated, these customer networks are referred to as virtual cloud networks (VCNs). A customer can deploy one or more customer resources, such as compute instances, on these customer VCNs. Compute instances can be in the form of virtual machines, bare metal instances, and the like. CSPI 900 provides infrastructure and a set of complementary cloud services that enable customers to build and run a wide range of applications and services in a highly available hosted environment.

In the example embodiment depicted in FIG. 9, the physical components of CSPI 900 include one or more physical host machines or physical servers (e.g., 902, 906, 908), network virtualization devices (NVDs) (e.g., 910, 912), top-of-rack (TOR) switches (e.g., 914, 916), and a physical network (e.g., 918), and switches in physical network 918. The physical host machines or servers may host and execute various compute instances that participate in one or more subnets of a VCN. The compute instances may include virtual machine instances, and bare metal instances. For example, the various compute instances depicted in FIG. 8 may be hosted by the physical host machines depicted in FIG. 9. The virtual machine compute instances in a VCN may be executed by one host machine or by multiple different host machines. The physical host machines may also host virtual host machines, container-based hosts or functions, and the like. The VNICs and VCN VR depicted in FIG. 8 may be executed by the NVDs depicted in FIG. 9. The gateways depicted in FIG. 8 may be executed by the host machines and/or by the NVDs depicted in FIG. 9.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 9, host machines 902 and 908 execute hypervisors 960 and 966, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 9, hypervisor 960 may sit on top of the OS of host machine 902 and enables the computing resources (e.g., processing, memory, and networking resources) of host machine 902 to be shared between compute instances (e.g., virtual machines) executed by host machine 902. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 9 may have the same or different types of hypervisors.

A compute instance can be a virtual machine instance or a bare metal instance. In FIG. 9, compute instances 968 on host machine 902 and 974 on host machine 908 are examples of virtual machine instances. Host machine 906 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 9, host machine 902 executes a virtual machine compute instance 968 that is associated with VNIC 976, and VNIC 976 is executed by NVD 910 connected to host machine 902. As another example, bare metal instance 972 hosted by host machine 906 is associated with VNIC 980 that is executed by NVD 912 connected to host machine 906. As yet another example, VNIC 984 is associated with compute instance 974 executed by host machine 908, and VNIC 984 is executed by NVD 912 connected to host machine 908.

For compute instances hosted by a host machine, an NVD connected to that host machine also executes VCN VRs corresponding to VCNs of which the compute instances are members. For example, in the embodiment depicted in FIG. 9, NVD 910 executes VCN VR 977 corresponding to the VCN of which compute instance 968 is a member. NVD 912 may also execute one or more VCN VRs 983 corresponding to VCNs corresponding to the compute instances hosted by host machines 906 and 908.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 9, host machine 902 is connected to NVD 910 using link 920 that extends between a port 934 provided by a NIC 932 of host machine 902 and between a port 936 of NVD 910. Host machine 906 is connected to NVD 912 using link 924 that extends between a port 946 provided by a NIC 944 of host machine 906 and between a port 948 of NVD 912. Host machine 908 is connected to NVD 912 using link 926 that extends between a port 952 provided by a NIC 950 of host machine 908 and between a port 954 of NVD 912.

The NVDs are in turn connected via communication links to top-of-the-rack (TOR) switches, which are connected to physical network 918 (also referred to as the switch fabric). In certain embodiments, the links between a host machine and an NVD, and between an NVD and a TOR switch are Ethernet links. For example, in FIG. 9, NVDs 910 and 912 are connected to TOR switches 914 and 916, respectively, using links 928 and 930. In certain embodiments, the links 920, 924, 926, 928, and 930 are Ethernet links. The collection of host machines and NVDs that are connected to a TOR is sometimes referred to as a rack.

Figure 12:
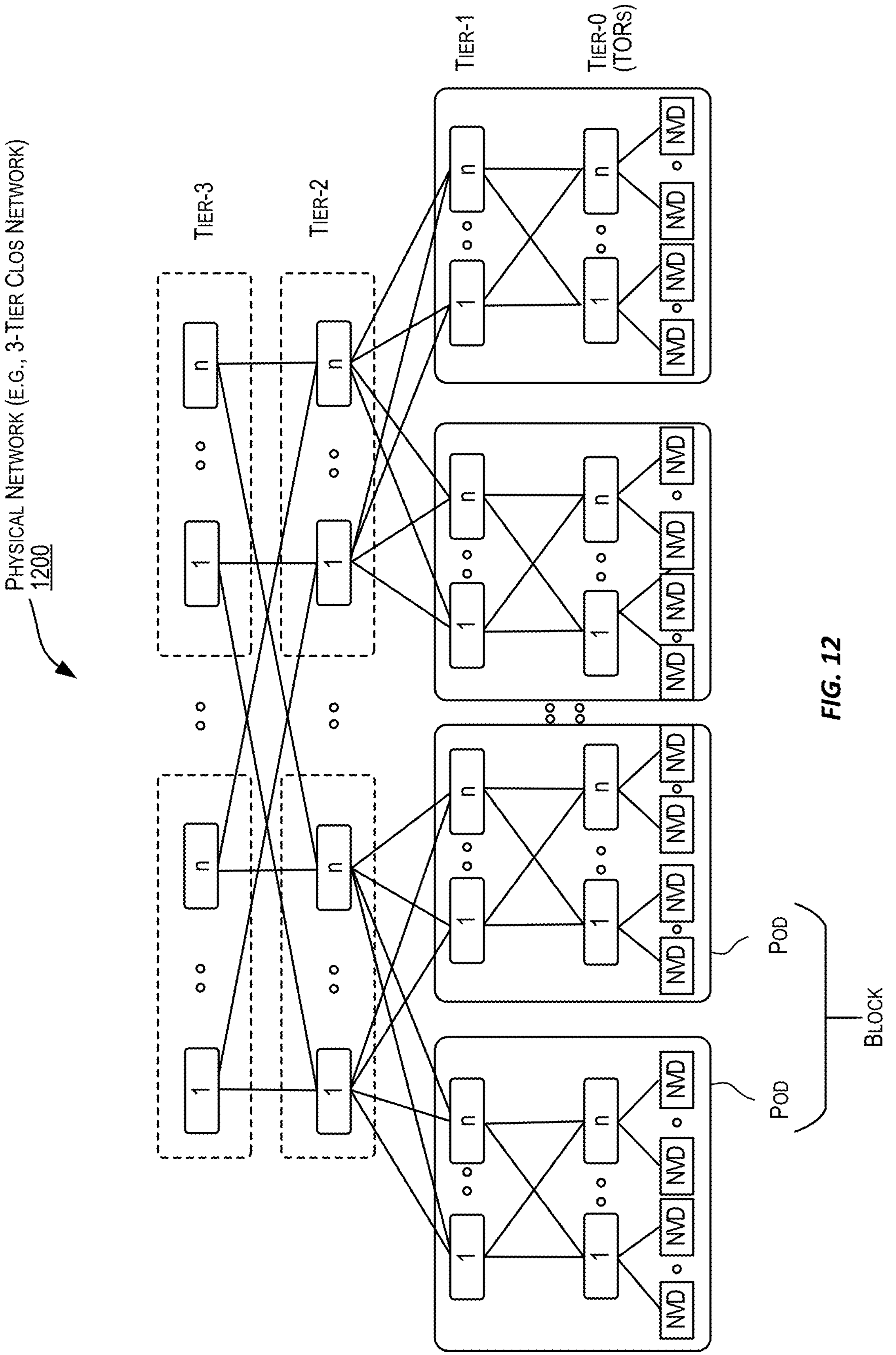
FIG. 12 depicts a simplified block diagram of a physical network provided by a CSPI according to certain embodiments.

Physical network 918 provides a communication fabric that enables TOR switches to communicate with each other. Physical network 918 can be a multi-tiered network. In certain implementations, physical network 918 is a multi-tiered Clos network of switches, with TOR switches 914 and 916 representing the leaf level nodes of the multi-tiered and multi-node physical switching network 918. Different Clos network configurations are possible including but not limited to a 2-tier network, a 3-tier network, a 4-tier network, a 5-tier network, and in general a "n"-tiered network. An example of a Clos network is depicted in FIG. 12 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 9, host machine 902 is connected to NVD 910 via NIC 932 of host machine 902. In a many-to-one configuration, multiple host machines are connected to one NVD. For example, in FIG. 9, host machines 906 and 908 are connected to the same NVD 912 via NICs 944 and 950, respectively.

Figure 10:
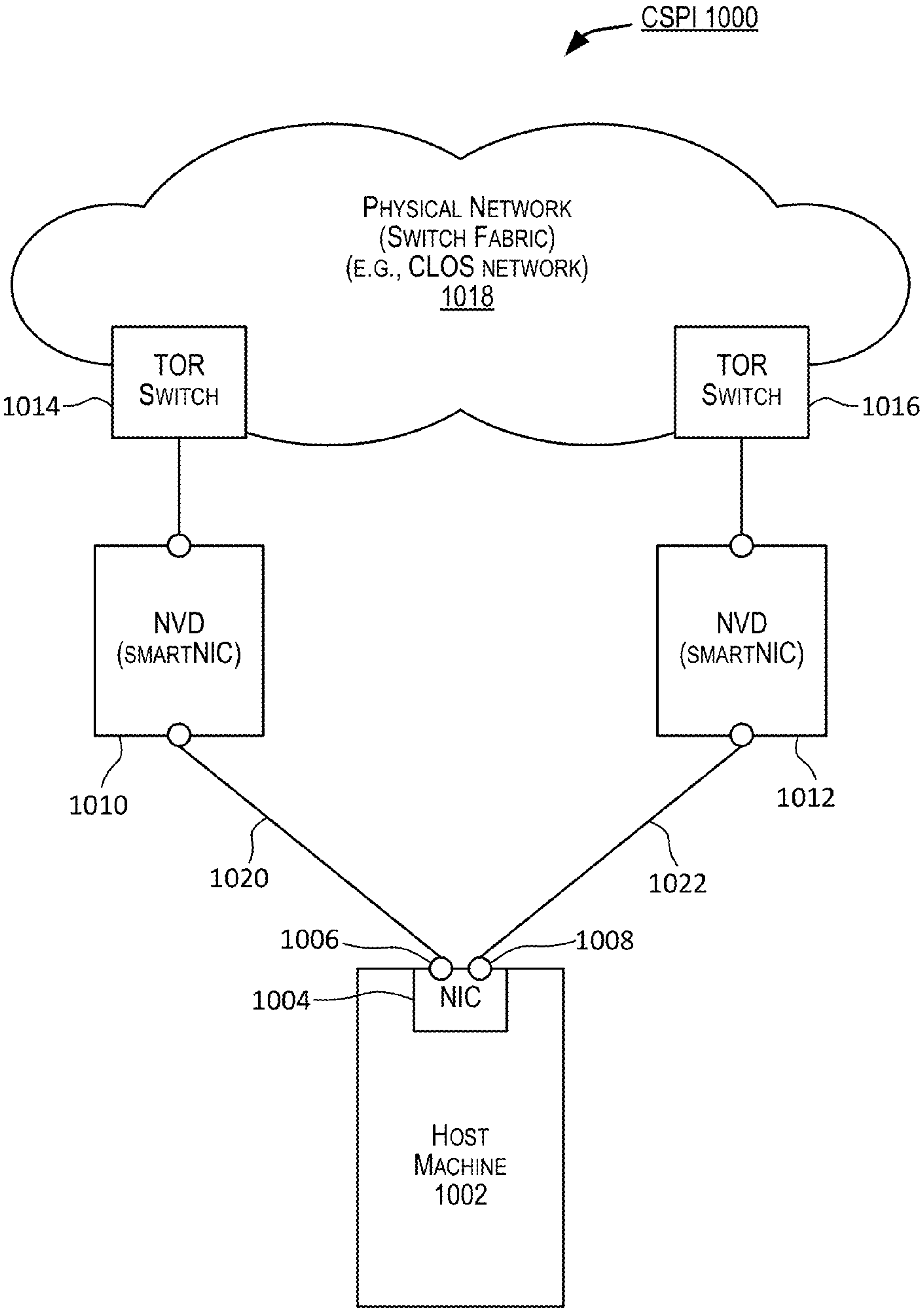
FIG. 10 shows an example arrangement within CSPI where a host machine is connected to multiple network virtualization devices (NVDs) according to certain embodiments.

In a one-to-many configuration, one host machine is connected to multiple NVDs. FIG. 10 shows an example within CSPI 1000 where a host machine is connected to multiple NVDs. As shown in FIG. 10, host machine 1002 comprises a network interface card (NIC) 1004 that includes multiple ports 1006 and 1008. Host machine 1002 is connected to a first NVD 1010 via port 1006 and link 1020, and connected to a second NVD 1012 via port 1008 and link 1022. Ports 1006 and 1008 may be Ethernet ports and the links 1020 and 1022 between host machine 1002 and NVDs 1010 and 1012 may be Ethernet links. NVD 1010 is in turn connected to a first TOR switch 1014 and NVD 1012 is connected to a second TOR switch 1016. The links between NVDs 1010 and 1012, and TOR switches 1014 and 1016 may be Ethernet links. TOR switches 1014 and 1016 represent the Tier-0 switching devices in multi-tiered physical network 1018.

The arrangement depicted in FIG. 10 provides two separate physical network paths to and from physical switch network 1018 to host machine 1002: a first path traversing TOR switch 1014 to NVD 1010 to host machine 1002, and a second path traversing TOR switch 1016 to NVD 1012 to host machine 1002. The separate paths provide for enhanced availability (referred to as high availability) of host machine 1002. If there are problems in one of the paths (e.g., a link in one of the paths goes down) or devices (e.g., a particular NVD is not functioning), then the other path may be used for communications to/from host machine 1002.

In the configuration depicted in FIG. 10, the host machine is connected to two different NVDs using two different ports provided by a NIC of the host machine. In other embodiments, a host machine may include multiple NICs that enable connectivity of the host machine to multiple NVDs.

Referring back to FIG. 9, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 9, the NVDs 910 and 912 may be implemented as smartNICs that are connected to host machines 902, and host machines 906 and 908, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 900. For example, an NVD may be embodied in a host machine where the functions performed by an NVD are performed by the host machine. As another example, an NVD may be part of a TOR switch or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 9, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 9 include port 936 on NVD 910, and ports 948 and 954 on NVD 912. A network-facing port of an NVD is a port that is used to connect the NVD to a TOR switch. Examples of network-facing ports in FIG. 9 include port 956 on NVD 910, and port 958 on NVD 912. As shown in FIG. 9, NVD 910 is connected to TOR switch 914 using link 928 that extends from port 956 of NVD 910 to the TOR switch 914. Likewise, NVD 912 is connected to TOR switch 916 using link 930 that extends from port 958 of NVD 912 to the TOR switch 916.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two end-points (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with cis in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 13, 14, 15, and 16 (see references 1316, 1416, 1516, and 1616) and described below. Examples of a VCN Data Plane are depicted in FIGS. 13, 14, 15, and 16 (see references 1318, 1418, 1518, and 1618) and described below. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 9, NVD 910 executes the functionality for VNIC 976 that is associated with compute instance 968 hosted by host machine 902 connected to NVD 910. As another example, NVD 912 executes VNIC 980 that is associated with bare metal compute instance 972 hosted by host machine 906, and executes VNIC 984 that is associated with compute instance 974 hosted by host machine 908. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 9, NVD 910 executes VCN VR 977 corresponding to the VCN to which compute instance 968 belongs. NVD 912 executes one or more VCN VRs 983 corresponding to one or more VCNs to which compute instances hosted by host machines 906 and 908 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 9. For example, NVD 910 comprises packet processing components 986 and NVD 912 comprises packet processing components 988. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 8 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 8 may be executed or hosted by one or more of the physical components depicted in FIG. 9. For example, the compute instances in a VCN may be executed or hosted by one or more host machines depicted in FIG. 9. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 9, a packet originating from compute instance 968 may be communicated from host machine 902 to NVD 910 over link 920 (using NIC 932). On NVD 910, VNIC 976 is invoked since it is the VNIC associated with source compute instance 968. VNIC 976 is configured to examine the encapsulated information in the packet, and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 900 and endpoints outside CSPI 900. Endpoints hosted by CSPI 900 may include instances in the same VCN or other VCNs, which may be the customer's VCNs, or VCNs not belonging to the customer. Communications between endpoints hosted by CSPI 900 may be performed over physical network 918. A compute instance may also communicate with endpoints that are not hosted by CSPI 900, or are outside CSPI 900. Examples of these endpoints include endpoints within a customer's on-premise network or data center, or public endpoints accessible over a public network such as the Internet. Communications with endpoints outside CSPI 900 may be performed over public networks (e.g., the Internet) (not shown in FIG. 9) or private networks (not shown in FIG. 9) using various communication protocols.

The architecture of CSPI 900 depicted in FIG. 9 is merely an example and is not intended to be limiting. Variations, alternatives, and modifications are possible in alternative embodiments. For example, in some implementations, CSPI 900 may have more or fewer systems or components than those shown in FIG. 9, may combine two or more systems, or may have a different configuration or arrangement of systems. The systems, subsystems, and other components depicted in FIG. 9 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 11:
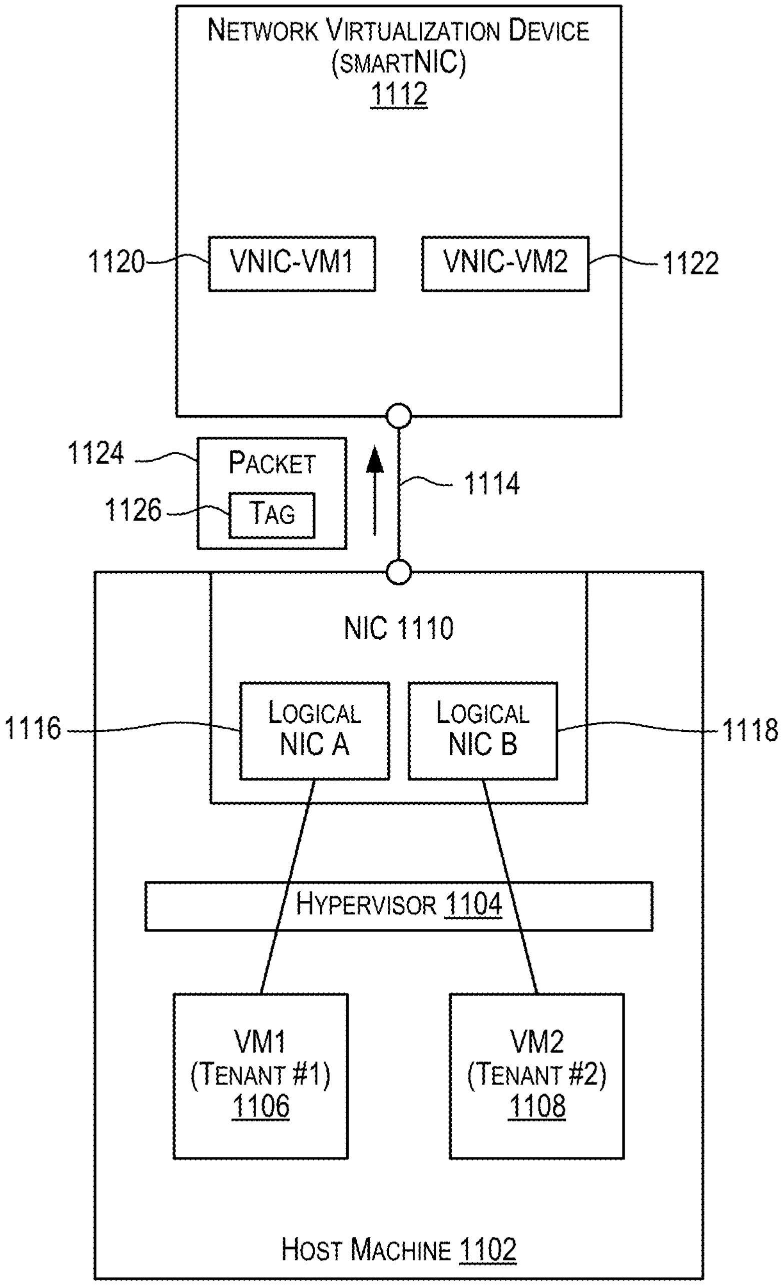
FIG. 11 depicts connectivity between a host machine and an NVD for providing I/O virtualization for supporting multitenancy according to certain embodiments.

FIG. 11 depicts connectivity between a host machine and an NVD for providing I/O virtualization for supporting multitenancy according to certain embodiments. As depicted in FIG. 11, host machine 1102 executes a hypervisor 1104 that provides a virtualized environment. Host machine 1102 executes two virtual machine instances, VM1 1106 belonging to customer/tenant #1 and VM2 1108 belonging to customer/tenant #2. Host machine 1102 comprises a physical NIC 1110 that is connected to an NVD 1112 via link 1114. Each of the compute instances is attached to a VNIC that is executed by NVD 1112. In the embodiment in FIG. 11, VM1 1106 is attached to VNIC-VM1 1120 and VM2 1108 is attached to VNIC-VM2 1122.

As shown in FIG. 11, NIC 1110 comprises two logical NICs, logical NIC A 1116 and logical NIC B 1118. Each virtual machine is attached to and configured to work with its own logical NIC. For example, VM1 1106 is attached to logical NIC A 1116 and VM2 1108 is attached to logical NIC B 1118. Even though host machine 1102 comprises only one physical NIC 1110 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 1116 for Tenant #1 and a separate VLAN ID is assigned to logical NIC B 1118 for Tenant #2. When a packet is communicated from VM1 1106, a tag assigned to Tenant #1 is attached to the packet by the hypervisor and the packet is then communicated from host machine 1102 to NVD 1112 over link 1114. In a similar manner, when a packet is communicated from VM2 1108, a tag assigned to Tenant #2 is attached to the packet by the hypervisor and the packet is then communicated from host machine 1102 to NVD 1112 over link 1114. Accordingly, a packet 1124 communicated from host machine 1102 to NVD 1112 has an associated tag 1126 that identifies a specific tenant and associated VM. On the NVD, for a packet 1124 received from host machine 1102, the tag 1126 associated with the packet is used to determine whether the packet is to be processed by VNIC-VM1 1120 or by VNIC-VM2 1122. The packet is then processed by the corresponding VNIC. The configuration depicted in FIG. 11 enables each tenant's compute instance to believe that they own their own host machine and NIC. The setup depicted in FIG. 11 provides for I/O virtualization for supporting multi-tenancy.

FIG. 12 depicts a simplified block diagram of a physical network 1200 according to certain embodiments. The embodiment depicted in FIG. 12 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 12 is a 3-tiered network comprising tiers 1, 2, and 3. The TOR switches 1204 represent Tier-0 switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. 12, a set of "n" Tier-0 TOR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 1200 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID). This identifier is included as part of the resource's information and can be used to manage the resource, for example, via a Console or through APIs. An example syntax for a CID is:

ocid1.<RESOURCE TYPE>.<REALM>.[REGION][.FUTURE USE].<UNIQUE ID> where,

- ocid1: The literal string indicating the version of the CID;
- resource type: The type of resource (for example, instance, volume, VCN, subnet, user, group, and so on);
- realm: The realm the resource is in. Example values are "c1" for the commercial realm, "c2" for the Government Cloud realm, or "c3" for the Federal Government Cloud realm, etc. Each realm may have its own domain name;
- region: The region the resource is in. If the region is not applicable to the resource, this part might be blank;
- future use: Reserved for future use.
- unique ID: The unique portion of the ID. The format may vary depending on the type of resource or service.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 13:
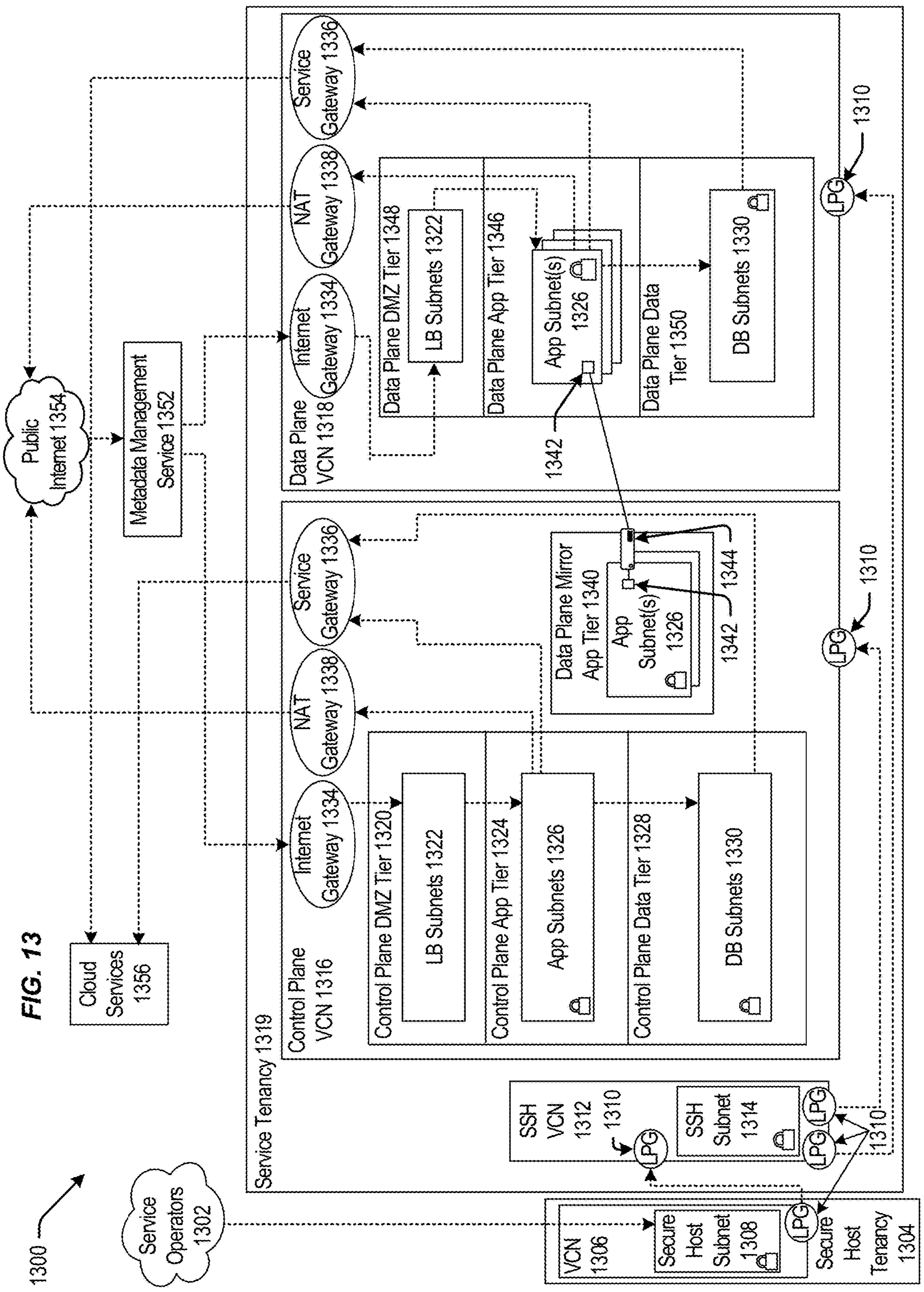
FIG. 13 is a block diagram illustrating one pattern for implementing a cloud infrastructure as a service system, according to at least one embodiment.

FIG. 13 is a block diagram 1300 illustrating an example pattern of an IaaS architecture, according to at least one embodiment. Service operators 1302 can be communicatively coupled to a secure host tenancy 1304 that can include a virtual cloud network (VCN) 1306 and a secure host subnet 1308. In some examples, the service operators 1302 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1306 and/or the Internet.

The VCN 1306 can include a local peering gateway (LPG) 1310 that can be communicatively coupled to a secure shell (SSH) VCN 1312 via an LPG 1310 contained in the SSH VCN 1312. The SSH VCN 1312 can include an SSH subnet 1314, and the SSH VCN 1312 can be communicatively coupled to a control plane VCN 1316 via the LPG 1310 contained in the control plane VCN 1316. Also, the SSH VCN 1312 can be communicatively coupled to a data plane VCN 1318 via an LPG 1310. The control plane VCN 1316 and the data plane VCN 1318 can be contained in a service tenancy 1319 that can be owned and/or operated by the IaaS provider.

The control plane VCN 1316 can include a control plane demilitarized zone (DMZ) tier 1320 that acts as a perimeter network (e.g., portions of a corporate network between the corporate intranet and external networks). The DMZ-based servers may have restricted responsibilities and help keep security breaches contained. Additionally, the DMZ tier 1320 can include one or more load balancer (LB) subnet(s) 1322, a control plane app tier 1324 that can include app subnet(s) 1326, a control plane data tier 1328 that can include database (DB) subnet(s) 1330 (e.g., frontend DB subnet(s) and/or backend DB subnet(s)). The LB subnet(s) 1322 contained in the control plane DMZ tier 1320 can be communicatively coupled to the app subnet(s) 1326 contained in the control plane app tier 1324 and an Internet gateway 1334 that can be contained in the control plane VCN 1316, and the app subnet(s) 1326 can be communicatively coupled to the DB subnet(s) 1330 contained in the control plane data tier 1328 and a service gateway 1336 and a network address translation (NAT) gateway 1338. The control plane VCN 1316 can include the service gateway 1336 and the NAT gateway 1338.

The control plane VCN 1316 can include a data plane mirror app tier 1340 that can include app subnet(s) 1326. The app subnet(s) 1326 contained in the data plane mirror app tier 1340 can include a virtual network interface controller (VNIC) 1342 that can execute a compute instance 1344. The compute instance 1344 can communicatively couple the app subnet(s) 1326 of the data plane mirror app tier 1340 to app subnet(s) 1326 that can be contained in a data plane app tier 1346.

The data plane VCN 1318 can include the data plane app tier 1346, a data plane DMZ tier 1348, and a data plane data tier 1350. The data plane DMZ tier 1348 can include LB subnet(s) 1322 that can be communicatively coupled to the app subnet(s) 1326 of the data plane app tier 1346 and the Internet gateway 1334 of the data plane VCN 1318. The app subnet(s) 1326 can be communicatively coupled to the service gateway 1336 of the data plane VCN 1318 and the NAT gateway 1338 of the data plane VCN 1318. The data plane data tier 1350 can also include the DB subnet(s) 1330 that can be communicatively coupled to the app subnet(s) 1326 of the data plane app tier 1346.

The Internet gateway 1334 of the control plane VCN 1316 and of the data plane VCN 1318 can be communicatively coupled to a metadata management service 1352 that can be communicatively coupled to public Internet 1354. Public Internet 1354 can be communicatively coupled to the NAT gateway 1338 of the control plane VCN 1316 and of the data plane VCN 1318. The service gateway 1336 of the control plane VCN 1316 and of the data plane VCN 1318 can be communicatively couple to cloud services 1356.

In some examples, the service gateway 1336 of the control plane VCN 1316 or of the data plane VCN 1318 can make application programming interface (API) calls to cloud services 1356 without going through public Internet 1354. The API calls to cloud services 1356 from the service gateway 1336 can be one-way: the service gateway 1336 can make API calls to cloud services 1356, and cloud services 1356 can send requested data to the service gateway 1336. But, cloud services 1356 may not initiate API calls to the service gateway 1336.

In some examples, the secure host tenancy 1304 can be directly connected to the service tenancy 1319, which may be otherwise isolated. The secure host subnet 1308 can communicate with the SSH subnet 1314 through an LPG 1310 that may enable two-way communication over an otherwise isolated system. Connecting the secure host subnet 1308 to the SSH subnet 1314 may give the secure host subnet 1308 access to other entities within the service tenancy 1319.

The control plane VCN 1316 may allow users of the service tenancy 1319 to set up or otherwise provision desired resources. Desired resources provisioned in the control plane VCN 1316 may be deployed or otherwise used in the data plane VCN 1318. In some examples, the control plane VCN 1316 can be isolated from the data plane VCN 1318, and the data plane mirror app tier 1340 of the control plane VCN 1316 can communicate with the data plane app tier 1346 of the data plane VCN 1318 via VNICs 1342 that can be contained in the data plane mirror app tier 1340 and the data plane app tier 1346.

In some examples, users of the system, or customers, can make requests, for example create, read, update, or delete (CRUD) operations, through public Internet 1354 that can communicate the requests to the metadata management service 1352. The metadata management service 1352 can communicate the request to the control plane VCN 1316 through the Internet gateway 1334. The request can be received by the LB subnet(s) 1322 contained in the control plane DMZ tier 1320. The LB subnet(s) 1322 may determine that the request is valid, and in response to this determination, the LB subnet(s) 1322 can transmit the request to app subnet(s) 1326 contained in the control plane app tier 1324. If the request is validated and requires a call to public Internet 1354, the call to public Internet 1354 may be transmitted to the NAT gateway 1338 that can make the call to public Internet 1354. Memory that may be desired to be stored by the request can be stored in the DB subnet(s) 1330.

In some examples, the data plane mirror app tier 1340 can facilitate direct communication between the control plane VCN 1316 and the data plane VCN 1318. For example, changes, updates, or other suitable modifications to configuration may be desired to be applied to the resources contained in the data plane VCN 1318. Via a VNIC 1342, the control plane VCN 1316 can directly communicate with, and can thereby execute the changes, updates, or other suitable modifications to configuration to, resources contained in the data plane VCN 1318.

In some embodiments, the control plane VCN 1316 and the data plane VCN 1318 can be contained in the service tenancy 1319. In this case, the user, or the customer, of the system may not own or operate either the control plane VCN 1316 or the data plane VCN 1318. Instead, the IaaS provider may own or operate the control plane VCN 1316 and the data plane VCN 1318, both of which may be contained in the service tenancy 1319. This embodiment can enable isolation of networks that may prevent users or customers from interacting with other users', or other customers', resources. Also, this embodiment may allow users or customers of the system to store databases privately without needing to rely on public Internet 1354, which may not have a desired level of security, for storage.

In other embodiments, the LB subnet(s) 1322 contained in the control plane VCN 1316 can be configured to receive a signal from the service gateway 1336. In this embodiment, the control plane VCN 1316 and the data plane VCN 1318 may be configured to be called by a customer of the IaaS provider without calling public Internet 1354. Customers of the IaaS provider may desire this embodiment since database(s) that the customers use may be controlled by the IaaS provider and may be stored on the service tenancy 1319, which may be isolated from public Internet 1354.

Figure 14:
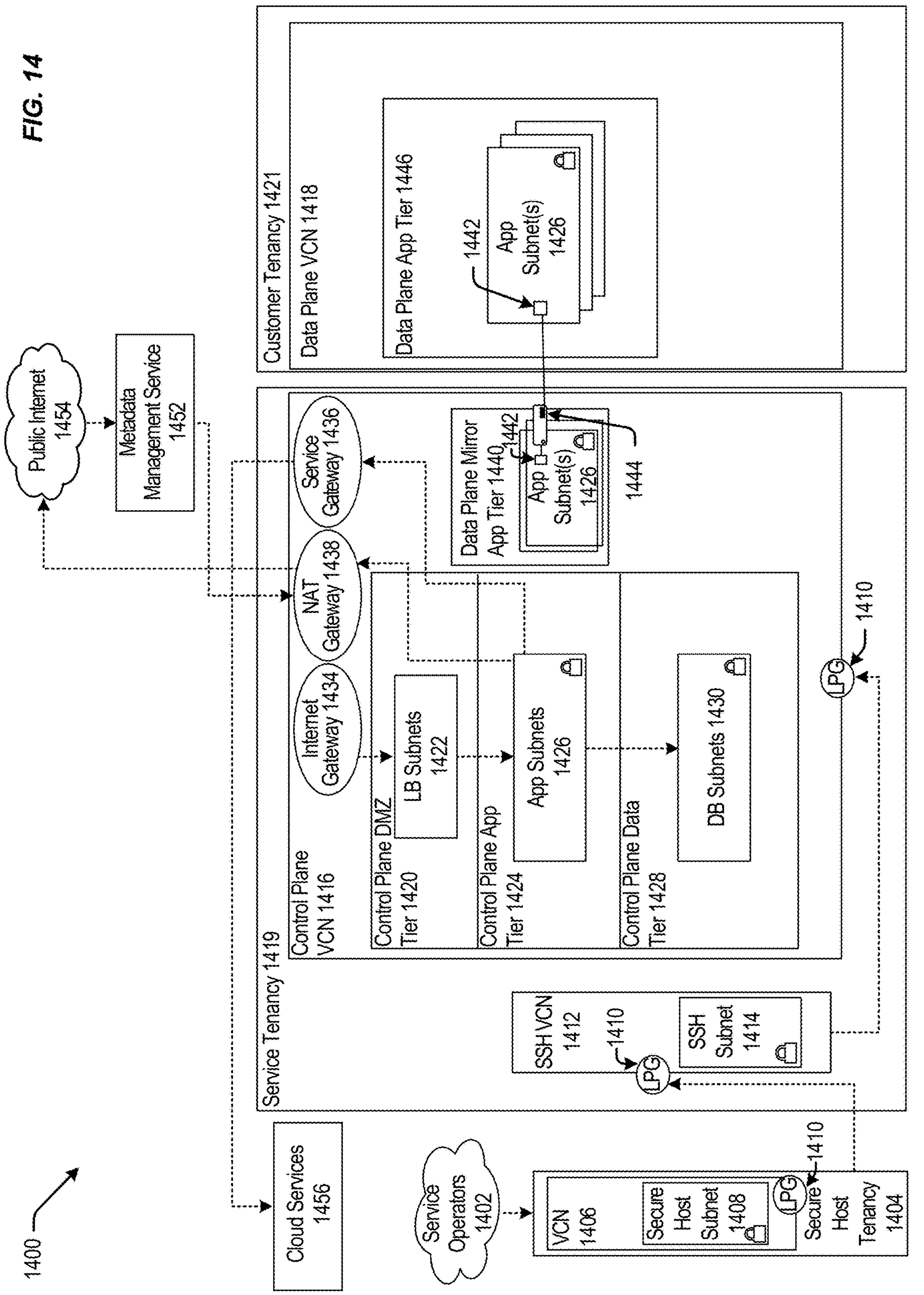
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g. service operators 1302 of FIG. 13) can be communicatively coupled to a secure host tenancy 1404 (e.g. the secure host tenancy 1304 of FIG. 13) that can include a virtual cloud network (VCN) 1406 (e.g. the VCN 1306 of FIG. 13) and a secure host subnet 1408 (e.g. the secure host subnet 1308 of FIG. 13). The VCN 1406 can include a local peering gateway (LPG) 1410 (e.g. the LPG 1310 of FIG. 13) that can be communicatively coupled to a secure shell (SSH) VCN 1412 (e.g. the SSH VCN 1312 of FIG. 13) via an LPG 1310 contained in the SSH VCN 1412. The SSH VCN 1412 can include an SSH subnet 1414 (e.g. the SSH subnet 1314 of FIG. 13), and the SSH VCN 1412 can be communicatively coupled to a control plane VCN 1416 (e.g. the control plane VCN 1316 of FIG. 13) via an LPG 1410 contained in the control plane VCN 1416. The control plane VCN 1416 can be contained in a service tenancy 1419 (e.g. the service tenancy 1319 of FIG. 13), and the data plane VCN 1418 (e.g. the data plane VCN 1318 of FIG. 13) can be contained in a customer tenancy 1421 that may be owned or operated by users, or customers, of the system.

The control plane VCN 1416 can include a control plane DMZ tier 1420 (e.g. the control plane DMZ tier 1320 of FIG. 13) that can include LB subnet(s) 1422 (e.g. LB subnet(s) 1322 of FIG. 13), a control plane app tier 1424 (e.g. the control plane app tier 1324 of FIG. 13) that can include app subnet(s) 1426 (e.g. app subnet(s) 1326 of FIG. 13), a control plane data tier 1428 (e.g. the control plane data tier 1328 of FIG. 13) that can include database (DB) subnet(s)

1430 (e.g. similar to DB subnet(s) 1330 of FIG. 13). The LB subnet(s) 1422 contained in the control plane DMZ tier 1420 can be communicatively coupled to the app subnet(s) 1426 contained in the control plane app tier 1424 and an Internet gateway 1434 (e.g. the Internet gateway 1334 of FIG. 13) that can be contained in the control plane VCN 1416, and the app subnet(s) 1426 can be communicatively coupled to the DB subnet(s) 1430 contained in the control plane data tier 1428 and a service gateway 1436 (e.g. the service gateway of FIG. 13) and a network address translation (NAT) gateway 1438 (e.g. the NAT gateway 1338 of FIG. 13). The control plane VCN 1416 can include the service gateway 1436 and the NAT gateway 1438.

The control plane VCN 1416 can include a data plane mirror app tier 1440 (e.g. the data plane mirror app tier 1340 of FIG. 13) that can include app subnet(s) 1426. The app subnet(s) 1426 contained in the data plane mirror app tier 1440 can include a virtual network interface controller (VNIC) 1442 (e.g. the VNIC of 1342) that can execute a compute instance 1444 (e.g. similar to the compute instance 1344 of FIG. 13). The compute instance 1444 can facilitate communication between the app subnet(s) 1426 of the data plane mirror app tier 1440 and the app subnet(s) 1426 that can be contained in a data plane app tier 1446 (e.g. the data plane app tier 1346 of FIG. 13) via the VNIC 1442 contained in the data plane mirror app tier 1440 and the VNIC 1442 contained in the data plane app tier 1446.

The Internet gateway 1434 contained in the control plane VCN 1416 can be communicatively coupled to a metadata management service 1452 (e.g. the metadata management service 1352 of FIG. 13) that can be communicatively coupled to public Internet 1454 (e.g. public Internet 1354 of FIG. 13). Public Internet 1454 can be communicatively coupled to the NAT gateway 1438 contained in the control plane VCN 1416. The service gateway 1436 contained in the control plane VCN 1416 can be communicatively couple to cloud services 1456 (e.g. cloud services 1356 of FIG. 13).

In some examples, the data plane VCN 1418 can be contained in the customer tenancy 1421. In this case, the IaaS provider may provide the control plane VCN 1416 for each customer, and the IaaS provider may, for each customer, set up a unique compute instance 1444 that is contained in the service tenancy 1419. Each compute instance 1444 may allow communication between the control plane VCN 1416, contained in the service tenancy 1419, and the data plane VCN 1418 that is contained in the customer tenancy 1421. The compute instance 1444 may allow resources, that are provisioned in the control plane VCN 1416 that is contained in the service tenancy 1419, to be deployed or otherwise used in the data plane VCN 1418 that is contained in the customer tenancy 1421.

In other examples, the customer of the IaaS provider may have databases that live in the customer tenancy 1421. In this example, the control plane VCN 1416 can include the data plane mirror app tier 1440 that can include app subnet(s) 1426. The data plane mirror app tier 1440 can reside in the data plane VCN 1418, but the data plane mirror app tier 1440 may not live in the data plane VCN 1418. That is, the data plane mirror app tier 1440 may have access to the customer tenancy 1421, but the data plane mirror app tier 1440 may not exist in the data plane VCN 1418 or be owned or operated by the customer of the IaaS provider. The data plane mirror app tier 1440 may be configured to make calls to the data plane VCN 1418 but may not be configured to make calls to any entity contained in the control plane VCN 1416. The customer may desire to deploy or otherwise use resources in the data plane VCN 1418 that are provisioned in the control plane VCN 1416, and the data plane mirror app tier 1440 can facilitate the desired deployment, or other usage of resources, of the customer.

In some embodiments, the customer of the IaaS provider can apply filters to the data plane VCN 1418. In this embodiment, the customer can determine what the data plane VCN 1418 can access, and the customer may restrict access to public Internet 1454 from the data plane VCN 1418. The IaaS provider may not be able to apply filters or otherwise control access of the data plane VCN 1418 to any outside networks or databases. Applying filters and controls by the customer onto the data plane VCN 1418, contained in the customer tenancy 1421, can help isolate the data plane VCN 1418 from other customers and from public Internet 1454.

In some embodiments, cloud services 1456 can be called by the service gateway 1436 to access services that may not exist on public Internet 1454, on the control plane VCN 1416, or on the data plane VCN 1418. The connection between cloud services 1456 and the control plane VCN 1416 or the data plane VCN 1418 may not be live or continuous. Cloud services 1456 may exist on a different network owned or operated by the IaaS provider. Cloud services 1456 may be configured to receive calls from the service gateway 1436 and may be configured to not receive calls from public Internet 1454. Some cloud services 1456 may be isolated from other cloud services 1456, and the control plane VCN 1416 may be isolated from cloud services 1456 that may not be in the same region as the control plane VCN 1416. For example, the control plane VCN 1416 may be located in "Region 1," and cloud service "Deployment 13," may be located in Region 1 and in "Region 2." If a call to Deployment 13 is made by the service gateway 1436 contained in the control plane VCN 1416 located in Region 1, the call may be transmitted to Deployment 13 in Region 1. In this example, the control plane VCN 1416, or Deployment 13 in Region 1, may not be communicatively coupled to, or otherwise in communication with, Deployment 13 in Region 2.

Figure 15:
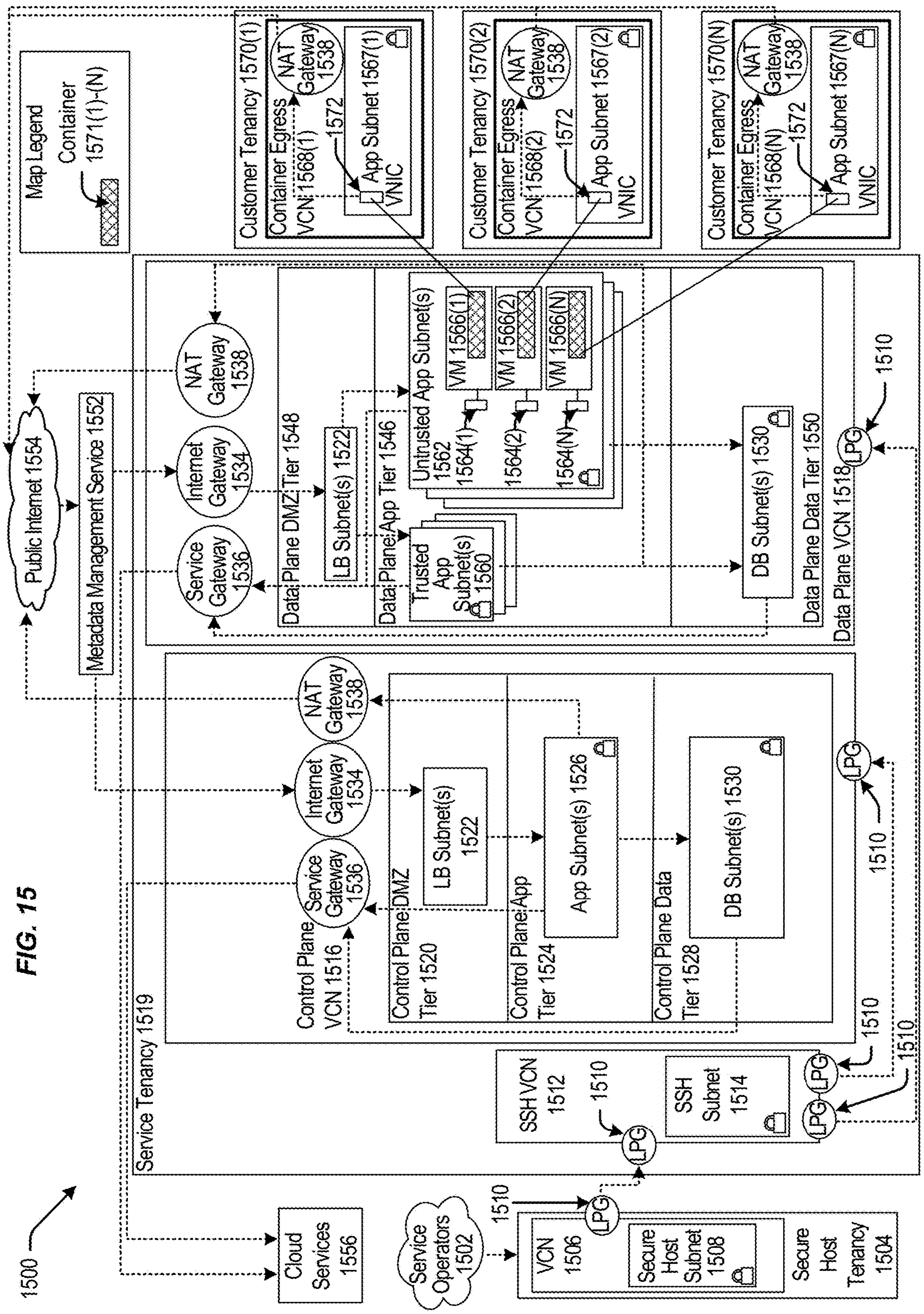
FIG. 15 is a block diagram illustrating another pattern for implementing a cloud infrastructure as a service system, according to at least one embodiment.

FIG. 15 is a block diagram 1500 illustrating another example pattern of an IaaS architecture, according to at least one embodiment. Service operators 1502 (e.g. service operators 1302 of FIG. 13) can be communicatively coupled to a secure host tenancy 1504 (e.g. the secure host tenancy 1304 of FIG. 13) that can include a virtual cloud network (VCN) 1506 (e.g. the VCN 1306 of FIG. 13) and a secure host subnet 1508 (e.g. the secure host subnet 1308 of FIG. 13). The VCN 1506 can include an LPG 1510 (e.g. the LPG 1310 of FIG. 13) that can be communicatively coupled to an SSH VCN 1512 (e.g. the SSH VCN 1312 of FIG. 13) via an LPG 1510 contained in the SSH VCN 1512. The SSH VCN 1512 can include an SSH subnet 1514 (e.g. the SSH subnet 1314 of FIG. 13), and the SSH VCN 1512 can be communicatively coupled to a control plane VCN 1516 (e.g. the control plane VCN 1316 of FIG. 13) via an LPG 1510 contained in the control plane VCN 1516 and to a data plane VCN 1518 (e.g. the data plane 1318 of FIG. 13) via an LPG 1510 contained in the data plane VCN 1518. The control plane VCN 1516 and the data plane VCN 1518 can be contained in a service tenancy 1519 (e.g. the service tenancy 1319 of FIG. 13).

The control plane VCN 1516 can include a control plane DMZ tier 1520 (e.g. the control plane DMZ tier 1320 of FIG. 13) that can include load balancer (LB) subnet(s) 1522 (e.g. LB subnet(s) 1322 of FIG. 13), a control plane app tier 1524 (e.g. the control plane app tier 1324 of FIG. 13) that can include app subnet(s) 1526 (e.g. similar to app subnet(s)

1326 of FIG. 13), a control plane data tier 1528 (e.g. the control plane data tier 1328 of FIG. 13) that can include DB subnet(s) 1530. The LB subnet(s) 1522 contained in the control plane DMZ tier 1520 can be communicatively coupled to the app subnet(s) 1526 contained in the control plane app tier 1524 and to an Internet gateway 1534 (e.g. the Internet gateway 1334 of FIG. 13) that can be contained in the control plane VCN 1516, and the app subnet(s) 1526 can be communicatively coupled to the DB subnet(s) 1530 contained in the control plane data tier 1528 and to a service gateway 1536 (e.g. the service gateway of FIG. 13) and a network address translation (NAT) gateway 1538 (e.g. the NAT gateway 1338 of FIG. 13). The control plane VCN 1516 can include the service gateway 1536 and the NAT gateway 1538.

The data plane VCN 1518 can include a data plane app tier 1546 (e.g. the data plane app tier 1346 of FIG. 13), a data plane DMZ tier 1548 (e.g. the data plane DMZ tier 1348 of FIG. 13), and a data plane data tier 1550 (e.g. the data plane data tier 1350 of FIG. 13). The data plane DMZ tier 1548 can include LB subnet(s) 1522 that can be communicatively coupled to trusted app subnet(s) 1560 and untrusted app subnet(s) 1562 of the data plane app tier 1546 and the Internet gateway 1534 contained in the data plane VCN 1518. The trusted app subnet(s) 1560 can be communicatively coupled to the service gateway 1536 contained in the data plane VCN 1518, the NAT gateway 1538 contained in the data plane VCN 1518, and DB subnet(s) 1530 contained in the data plane data tier 1550. The untrusted app subnet(s) 1562 can be communicatively coupled to the service gateway 1536 contained in the data plane VCN 1518 and DB subnet(s) 1530 contained in the data plane data tier 1550. The data plane data tier 1550 can include DB subnet(s) 1530 that can be communicatively coupled to the service gateway 1536 contained in the data plane VCN 1518.

The untrusted app subnet(s) 1562 can include one or more primary VNICs 1564(1)-(N) that can be communicatively coupled to tenant virtual machines (VMs) 1566(1)-(N). Each tenant VM 1566(1)-(N) can be communicatively coupled to a respective app subnet 1567(1)-(N) that can be contained in respective container egress VCNs 1568(1)-(N) that can be contained in respective customer tenancies 1570(1)-(N). Respective secondary VNICs 1572(1)-(N) can facilitate communication between the untrusted app subnet(s) 1562 contained in the data plane VCN 1518 and the app subnet contained in the container egress VCNs 1568(1)-(N). Each container egress VCNs 1568(1)-(N) can include a NAT gateway 1538 that can be communicatively coupled to public Internet 1554 (e.g. public Internet 1354 of FIG. 13).

The Internet gateway 1534 contained in the control plane VCN 1516 and contained in the data plane VCN 1518 can be communicatively coupled to a metadata management service 1552 (e.g. the metadata management system 1352 of FIG. 13) that can be communicatively coupled to public Internet 1554. Public Internet 1554 can be communicatively coupled to the NAT gateway 1538 contained in the control plane VCN 1516 and contained in the data plane VCN 1518. The service gateway 1536 contained in the control plane VCN 1516 and contained in the data plane VCN 1518 can be communicatively couple to cloud services 1556.

In some embodiments, the data plane VCN 1518 can be integrated with customer tenancies 1570. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1546. Code to run the function may be executed in the VMs 1566(1)-(N), and the code may not be configured to run anywhere else on the data plane VCN 1518. Each VM 1566(1)-(N) may be connected to one customer tenancy 1570. Respective containers 1571(1)-(N) contained in the VMs 1566(1)-(N) may be configured to run the code. In this case, there can be a dual isolation (e.g., the containers 1571(1)-(N) running code, where the containers 1571(1)-(N) may be contained in at least the VM 1566(1)-(N) that are contained in the untrusted app subnet(s) 1562), which may help prevent incorrect or otherwise undesirable code from damaging the network of the IaaS provider or from damaging a network of a different customer. The containers 1571(1)-(N) may be communicatively coupled to the customer tenancy 1570 and may be configured to transmit or receive data from the customer tenancy 1570. The containers 1571(1)-(N) may not be configured to transmit or receive data from any other entity in the data plane VCN 1518. Upon completion of running the code, the IaaS provider may kill or otherwise dispose of the containers 1571(1)-(N).

In some embodiments, the trusted app subnet(s) 1560 may run code that may be owned or operated by the IaaS provider. In this embodiment, the trusted app subnet(s) 1560 may be communicatively coupled to the DB subnet(s) 1530 and be configured to execute CRUD operations in the DB subnet(s) 1530. The untrusted app subnet(s) 1562 may be communicatively coupled to the DB subnet(s) 1530, but in this embodiment, the untrusted app subnet(s) may be configured to execute read operations in the DB subnet(s) 1530. The containers 1571(1)-(N) that can be contained in the VM 1566(1)-(N) of each customer and that may run code from the customer may not be communicatively coupled with the DB subnet(s) 1530.

In other embodiments, the control plane VCN 1516 and the data plane VCN 1518 may not be directly communicatively coupled. In this embodiment, there may be no direct communication between the control plane VCN 1516 and the data plane VCN 1518. However, communication can occur indirectly through at least one method. An LPG 1510 may be established by the IaaS provider that can facilitate communication between the control plane VCN 1516 and the data plane VCN 1518. In another example, the control plane VCN 1516 or the data plane VCN 1518 can make a call to cloud services 1556 via the service gateway 1536. For example, a call to cloud services 1556 from the control plane VCN 1516 can include a request for a service that can communicate with the data plane VCN 1518.

Figure 16:
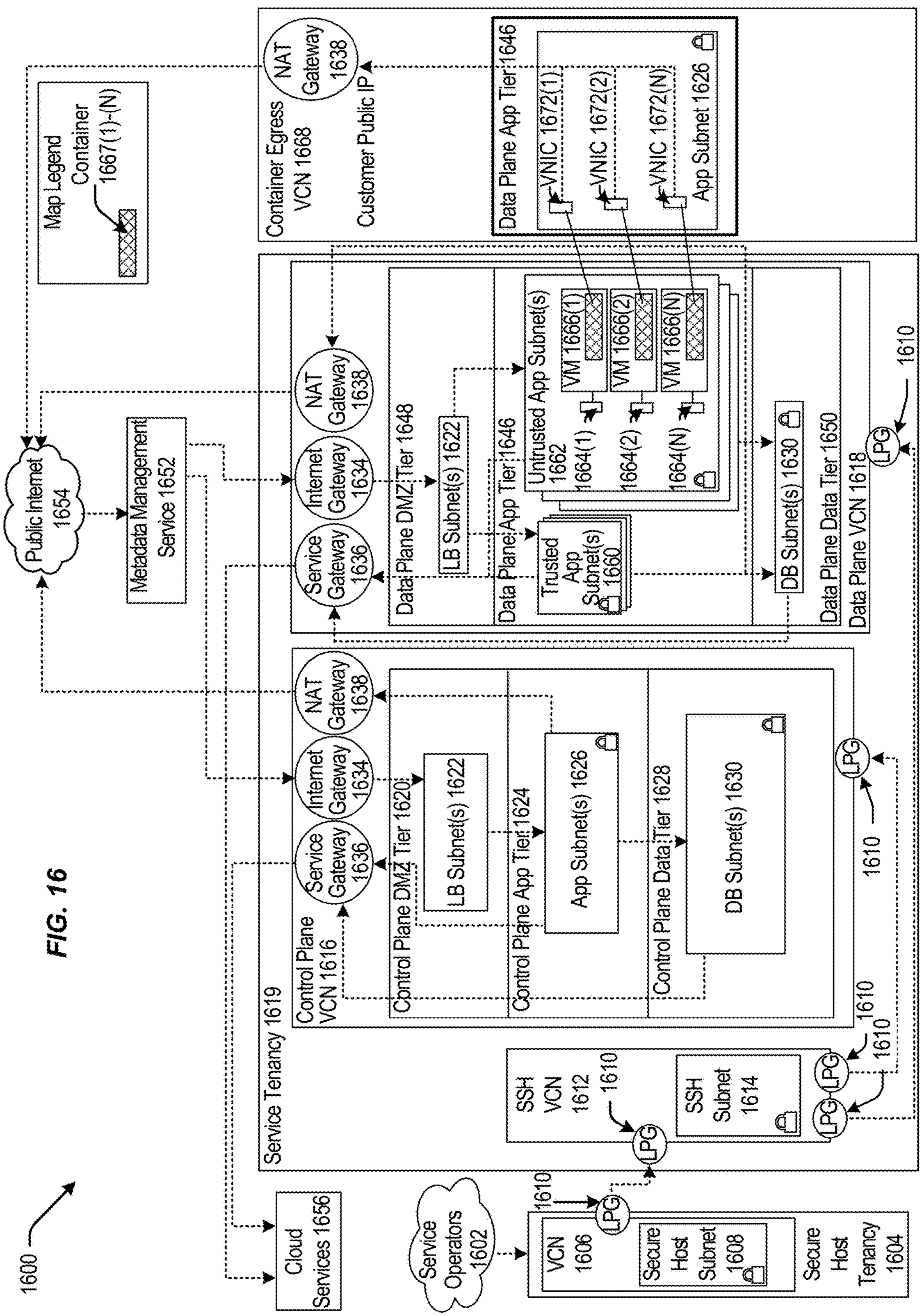
FIG. 16 is a block diagram illustrating another pattern for implementing a cloud infrastructure as a service system, according to at least one embodiment.

FIG. 16 is a block diagram 1600 illustrating another example pattern of an IaaS architecture, according to at least one embodiment. Service operators 1602 (e.g. service operators 1302 of FIG. 13) can be communicatively coupled to a secure host tenancy 1604 (e.g. the secure host tenancy 1304 of FIG. 13) that can include a virtual cloud network (VCN) 1606 (e.g. the VCN 1306 of FIG. 13) and a secure host subnet 1608 (e.g. the secure host subnet 1308 of FIG. 13). The VCN 1606 can include an LPG 1610 (e.g. the LPG 1310 of FIG. 13) that can be communicatively coupled to an SSH VCN 1612 (e.g. the SSH VCN 1312 of FIG. 13) via an LPG 1610 contained in the SSH VCN 1612. The SSH VCN 1612 can include an SSH subnet 1614 (e.g. the SSH subnet 1314 of FIG. 13), and the SSH VCN 1612 can be communicatively coupled to a control plane VCN 1616 (e.g. the control plane VCN 1316 of FIG. 13) via an LPG 1610 contained in the control plane VCN 1616 and to a data plane VCN 1618 (e.g. the data plane 1318 of FIG. 13) via an LPG 1610 contained in the data plane VCN 1618. The control plane VCN 1616 and the data plane VCN 1618 can be contained in a service tenancy 1619 (e.g. the service tenancy 1319 of FIG. 13).

The control plane VCN 1616 can include a control plane DMZ tier 1620 (e.g. the control plane DMZ tier 1320 of FIG. 13) that can include LB subnet(s) 1622 (e.g. LB subnet(s) 1322 of FIG. 13), a control plane app tier 1624 (e.g. the control plane app tier 1324 of FIG. 13) that can include app subnet(s) 1626 (e.g. app subnet(s) 1326 of FIG. 13), a control plane data tier 1628 (e.g. the control plane data tier 1328 of FIG. 13) that can include DB subnet(s) 1630 (e.g. DB subnet(s) 1530 of FIG. 15). The LB subnet(s) 1622 contained in the control plane DMZ tier 1620 can be communicatively coupled to the app subnet(s) 1626 contained in the control plane app tier 1624 and to an Internet gateway 1634 (e.g. the Internet gateway 1334 of FIG. 13) that can be contained in the control plane VCN 1616, and the app subnet(s) 1626 can be communicatively coupled to the DB subnet(s) 1630 contained in the control plane data tier 1628 and to a service gateway 1636 (e.g. the service gateway of FIG. 13) and a network address translation (NAT) gateway 1638 (e.g. the NAT gateway 1338 of FIG. 13). The control plane VCN 1616 can include the service gateway 1636 and the NAT gateway 1638.

The data plane VCN 1618 can include a data plane app tier 1646 (e.g. the data plane app tier 1346 of FIG. 13), a data plane DMZ tier 1648 (e.g. the data plane DMZ tier 1348 of FIG. 13), and a data plane data tier 1650 (e.g. the data plane data tier 1350 of FIG. 13). The data plane DMZ tier 1648 can include LB subnet(s) 1622 that can be communicatively coupled to trusted app subnet(s) 1660 (e.g. trusted app subnet(s) 1560 of FIG. 15) and untrusted app subnet(s) 1662 (e.g. untrusted app subnet(s) 1562 of FIG. 15) of the data plane app tier 1646 and the Internet gateway 1634 contained in the data plane VCN 1618. The trusted app subnet(s) 1660 can be communicatively coupled to the service gateway 1636 contained in the data plane VCN 1618, the NAT gateway 1638 contained in the data plane VCN 1618, and DB subnet(s) 1630 contained in the data plane data tier 1650. The untrusted app subnet(s) 1662 can be communicatively coupled to the service gateway 1636 contained in the data plane VCN 1618 and DB subnet(s) 1630 contained in the data plane data tier 1650. The data plane data tier 1650 can include DB subnet(s) 1630 that can be communicatively coupled to the service gateway 1636 contained in the data plane VCN 1618.

The untrusted app subnet(s) 1662 can include primary VNICs 1664(1)-(N) that can be communicatively coupled to tenant virtual machines (VMs) 1666(1)-(N) residing within the untrusted app subnet(s) 1662. Each tenant VM 1666(1)-(N) can run code in a respective container 1667(1)-(N), and be communicatively coupled to an app subnet 1626 that can be contained in a data plane app tier 1646 that can be contained in a container egress VCN 1668. Respective secondary VNICs 1672(1)-(N) can facilitate communication between the untrusted app subnet(s) 1662 contained in the data plane VCN 1618 and the app subnet contained in the container egress VCN 1668. The container egress VCN can include a NAT gateway 1638 that can be communicatively coupled to public Internet 1654 (e.g. public Internet 1354 of FIG. 13).

The Internet gateway 1634 contained in the control plane VCN 1616 and contained in the data plane VCN 1618 can be communicatively coupled to a metadata management service 1652 (e.g. the metadata management system 1352 of FIG. 13) that can be communicatively coupled to public Internet 1654. Public Internet 1654 can be communicatively coupled to the NAT gateway 1638 contained in the control plane VCN 1616 and contained in the data plane VCN 1618. The service gateway 1636 contained in the control plane VCN 1616 and contained in the data plane VCN 1618 can be communicatively couple to cloud services 1656.

In some examples, the pattern illustrated by the architecture of block diagram 1600 of FIG. 16 may be considered an exception to the pattern illustrated by the architecture of block diagram 1500 of FIG. 15 and may be desirable for a customer of the IaaS provider if the IaaS provider cannot directly communicate with the customer (e.g., a disconnected region). The respective containers 1667(1)-(N) that are contained in the VMs 1666(1)-(N) for each customer can be accessed in real-time by the customer. The containers 1667(1)-(N) may be configured to make calls to respective secondary VNICs 1672(1)-(N) contained in app subnet(s) 1626 of the data plane app tier 1646 that can be contained in the container egress VCN 1668. The secondary VNICs 1672(1)-(N) can transmit the calls to the NAT gateway 1638 that may transmit the calls to public Internet 1654. In this example, the containers 1667(1)-(N) that can be accessed in real-time by the customer can be isolated from the control plane VCN 1616 and can be isolated from other entities contained in the data plane VCN 1618. The containers 1667(1)-(N) may also be isolated from resources from other customers.

In other examples, the customer can use the containers 1667(1)-(N) to call cloud services 1656. In this example, the customer may run code in the containers 1667(1)-(N) that requests a service from cloud services 1656. The containers 1667(1)-(N) can transmit this request to the secondary VNICs 1672(1)-(N) that can transmit the request to the NAT gateway that can transmit the request to public Internet 1654. Public Internet 1654 can transmit the request to LB subnet(s) 1622 contained in the control plane VCN 1616 via the Internet gateway 1634. In response to determining the request is valid, the LB subnet(s) can transmit the request to app subnet(s) 1626 that can transmit the request to cloud services 1656 via the service gateway 1636.

It should be appreciated that IaaS architectures 1300, 1400, 1500, 1600 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 17:
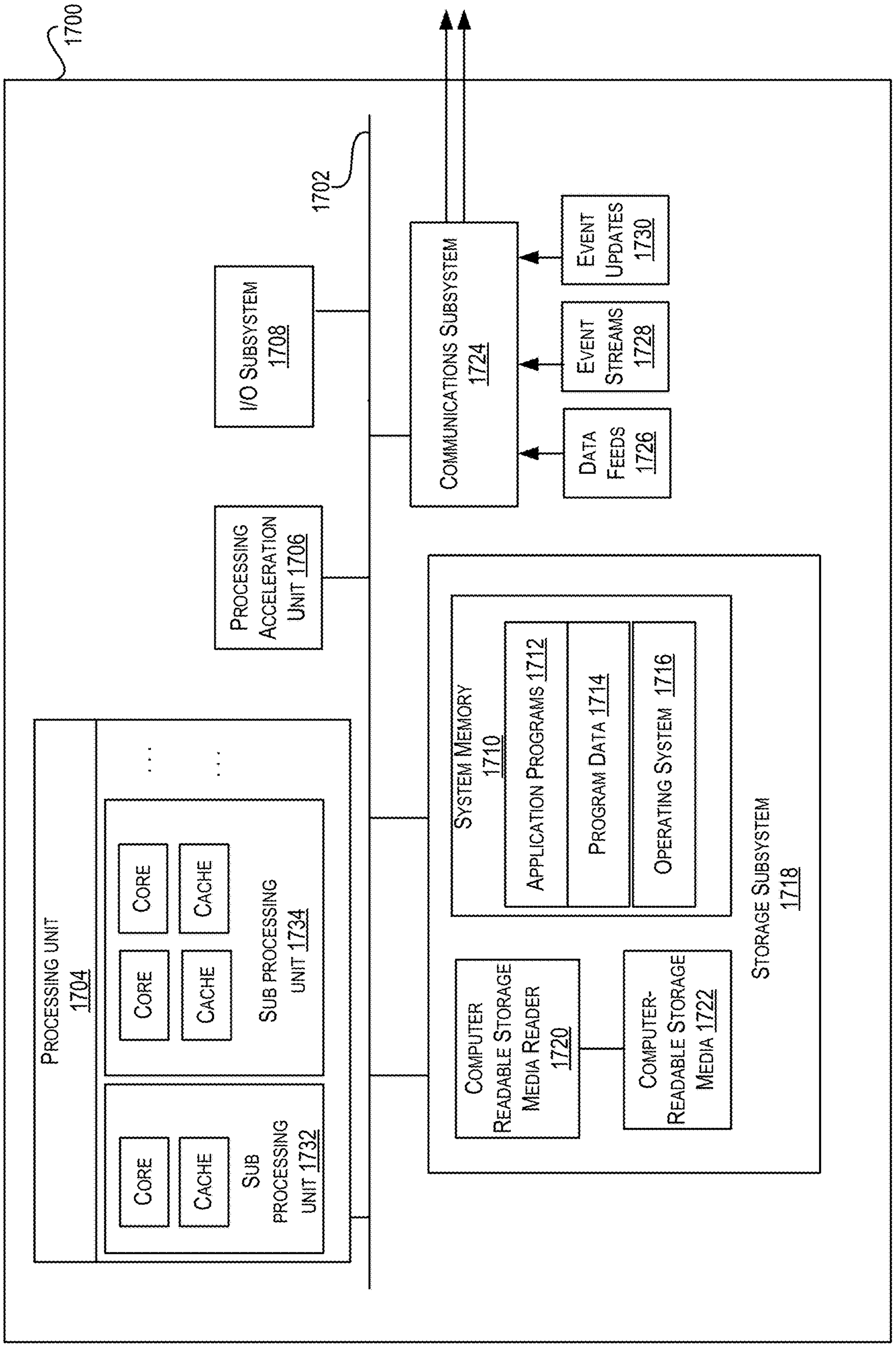
FIG. 17 is a block diagram illustrating an example computer system, according to at least one embodiment.

FIG. 17 illustrates an example computer system 1700, in which various embodiments may be implemented. The system 1700 may be used to implement any of the computer systems described above. As shown in the figure, computer system 1700 includes a processing unit 1704 that communicates with a number of peripheral subsystems via a bus subsystem 1702. These peripheral subsystems may include a processing acceleration unit 1706, an I/O subsystem 1708, a storage subsystem 1718 and a communications subsystem 1724. Storage subsystem 1718 includes tangible computer-readable storage media 1722 and a system memory 1710.

Bus subsystem 1702 provides a mechanism for letting the various components and subsystems of computer system 1700 communicate with each other as intended. Although bus subsystem 1702 is shown schematically as a single bus, alternative embodiments of the bus subsystem may utilize multiple buses. Bus subsystem 1702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1704, which can be implemented as one or more integrated circuits (e.g., a conventional microprocessor or microcontroller), controls the operation of computer system 1700. One or more processors may be included in processing unit 1704. These processors may include single core or multicore processors. In certain embodiments, processing unit 1704 may be implemented as one or more independent processing units 1732 and/or 1734 with single or multicore processors included in each processing unit. In other embodiments, processing unit 1704 may also be implemented as a quad-core processing unit formed by integrating two dual-core processors into a single chip.

In various embodiments, processing unit 1704 can execute a variety of programs in response to program code and can maintain multiple concurrently executing programs or processes. At any given time, some or all of the program code to be executed can be resident in processor(s) 1704 and/or in storage subsystem 1718. Through suitable programming, processor(s) 1704 can provide various functionalities described above. Computer system 1700 may additionally include a processing acceleration unit 1706, which can include a digital signal processor (DSP), a special-purpose processor, and/or the like.

I/O subsystem 1708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1700 may comprise a storage subsystem 1718 that comprises software elements, shown as being currently located within a system memory 1710. System memory 1710 may store program instructions that are loadable and executable on processing unit 1704, as well as data generated during the execution of these programs.

Depending on the configuration and type of computer system 1700, system memory 1710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1704. In some implementations, system memory 1710 may include multiple different types of memory, such as static random access memory (SRAM) or dynamic random access memory (DRAM). In some implementations, a basic input/output system (BIOS), containing the basic routines that help to transfer information between elements within computer system 1700, such as during start-up, may typically be stored in the ROM. By way of example, and not limitation, system memory 1710 also illustrates application programs 1712, which may include client applications, Web browsers, mid-tier applications, relational database management systems (RDBMS), etc., program data 1714, and an operating system 1716. By way of example, operating system 1716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 17 OS, and Palm® OS operating systems.

Storage subsystem 1718 may also provide a tangible computer-readable storage medium for storing the basic programming and data constructs that provide the functionality of some embodiments. Software (programs, code modules, instructions) that when executed by a processor provide the functionality described above may be stored in storage subsystem 1718. These software modules or instructions may be executed by processing unit 1704. Storage subsystem 1718 may also provide a repository for storing data used in accordance with the present disclosure.

Storage subsystem 1700 may also include a computer-readable storage media reader 1720 that can further be connected to computer-readable storage media 1722. Together and, optionally, in combination with system memory 1710, computer-readable storage media 1722 may comprehensively represent remote, local, fixed, and/or removable storage devices plus storage media for temporarily and/or more permanently containing, storing, transmitting, and retrieving computer-readable information.

Computer-readable storage media 1722 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1700.

By way of example, computer-readable storage media 1722 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1700.

Communications subsystem 1724 provides an interface to other computer systems and networks. Communications subsystem 1724 serves as an interface for receiving data from and transmitting data to other systems from computer system 1700. For example, communications subsystem 1724 may enable computer system 1700 to connect to one or more devices via the Internet. In some embodiments communications subsystem 1724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1724 can provide wired network connectivity (e.g., Ethernet) in addition to or instead of a wireless interface.

In some embodiments, communications subsystem 1724 may also receive input communication in the form of structured and/or unstructured data feeds 1726, event streams 1728, event updates 1730, and the like on behalf of one or more users who may use computer system 1700.

By way of example, communications subsystem 1724 may be configured to receive data feeds 1726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1724 may also be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1724 may also be configured to output the structured and/or unstructured data feeds 1726, event streams 1728, event updates 1730, and the like to one or more databases that may be in communication with one or more streaming data source computers coupled to computer system 1700.

Computer system 1700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure.

Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:

receiving, by an accelerator of a smart network interface card, a packet from a first port of the smart network interface card, the first port being associated with a first data path and a second data path;

determining, by the accelerator, that the packet was received from the first port via the second data path instead of the first data path, wherein a programming data plane of the smart network interface card determines a particular flow associated with the packet based at least in part on determining that the packet was transmitted to the smart network interface card from a first host computer via the second data path;

modifying, by the accelerator, the packet by inserting a header to indicate that the packet arrived from the first port via the second data path;

inserting, by the accelerator, the modified packet into a queue, the queue comprising a plurality of other packets from at least one of the second data path and a third data path;

receiving, by the programming data plane, the modified packet from the queue;

determining, by the programming data plane, whether the modified packet arrived at the first port via the second path based at least in part on the header, the header inserted after receiving the packet from the first port and processing, by the programming data plane, the modified packet based at least in part on the determination that the packet arrived at the first port via the second data path.

2. The computer-implemented method claim 1, wherein the header corresponds to a bit-string indicating the second data path.

3. The computer-implemented method of claim 1, wherein the first port is associated with the third data path, and wherein the first port is connected to a splitter device that splits the third data path into the first data path and the second data path.

4. The computer-implemented method of claim 3, wherein the first data path is associated with a first physical medium that connects the splitter device to the first host computer, and wherein the second data path is associated with a second physical medium that connects the splitter device to a second host computer.

5. The computer-implemented method of claim 1, wherein processing the modified packet further comprises:

identifying, by the programming data plane, a bit-string within the modified packet that indicates that the packet arrived at the first port via the second data path; and determining, by the programming data plane, a particular customer account identifier based at least in part on the bit-string.

6. The computer-implemented method of claim 5, further comprising:

identifying, by the programming data plane, a tuple within the modified packet that is associated with a particular flow; and generating, by the programming data plane, a hash based at least in part on at least one of: a virtual local area network tag, the bit-string, or the tuple.

7. The computer-implemented method of claim 6, wherein the hash is associated with a cache entry of a cache maintained by the smart network interface card, the cache entry storing data associated with the particular flow, and wherein the smart network interface card determines to process the packet based at least in part on the data within the cache entry.

8. A smart network interface card, comprising:

one or more processors; and one or more computer-readable media having stored thereon a set of instructions that, when executed by the one or more processors, cause the one or more processors to:

receive, by an accelerator of a smart network interface card, a packet from a first port of the smart network interface card, the first port being associated with a first data path and a second data path;

determine, by the accelerator, that the packet was received from the first port via the second data path instead of the first data path, wherein a programming data plane of the smart network interface card determines a particular flow associated with the packet based at least in part on determining that the packet was transmitted to the smart network interface card from a first host computer via the second data path;

modify, by the accelerator, the packet by inserting a header to indicate that the packet arrived from the first port via the second data path;

insert, by the accelerator, the modified packet into a queue, the queue comprising a plurality of other packets received from at least one of the second data path or a third data path;

receive, by the programming data plane, the modified packet from the queue;

determine, by the programming data plane, whether the modified packet arrived at the first port via the second path based at least in part on the header, the header inserted after receiving the packet from the first port; and process, by the programming data plane, the modified packet based at least in part on the determination that the packet arrived at the first port via the second data path.

9. The smart network interface card of claim 8, wherein the header corresponds to a bit-string indicating the second data path.

10. The smart network interface card of claim 8, wherein the first port is associated with the third data path, and wherein the first port is connected to a splitter device that splits the third data path into the first data path and the second data path.

11. The smart network interface card of claim 10, wherein the first data path is associated with a first physical medium that connects the splitter device to the first host computer, and wherein the second data path is associated with a second physical medium that connects the splitter device to a second host computer.

12. The smart network interface card of claim 8, wherein processing the modified packet further comprises:

identifying, by the programming data plane, a bit-string within the modified packet that indicates that the packet arrived at the first port via the second data path; and determining, by the programming data plane, a particular customer account identifier based at least in part on the bit-string.

13. The smart network interface card of claim 12, wherein the set of instructions, when executed by the one or more processors, cause the one or more processors to:

identify, by the programming data plane, a tuple within the modified packet that is associated with a particular flow; and generate, by the programming data plane, a hash based at least in part on at least one of: a virtual local area network tag, the bit-string, or the tuple.

14. The smart network interface card of claim 13, wherein the hash is associated with a cache entry of a cache maintained by the smart network interface card, the cache entry storing data associated with the particular flow, and wherein the smart network interface card determines to process the packet based at least in part on the data within the cache entry.

15. One or more non-transitory computer-readable media having stored thereon a set of instructions that, when executed by one or more processors of a computing system, cause a smart network interface card to:

receive, by an accelerator of a smart network interface card, a packet from a first port of the smart network interface card, the first port being associated with a first data path and a second data path;

determine, by the accelerator, that the packet was received from the first port via the second data path instead of the first data path, wherein a programming data plane of the smart network interface card determines a particular flow associated with the packet based at least in part on determining that the packet was transmitted to the smart network interface card from a first host computer via the second data path;

modify, by the accelerator, the packet by inserting a header to indicate that the packet arrived from the first port via the second data path;

insert, by the accelerator, the modified packet into a queue, the queue comprising a plurality of other packets received from at least one of the second data path or a third data path;

receive, by the programming data plane, the modified packet from the queue; determine, by the programming data plane, whether the modified packet arrived at the first port via the second path based at least in part on the header, the header inserted after receiving the packet from the first port; and process, by the programming data plane, the modified packet based at least in part on the determination that the packet arrived at the first port via the second data path.

16. The one or more non-transitory computer-readable media of claim 15, wherein the header corresponds to a bit-string indicating the second data path.

17. The one or more non-transitory computer-readable media of claim 15, wherein the first port is associated with the third data path, and wherein the first port is connected to a splitter device that splits the third data path into the first data path and the second data path.

18. The one or more non-transitory computer-readable media of claim 17, wherein the first data path is associated with a first physical medium that connects the splitter device to the first host computer, and wherein the second data path is associated with a second physical medium that connects the splitter device to a second host computer.

19. The one or more non-transitory computer-readable media of claim 15, wherein processing the modified packet further comprises:

identifying, by the programming data plane, a bit-string within the modified packet that indicates that the packet arrived at the first port via the second data path; and determining, by the programming data plane, a particular customer account identifier based at least in part on the bit-string.

20. The one or more non-transitory computer-readable media of claim 19, wherein the set of instructions, when executed by the one or more processors, cause the one or more processors to:

identify, by the programming data plane, a tuple within the modified packet that is associated with a particular flow; and generate, by the programming data plane, a hash based at least in part on at least one of: a virtual local area network tag, the bit-string, or the tuple.

* * * * *